US011892563B1

(12) United States Patent
Mistry

(10) Patent No.: US 11,892,563 B1
(45) Date of Patent: Feb. 6, 2024

(54) DETECTING HUMAN PRESENCE IN AN OUTDOOR MONITORED SITE

(71) Applicant: Project Canary, PBC, Denver, CO (US)

(72) Inventor: Ray K. Mistry, Denver, CO (US)

(73) Assignee: PROJECT CANARY, PBC, Denver, CO (US)

( * ) Notice: Subject to any disclaimer, the term of this patent is extended or adjusted under 35 U.S.C. 154(b) by 0 days.

(21) Appl. No.: 18/236,247

(22) Filed: Aug. 21, 2023

(51) Int. Cl.
*G01S 7/41* (2006.01)
*G01S 13/89* (2006.01)
*G01S 13/87* (2006.01)

(52) U.S. Cl.
CPC .............. *G01S 7/417* (2013.01); *G01S 13/87* (2013.01); *G01S 13/89* (2013.01)

(58) Field of Classification Search
CPC ............ G06N 20/00; G06N 3/08; G06N 3/02; H04W 84/12; G01S 13/04; G01S 7/415; G01S 13/56; G01S 7/417; G01S 7/412; G01S 5/0278; G06V 10/82
See application file for complete search history.

(56) References Cited

U.S. PATENT DOCUMENTS

| | | | |
|---|---|---|---|
| 10,620,307 B2 | 4/2020 | Yavari et al. | |
| 10,826,629 B1 * | 11/2020 | Lu | G06V 40/10 |
| 11,616,553 B1 * | 3/2023 | Kachroo | H04B 7/0626 |
| | | | 375/262 |
| 11,776,156 B2 * | 10/2023 | Li | G06V 10/82 |
| | | | 382/157 |
| 2021/0360318 A1 | 11/2021 | Neerbek et al. | |
| 2022/0286885 A1 * | 9/2022 | Wang | G01S 5/0278 |
| 2023/0130588 A1 * | 4/2023 | Sivakumar | G01S 13/865 |
| | | | 382/103 |

FOREIGN PATENT DOCUMENTS

| | | |
|---|---|---|
| CN | 115171154 A | 10/2022 |
| CN | 115731616 A | 3/2023 |
| WO | 2021244915 A1 | 12/2021 |

(Continued)

OTHER PUBLICATIONS

AutoFi: Towards Automatic WiFi Human Sensing via Geometric Self-Supervised Learning Jianfei Yang, Xinyan Chen, Han Zou, Dazhuo Wang, Lihua Xie arXiv:2205.01629 (Year: 2022).*

(Continued)

*Primary Examiner* — Olumide Ajibade Akonai
(74) *Attorney, Agent, or Firm* — Stephen B. Katsaros; Patent Engineering, LLC

(57) ABSTRACT

Methods and systems for detecting human presence in an outdoor monitored site are disclosed. In an configuration, the method may include providing at least three transmitters for transmitting radio signals and at least three receivers for receiving radio signals. Channel state information (CSI) data is extracted from the radio signals. The CSI data include phase values and amplitude values. The CSI data is converted into an image representation map and then a surface map is generated using Machine Learning (ML) networks. The surface map is a representation of correspondence between the image representation map and a 3-dimensional (3D) surface associated with a human body.

22 Claims, 42 Drawing Sheets

(56) References Cited

FOREIGN PATENT DOCUMENTS

WO 2022184616 A1 9/2022

OTHER PUBLICATIONS

J. Yang, X. Chen, H. Zou, D. Wang, Q. Xu and L. Xie, "EfficientFi: Toward Large-Scale Lightweight WiFi Sensing via CSI Compression," in IEEE Internet of Things Journal, vol. 9, No. 15, pp. 13086-13095, 1 Aug. 1, 2022, doi: 10.1109/JIOT.2021.3139958 (Year: 2022).*
SenseFi: A Library and Benchmark on Deep-Learning-Empowered WiFi Human Sensing Jianfei Yang, Xinyan Chen, Dazhuo Wang, Han Zou, Chris Xiaoxuan Lu, Sumei Sun, Lihua Xie arXiv:2207. 07859 (Year: 2022) .*
I. Nirmal, A. Khamis, M. Hassan, W. Hu and X. Zhu, "Deep Learning for Radio-Based Human Sensing: Recent Advances and Future Directions," in IEEE Communications Surveys & Tutorials, vol. 23, No. 2, pp. 995-1019, Secondquarter 2021, doi: 10.1109/COMST.2021.3058333. (Year: 2021).*
Geng Guang DeLaTorre, DensePose from WiFi, Dec. 31, 2022, 13.
Ren et al., 3D Human Pose Estimation for Free-Form and Moving Activities Using WiFi, 25.
Zhao et al., Through-Wall Human Pose Estimation Using Radio Signals, 2018, 10.

* cited by examiner

DETECTING HUMAN PRESENCE IN AN OUTDOOR MONITORED SITE

A portion of the disclosure of this patent document contains material which is subject to copyright and/or mask work protection. The copyright and/or mask work owner has no objection to the facsimile reproduction by anyone of the patent document or the patent disclosure, as it appears in the Patent and Trademark Office patent file or records, but otherwise reserves all copyright and/or mask work rights whatsoever.

TECHNICAL FIELD

This disclosure pertains generally, but not by way of limitation, to systems and methods for sensing human presence. In particular, the system(s) and method(s) described herein provide for detecting presence and pose of humans present in an outdoor monitored site, using radio signal. In one specific configuration, the detection of human presence at an oil facility ustilizing radio signals (e.g., WiFi) to detect presence and/or body geometry (pose).

BACKGROUND

Two-dimensional (2D) and three-dimensional (3D) human pose estimation using image-based technologies (for example, Red, Green and Blue (RGB) color model-based cameras) has been known for some time. However, human pose estimation from image-based technologies is adversely affected by occlusion and lighting, which are common in many scenarios of interest. Other technologies like LiDAR and radar-based technologies, on the other hand, need specialized hardware that is expensive and power-intensive. Furthermore, placing these sensors in non-public areas raises significant privacy concerns.

SUMMARY

One or more systems and methods of detecting human presence and human activity within a facility using radio signals (and, in particular, Wi-Fi emissions) are disclosed. The disclosed systems and methods utilize Wi-Fi emissions and advanced signal processing techniques to detect and analyze human presence and movement without relying on visual data.

The methods involve leveraging Wi-Fi signals to detect anomalies in signal amplitude and shifts. By training the system using data from known human activities, the methods can accurately identify and locate human presence within a facility, and determine the pose or position of detected individuals, providing valuable depth of field information. The methods can be applied to various scenarios, including the monitoring of facilities or sites where human activity needs to be sensed without relying on visual spectrum data. The technology has potential applications in fields such as security, surveillance, and industrial operations.

To implement the methods, Wi-Fi transceivers, such as ESP 22 or ESP 32 modules, are utilized. These modules already possess a high-gain antenna capability, which can be activated and further enhanced for the purpose of Wi-Fi emissions detection. By strategically locating these transceivers around the facility, a comprehensive coverage area can be achieved.

In one configuration, the Wi-Fi emissions detection system includes both a transmitter (TX) and a receiver (RX). The TX emits Wi-Fi signals, and the RX receives and analyzes the signals for anomalies and human presence. The system can reconstruct images of human activity by utilizing multiple transceivers as both senders and receivers, allowing for a more accurate understanding of the detected human movements.

A primary objective of the present disclosure is to detect any event or activity that causes interference in the Wi-Fi signals. This early-stage implementation serves as a minimum viable product (MVP) that provides immediate value by alerting a dashboard or monitoring system about the occurrence of any potential human activity. As the system collects more data, it can train machine learning models to recognize specific activities and construct detailed images of human actions.

The present disclosure also addresses the issue of potential radio wave absorption by different elements in the facility. Factors like background and foreground temperature, humidity, and gas composition can influence the reflection and absorption of Wi-Fi signals. The system takes these factors into account during signal analysis and adapts the detection algorithms accordingly.

The Wi-Fi emissions detection system can be co-located with existing equipment and infrastructure on the facility, minimizing additional costs and leveraging already approved hardware. The use of high-gain antennas and strategically placed transceivers ensures efficient coverage and enables accurate detection and tracking of human activity.

The methods and systems of the present disclosure offer significant advantages over traditional methods of human activity sensing by providing real-time, non-intrusive, and reliable detection capabilities. It can be integrated with existing monitoring systems and complement other sensor-based technologies, enhancing overall facility security, safety, and operational efficiency.

In one configuration, a method of detecting human presence in an outdoor monitored site is disclosed. The method may include providing a first air quality monitor that may include a first transmitter for transmitting radio signals and a first receiver for receiving radio signals. The method may further include providing a second air quality monitor that may include a second transmitter for transmitting radio signals and a second receiver for receiving radio signals. The method may further include providing a third air quality monitor that may include a third transmitter for transmitting radio signals and a third receiver for receiving radio signals. Each of the first receiver, the second receiver, and the third receiver may be configured to receive radio signals transmitted by the first transmitter, the second transmitter, and the third transmitter. The method may further include extracting channel state information (CSI) data from radio signals received by each of the first receiver, the second receiver, and the third receiver, corresponding to a space through which the radio signals propagate. The CSI data may include phase values and amplitude values. The method may further include converting, by a first ML network, the CSI data into an image representation map, by performing domain translation of the CSI data using a two-branch encoder-decoder network. The method may further include generating, by a second ML network, a surface map based on the image representation. The surface map is a representation of correspondence between the image representation map and a 3-dimensional (3D) surface associated with a human body.

In some configurations, the ML network may include an image-based Region Based Convolutional Neural Networks (RCNN) model as a teacher network and a radio signal-based RCNN model as a student network. The method may further include training the ML network. The training may include training the image-based RCNN model as the teacher network, fixing teacher network weights and training the student network by feeding the teacher network and the student network with the image data and CSI tensors, respectively, and updating the student network, such that configuration of the student network may correspond to configuration of the teacher network.

In some configurations, the method may further include, upon extracting the CSI data, stabilizing the phase values associated with the CSI data. The stabilizing may include unwrapping the phase values associated with the CSI data, and, upon unwrapping, applying linear fitting to the phase values associated with the CSI data, to obtain stabilized phase values.

In some configurations, converting the CSI data into the image representation map may include flattening an amplitude tensor corresponding to the amplitude value and a phase tensor corresponding to the phase value, to obtain a flattened amplitude tensor and a flattened phase tensor, respectively, and feeding the flattened amplitude tensor and the flattened phase tensor to a first encoder and a second encoder, respectively. Converting the CSI data into the image representation map may further include obtaining a first latent space feature corresponding to the amplitude tensor and a second latent space feature corresponding to the phase tensor, from the first encoder and the second encoder, respectively, and concatenating the first latent space feature and the second latent space feature to obtain a fused feature. Converting the CSI data into the image representation map may further include reshaping the fused feature into a 2D feature map of a predefined configuration. Converting the CSI data into the image representation map may further include applying two convolution blocks to the 2D feature map, to obtain a condensed feature map having predefined spatial dimensions, and up-sampling the condensed feature map, by applying deconvolution layers, to obtain the image representation map having predefined dimensions.

In some configurations, obtaining the surface map may include extracting spatial features from the 2D feature map using a Feature Pyramid Network (FPN) backbone and applying Region Proposal Network on the spatial features to obtain an output. Obtaining the surface map may further include applying a Fully Convolutional Network (FCN) on the output to: predict human part labels and UV coordinates within each part of the output, and estimate a key-point heatmap. Obtaining the surface map may further include combining the human part labels and UV coordinates along with the key-point heatmap, and feeding into two convolutional blocks, to obtain a key-point mask and the surface map.

In some configurations, the radio signals may be selected from within a frequency range of 2.4 Giga Hertz (GHz) to 5 GHz.

In some configurations, each of the first encoder and the second encoder may be a multi-layer perceptrons (MLP). Further, in some example configurations, the predefined configuration of the 2D feature map may be 24×24, and the predefined configuration of the image representation map may be 3×720×1280.

In one configuration, another method of detecting human presence in an outdoor monitored site is disclosed. The method may include providing: at least three transmitters for transmitting radio signals and at least three receivers for receiving radio signals. Each of the at least three transmitters may be configured to receive radio signals transmitted by each of the at least three receivers. The method may further include extracting channel state information (CSI) data from radio signals received by each of the at least three receivers, corresponding to a space through which the radio signals propagate. The CSI data may include phase values and amplitude values. The method may further include converting the CSI data into an image representation map, by performing domain translation of the CSI data using a two-branch encoder-decoder network and generating a surface map from a Machine Learning (ML) network, by feeding the image representation map to the ML network. The surface map may be a representation of correspondence between the image representation map and a 3-dimensional (3D) surface associated with a human body.

In another configuration, a system for detecting human presence in an outdoor monitored site is disclosed. The system may include at least three transmitters for transmitting radio signals and at least three receivers for receiving radio signals. Each of the at least three transmitters may be configured to receive radio signals transmitted by each of the at least three receivers. The system may further include a human presence detecting device that may include a processor and a memory. The memory stores a plurality of processor-executable instructions which, upon execution by the processor, cause the processor to: extract channel state information (CSI) data from radio signals received by each of the at least three receivers, corresponding to a space through which the radio signals propagate. The CSI data may include phase values and amplitude values. The processor-executable instructions further cause the processor to: convert the CSI data into an image representation map, by performing domain translation of the CSI data using a two-branch encoder-decoder network and generate, by a second ML network, a surface map based on the image representation. The surface map is a representation of correspondence between the image representation map and a 3-dimensional (3D) surface associated with a human body.

In another configuration, a method of detecting human presence in an outdoor monitored site disclosed. The method may include receiving, from a horizontal antenna array, a plurality of two-dimensional (2D) horizontal heatmaps. Each of the plurality of horizontal heatmaps may be a projection of RF signal reflections on a plane parallel to the ground associated with the outdoor monitored site. The method may further include receiving from a vertical antenna array, a plurality of 2D vertical heatmaps. Each of the plurality of vertical heatmaps may be a projection of RF signal reflections on a plane perpendicular to the ground associated with the outdoor monitored site. The method may further include inputting the plurality of 2D horizontal heatmaps and the plurality of 2D vertical heatmaps to a student network of a Machine Learning (ML) network and inputting image data synchronized with the plurality of 2D horizontal heatmaps and the plurality of 2D horizontal heatmaps to a teacher network. The teacher network may provide cross-modal supervision for the student network. The method may further include and receiving, from the student network, predicted key-point confidence maps, corresponding to one or more anatomical parts of a human body.

In some configurations, the student network may include a first RF encoding network for horizontal heatmap streams and a second RF encoding network for vertical heatmap streams. Each of the first RF encoding network and the second RF encoding network may remove spatial dimensions to summarize information from the original views, based on strided convolutional networks, to generate horizontal RF encodings and vertical RF encodings, respectively. The student network may further include a pose decoding network. The pose decoding network may receive channel-wise concatenation of the horizontal RF encodings and the vertical RF encodings and predict key-point confidence maps, based on the channel-wise concatenation of the horizontal RF encodings and the vertical RF encodings.

In some configurations, each of the first RF encoding network and the first RF encoding network may uses strided convolutional networks to remove the spatial dimensions to summarize the information from the original views. Further, pose decoding network may use fractionally strided convolutional networks to decode key-points in a camera's view.

In another configuration, a method of detecting human presence in an outdoor monitored site is disclosed. This method may include receiving, from one or more receivers, Wi-Fi signals as received by each of the one or more receivers, corresponding to a space through which the Wi-Fi signals propagate and extracting channel state information (CSI) data from the Wi-Fi signals as received by each of the one or more receivers. The method may further include extracting two-dimensional (2D) AoA spectrum from the CSI data associated with each of the one or more receivers, concatenating 2D AoA spectrum from the CSI data associated with the one or more receivers to obtain a concatenated 2D AoA spectrum, and extracting spatial features from the concatenated 2D AoA spectrum, using a CNN. The method may further include extracting temporal features from the concatenated 2D AoA spectrum, using a LSTM and obtaining key-points associated with a human body, based on the spatial features and the temporal features.

In some configurations, upon extracting, the method may further include preprocessing the CSI data for de-noising the CSI data, based on a linear fit model.

In some configurations, the method may further include correlating the key-points associated with a human body with a 3D skeleton, to generate a 3D representation of the human body. The 2D AoA spectrum may include spectrum associated with LoS signal, spectrum associated with signals reflected from static objects, and spectrum associated with signals reflected from a human body.

In some configurations, the method may further include filtering the 2D AoA spectrum. The filtering may include subtracting from the 2D AoA spectrum, the spectrum associated with LoS signal and the spectrum associated with signals reflected from static objects, to obtain the spectrum associated with signals reflected from the human body.

Further areas of applicability of the present disclosure will become apparent from the detailed description provided hereinafter. It should be understood that the detailed description and specific examples, while indicating various configuration, are intended for purposes of illustration only and are not intended to necessarily limit the scope of the disclosure.

BRIEF DESCRIPTION OF DRAWINGS

The accompanying figures of the drawing, which are included to provide a further understanding of general aspects of the system/method, are incorporated in and constitute a part of this specification. These illustrative aspects of the system/method, and together with the detailed description, explain the principles of the system. No attempt is made to show structural details in more detail than is necessary for a fundamental understanding of the system and various ways in which it is practiced. The following figures of the drawing include.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label. Where the reference label is used in the specification, the description is applicable to any one of the similar components having the same reference label.

DETAILED DESCRIPTION

Illustrative configurations are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed configurations. It is intended that the following detailed description be considered as exemplary only, with the true scope and spirit being indicated by the following claims.

Figure 1:
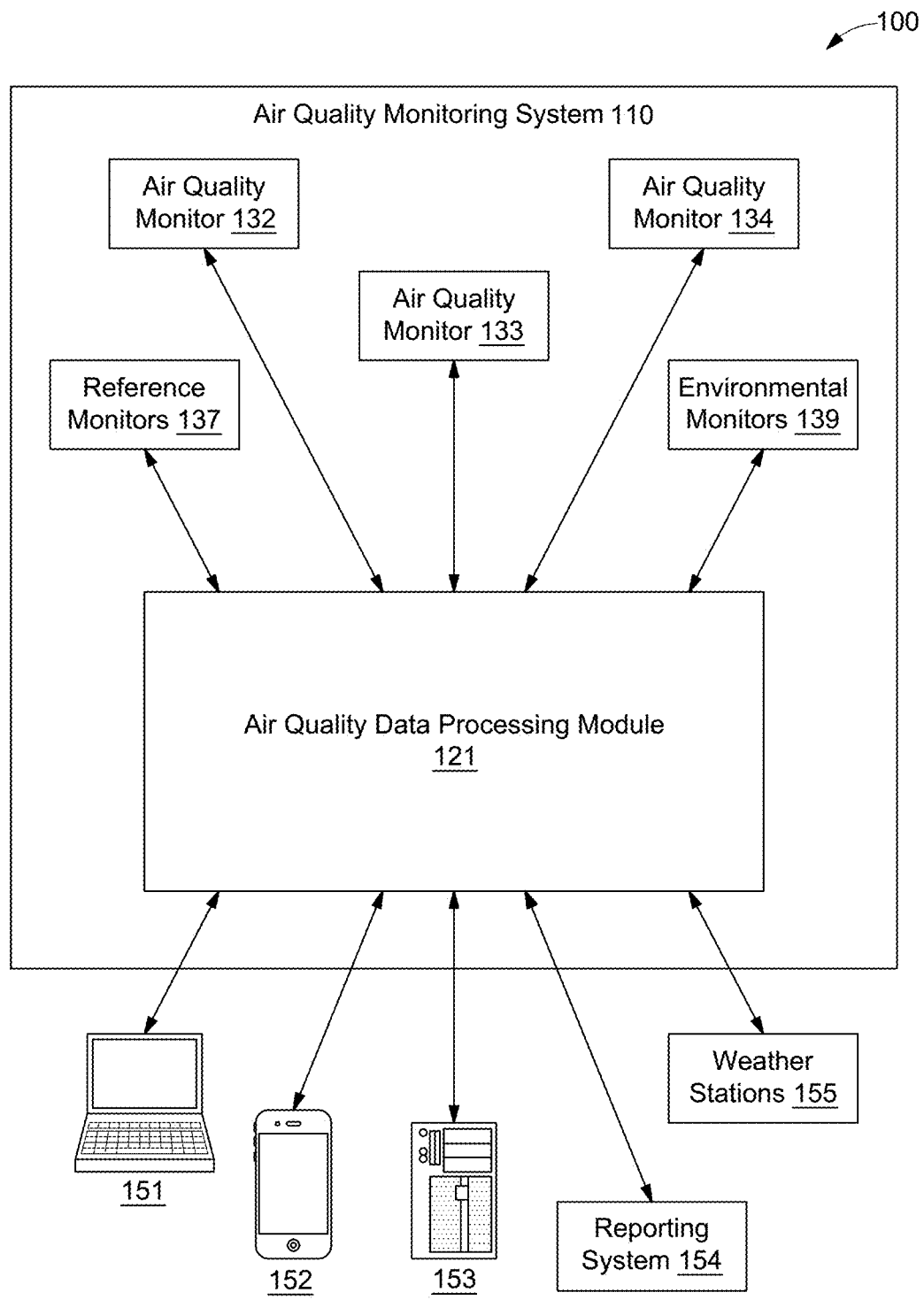
FIG. 1 illustrates an example of an air quality monitoring system, in accordance with an illustrative configuration of the present disclosure.

FIG. 1 shows an example of an air quality monitoring system 110, which handles air quality data from different sources. As illustrated in FIG. 1, air quality monitoring system 110 may include an air quality data processing module 121, a plurality of air quality monitors 132-134, reference monitors 137 and environmental monitors 139. Air quality monitors 132-134 can include one or more chemical sensors configured to detect and measure chemicals, such as ozone, nitrogen oxide, carbon dioxide, sulfur dioxide, volatile organic compounds, methane or other hydrocarbons, and other chemicals in gaseous state (these are herein being described as gaseous chemicals), as well as one or more particle sensors configured to detect and measure the presence of suspended particles in air such as dust, smoke, pollen, or soot (these are herein described as particulate matter or PM). Air quality monitors 132-134 may include an enhanced gaseous chemical sensor having a multi-pass cell for light rays, as will be described in more detail below. Air quality monitors 132-134 may be located at multiple different locations. For example, multiple monitors may be located around a sizable area, such as a county, a city, or a neighborhood. Several instruments may also be located within a building or a dwelling.

Reference monitors 137 include precision gaseous chemical sensors and are configured to provide measurements for use in calibrating the gaseous chemical sensors in air quality monitors 132-134. Environmental monitors 139 are configured to measure environmental conditions, such as humidity, temperature, atmospheric pressure, air density, ambient light, geographic location, wind speed and direction, and the like.

Air quality data processing module 121 is configured to communicate with air quality monitors 132-134, reference monitors 137, and environmental monitors 139. For example, air quality data processing module 121 may receive data from these monitors, such as measurements. Air quality data processing module 121 may also transmit data to these monitors, such as providing calibration data. Air quality data processing module 121 can correct measurements from air quality monitors 132-134 using cross-calibration factors, as will be explained below. Air quality data processing module 121 is also configured to process the data from monitors and perform analyses to calculate or infer additional air quality data such as the amount of various gaseous chemicals in various locations, sources of those gaseous chemicals, and recommendations based on elicited requirements or preferences of end users. Air quality data processing module 121 is configured to communicate with mobile devices 152, computing devices 151 and server devices 153 to receive data and provide received, calculated, and inferred air quality data. For example, air quality data processing module 121 may receive user-input data and use that data to derive additional air quality data relevant to the area of analysis. Air quality data processing module 121 is also configured to communicate with other sources of data such as reporting system 154 and weather stations 155. Air quality data processing module 121 may be implemented in any appropriate physical or virtual computing platform (such as a networked server) and may operate and act through any suitable interface (such as a cloud computing platform).

Air quality monitoring system 110 may also be configured to process incoming data to provide a variety of outputs. For example, air quality monitoring system 110 may analyze measurements from air quality monitors 132-134 to determine sources of the gaseous chemicals being detected. Air quality monitoring system 110 may provide actionable steps to affect the chemical sources, such as ways to reduce the release of those chemicals or ways to minimize exposure to those chemicals, making use of stated preferences or user requirements, and/or ancillary (e.g., topological, geological, meteorological, demographic) datasets relevant to the area of investigation.

Figure 2:
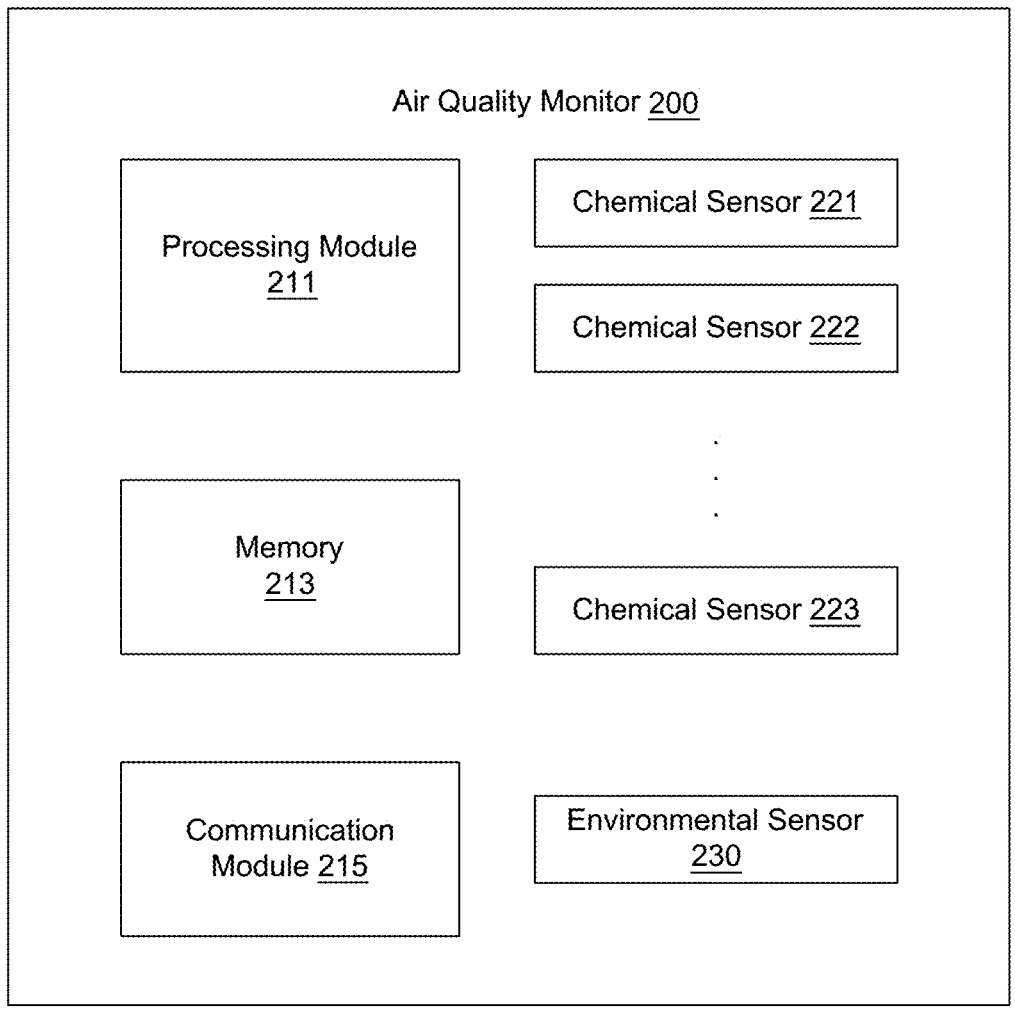
FIG. 2 illustrates an example air quality monitor and select example components that may be included, in accordance with an illustrative configuration of the present disclosure.

FIG. 2 shows an example air quality monitor 200 (such as air quality monitors 132-134 in FIG. 1) and some example components that may be included therein. Air quality monitor 200 may include processing module 211, memory 213, communication module 215, and one or more gaseous chemical sensors, such as chemical sensors 221-223, and environmental sensor 230. Processing module 211 processes computing tasks and controls other components. The computing tasks may include calibration. Memory 213 stores data, such as measurement data from gaseous chemical sensors 221-223 and calibration data such as cross-calibration factors. Chemical sensors 221-223 are configured to measure gaseous chemicals and particulates in analyte gas, such as gas under sampling by air quality monitor 200. Environmental sensor 230 measures environment conditions, such as temperature, pressure, humidity, location, wind speed, and the like. Communication module 215 handles communication with other devices. For example, communication module 215 may handle communication between air quality monitor 200 and air quality data processing module 121 of FIG. 1, other air quality monitors, user-devices such as mobile devices 152 and computing devices (also, referred to as server devices) 151 and 153, and the like. Communication module 215 may communicate through any of a variety of wired and wireless mechanisms, such as Wi-Fi, Bluetooth, mobile networks, long-range radio, satellite, and the like. Air quality monitor 200 may also be configured to measure time, position, and other relevant information for computing devices. The components, functionality, and configuration of the sensor can be selected based on desired monitoring capabilities.

Figure 3A:
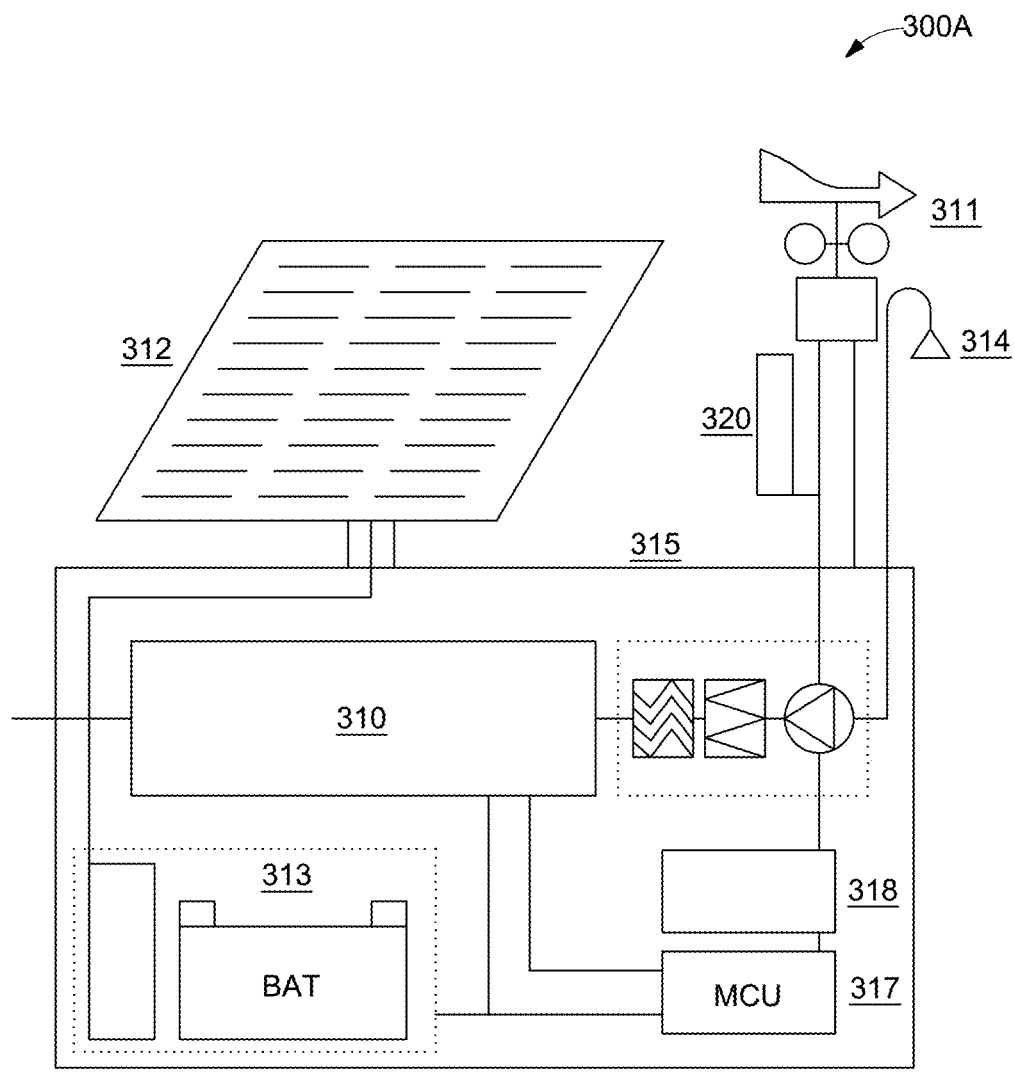
FIG. 3A illustrates a configuration of the sensor system, which is deployed in the field, in accordance with an illustrative configuration of the present disclosure.

FIG. 3A presents a particular embodiment of a sensor system 300A capable of measuring a target compound and one or more environmental parameters (e.g., weather conditions) in a collocated and contemporaneous manner. The compound measurement function of the sensory system of FIG. 3A is performed by the compound sensor or sensors 310. These sensor(s) are point sensors, which means that their function is to measure a particular physico-chemical property of the target compounds to distinguish them from background atmospheric composition (targeted compounds include, but are not limited to: one or more gases and aerosols that are emitted by one or more industrial, anthropogenic, or natural activities). In particular, one embodiment focuses on hydrocarbons and other greenhouse gases that absorb in the mid-IR region of the electromagnetic (EM) spectrum, in particular wavelengths between 1 um and 5 um. In one embodiment, compound sensor 310 is an absorption spectrophotometer that can measure mid-infrared absorption in the 3 um to 5 um range of the EM spectrum. Without loss of generality, compound sensor 310 may comprise other sensor technologies that may be similarly used for the measurement of target compounds.

In order to capture a sample for analysis, a sampling cane 314 may be used to pump an air sample at a specific height and avoid sampling water in the case of precipitation or other foreign agents of large size. The sample may be pumped and conditioned by a sample pumping and conditioning system 319. The system depicted 319 may include a pump for sampling the air for the compound sensor 310, a filter for the removal of particulate matter and a coalescent filter for the removal of water. The system may further include desiccant filters, temperature and pressure adjustment systems, valves, and additional drain pumps to facilitate moisture removal, temperature conditioning of the sample, or for flushing and other filter regeneration tasks. The purpose of this is to provide a properly conditioned sample based on the sensor system requirements, while limiting the necessary maintenance of the pumping and conditioning system 319.

In some configurations, the compound sensor 310 may use an open path in order to avoid the necessity of pumping or conditioning samples. The sample may then be naturally transported into the sensing area by weather patterns without the use of a cane 314 or sampling pumping and conditioning system 319.

The sensor system of FIG. 3A further includes a weather sensor system 311 collocated with the sampling point of the compound sensor 310 around the sampling cane 314. The weather sensor system should at least include sensing elements to measure wind speed and direction. Further sensing about temperature, pressure, hygrometry, insolation, and precipitation may also be used to refine the subsequent modeling effort. The wind speed and direction may be measured by a combination of a wind vane and an anemometer, or by an anemometer alone such as in the case of using an ultrasonic anemometer. The wind direction measurement may be made in two or three dimensions. Temperature may be measured using MEMS sensors, thermistors, or other suitable sensing technology. Pressure may be measured using a barometer sensor and hygrometry by a moisture sensor. The sensors for temperature, pressure and moisture may be connected for improvement of each of the measures as they are interdependent. Insolation may be measured using a photodiode or any other appropriate light-sensitive sensor. Precipitation may be measured using a precipitation sensor with auto-draining capability. While collocating the weather measurement with the sampling point is important for the purpose of accurately characterizing emissions, it is not absolutely necessary for performing the method as long as weather measurements are collected in close proximity to the sensor system (e.g., within 100 m). This conformation, i.e., being collocated, minimizes the measurement error and is the one illustrative configuration of the present disclosure.

The data collected by the compound sensor 310 and weather sensor system 311 may be collected and processed by a local computing unit 317. The local computing unit may also control the execution of the main sampling and measurement program and the actuation and controlling of any subsystem of the sensor system 300A. The local computing unit 317 runs the main firmware, which schedules and collects data from compound sensor 310 and weather sensor system 311, conditions the sensor signals into a rational format, performs data preprocessing, locally stores data, formats, and prepares messages, and generates diagnostic and metadata pertaining to the identification, time stamping and operational diagnostics of the sensor system and supporting circuitry. The messages may be encrypted and transferred to a communication unit 318 and messages may be received from remote assets. The communication unit 318 includes a modem or other interface that conditions the message to the right protocol for communication or receives external messages to be communicated to the computing unit 317. The communication protocol may be wired, such as a SCADA system or wireless, such as Bluetooth®, Wi-Fi, LoRa, cellular or satellite or any other radiofrequency, optical line of sight, or other wireless data-transmission protocol. If a wireless protocol is employed, the data may be relayed using a communication antenna 320, if appropriate. In general, a communication system, which may consist of a communication antenna 320 and communication unit 318, has a role that includes the communication of the measurement to a remote or centralized node and the receipt of communications related to settings and operations changes or firmware updates. The communication system may be used to relay messages to and from other sensor systems such as in a daisy chain, star, or mesh configuration in order to reduce the communication cost when relying on external communication infrastructure such as cellular or satellite communication networks. In case of communication error, or other cases that warrant it, the messages may be stored by the computing unit 317 to communicate at a later more opportune time. For example, when communication services may be interrupted, multiple channels of communication (such as multiple wireless data-transmission protocols) may be used to attempt to alert the computing unit 317 to changes of operating conditions and to receive instructions.

The deployment of sensors in the field may require the exposure of the equipment to harsh outdoor conditions with no external support such as power access and communication infrastructure. The sensing system is housed in an enclosure 315 to protect the system from the environment and from tampering. This may include, but is not limited to: precipitation, moisture, surface water and flooding, high temperature and insolation, low temperatures, high winds, storms, hurricanes, typhoons, tornadoes, lightning, external impacts and vibrations, robbery, defacement, damage, earthquakes, light or electromagnetic interference, foreign agents or fauna and flora disturbance or intrusion. The enclosure 315 may also be highly visible by day and reflective at night to avoid accidental damage. The enclosure 315 may be directly on the ground, mounted on a foundation, or pole-mounted.

The sensor system in FIG. 3A may produce and manage its own power. In one embodiment, the sensor system may include a solar power system 312 and a power conversion and storage system 313. The solar power system 312 and power conversion and storage system 313 are designed to provide sufficient power to the various other subsystems with sufficient reserves and capacity to ensure proper functioning of the sensor system in most environmental conditions present in the field. Solar power system 312 may be replaced by wind- or gas-based power generation, or any other form of compact power generation system if the conditions warrant it. For instance, at high latitudes wind-based power generation may be preferable to solar on account of low insolation. The power conversion and storage system 313 may include a battery storage bank and a charge controller. The power conversion and storage system 313 may further include power converters for providing appropriate power to the various systems, relays, fuses, and breakers, and switches appropriate for the power protection, function, and physical interfacing required by a particular embodiment of the sensor system. The battery storage bank may include lithium-ion (such as LiFePO4 cells), lead acid (such as a deep-cycle sealed battery) or any other appropriate battery technology that can operate nominally in conditions that may include high and low temperatures and irregular charging profiles. The charge controller may use Pulse-Width Modulation (PWM) or Maximum Power Point Tracking (MPPT) or other technology appropriate to convert the raw energy from the solar power system 312 to the battery storage bank charging requirements. All subsystems of FIG. 3A may be modular in nature to facilitate replacement of subsystems with minimal tools in the case of maintenance.

Figure 3B:
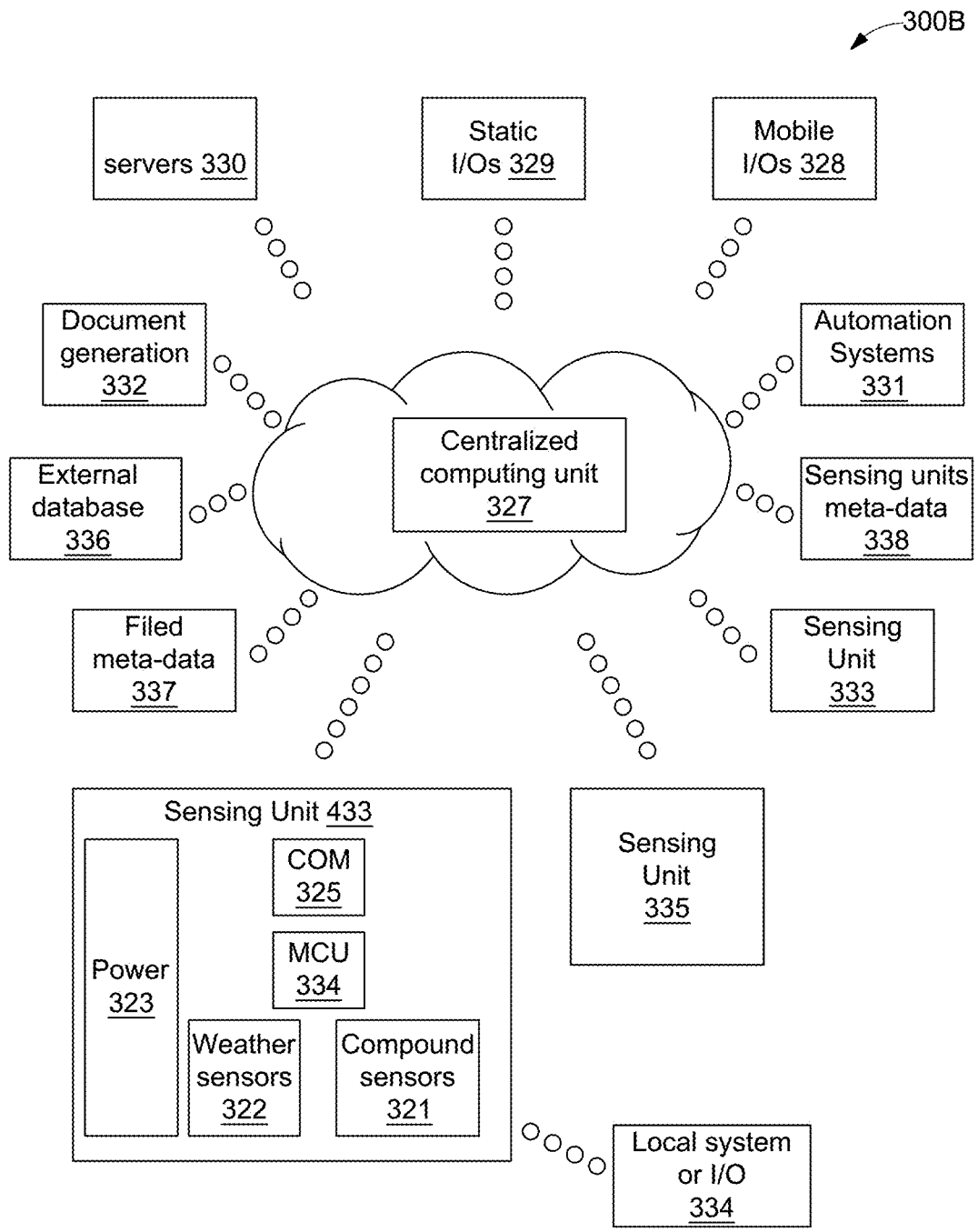
FIG. 3B illustrates a configuration of a communication architecture of a set of sensor systems, in accordance with an illustrative configuration of the present disclosure.
Figure 3C:
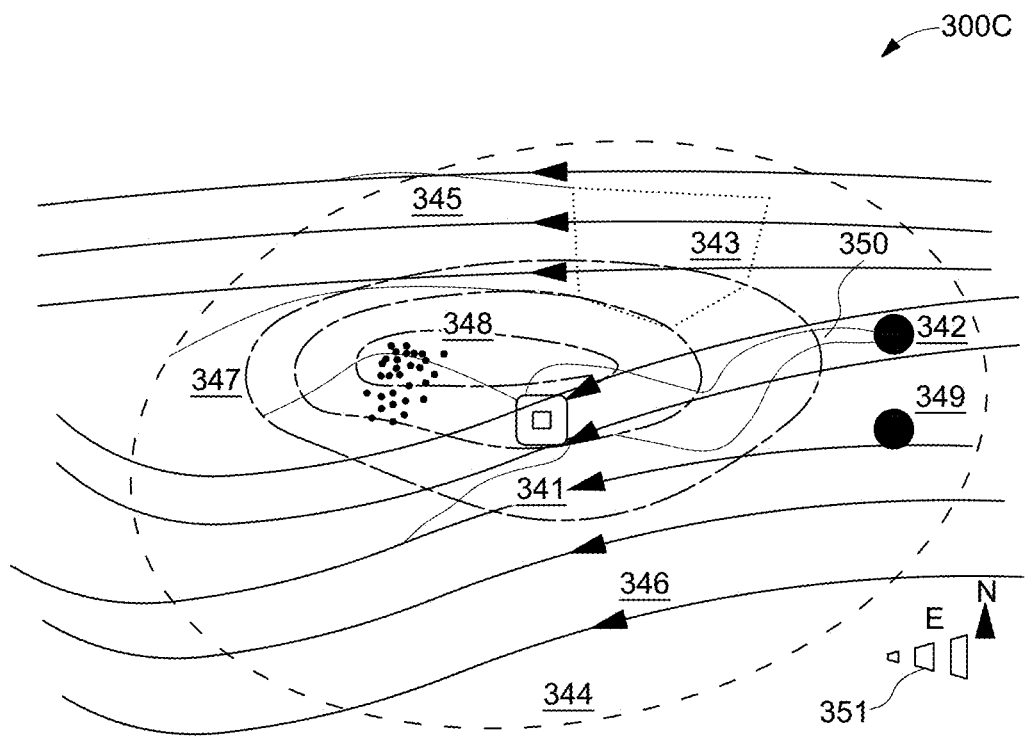
FIG. 3C illustrates a symbolic map representation of a sensor deployment amid the field where sources are present, in accordance with an illustrative configuration of the present disclosure.
Figure 3D:
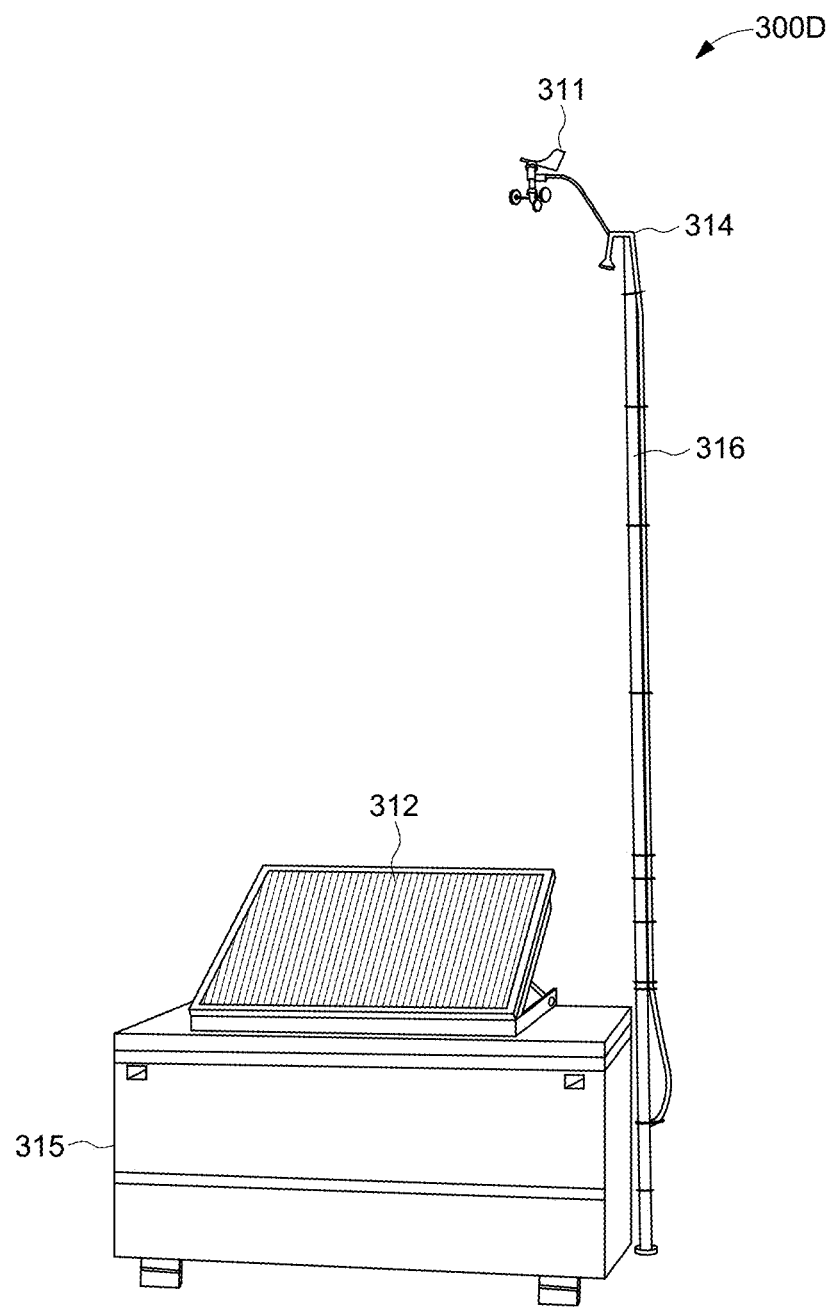
FIG. 3D illustrates another view of the configuration of a sensor system, in accordance with an illustrative configuration of the present disclosure.

FIG. 3D shows another view 300D of the embodiment of the sensor system of FIG. 3A. The system includes enclosure 315, anemometer (i.e., weather sensor system) 311, pole, sampling cane 314, and solar power system 312.

In some configurations, a cloud server (for example, "Amazon Web Services" or simply "AWS") may be provided. Further, each of the sensor systems (i.e., the plurality of air quality monitors) may include control unit which may be using edge computing resources. The edge computing resources may further include a processor (for example, processing module 211), and an averaging routine operatively associated with the processor. The processor may be configured to average a series of the actual emissions measurements obtained by the each of the plurality of air quality monitors to generate an averaged actual emissions measurement. The averaged actual emissions measurement may be generated by the processor at each of the plurality of air quality monitors, according to the averaging routine. The processor may be further configured to transmit the averaged actual emissions measurement to the cloud server. It may be noted that the each of the plurality of air quality monitors may be communicatively coupled to the cloud server. As such, the data received from all the plurality of air quality monitors may be received and analyzed at the cloud server.

In some configurations, the averaging to generate the averaged actual emissions measurement may be dependent on either the wind speed or the wind direction. Further, the averaging to generate the averaged actual emissions measurement may be increased when the wind speed decreases below a diffusion-only speed. The diffusion-only speed may refer to the wind speed when the speed of wind is insufficient to cause considerable movement of emission gases along with the wind. As such, the emission gases only tend to diffuse in the surrounding air (i.e., move from region of high concentration to lower concentration). Additionally, or alternately, the averaging to generate the averaged actual emissions measurement may be increased when the wind direction indicates delivery of dry air (i.e., the air when the concentration of target compound/emission on the air is minimal or absent) to a predominate air quality monitor of the plurality of air quality monitors. As will be appreciated, increasing the averaging allows for more accurate detection of emissions, if any, in the above situations.

Further, in some configurations, the edge computing resource of the air quality monitor may include a memory (for example, memory 213). The air quality monitor may further include emissions sensors (for example, chemical sensors 221-223) configured to obtain sensor data at a predefined frequency. The memory may be configured to store sensor data obtained by the emissions sensors. The air quality monitor may transmit the sensor data to a cloud-base database (for example, "AWS"). Further, the edge computing resources (or processing module 211) may detect a low-connectivity condition. The low connectivity condition may be as a result of network downtime/failure, power failure, etc. Upon detecting the low-connectivity condition, the air quality monitor may start storing the sensor data in the memory. Further, upon detecting a normal-connectivity condition, the air quality monitor may start transmitting the sensor data stored in the memory to the cloud-based database.

Further, the air quality monitor may detect a threshold condition. The threshold condition may be one of a large concentration of a target compound, or a wind measurement from a threshold direction. It may be noted that the threshold direction may be a direction from which a source of emission is likely to be observed. In such a threshold condition, the air quality monitor may augment the frequency of obtaining sensor data by the emissions sensor, based on the detection of the threshold condition. The processor (e.g., processing module 211) may further procure the sensor data from the emissions sensor, and average the sensor data to obtain averaged data. The averaged data may be obtained according to one of a time-based criterion, or an event-based criteria. For example, the time-based criteria may define a time period (e.g., 60 seconds) after which the averaging of the sensors data obtained during that period may be performed. The event-based criteria may define an event (e.g., a low wind condition or high wind condition based on a windspeed threshold) on occurrence of which the averaging may be performed. The air quality monitor may further include a transmitter communicatively coupled to the processor. The transmitter may transmit the averaged data to the cloud-based database. In some configurations, the air quality monitor (i.e., the processor) may sequentially combine the averaged of the sensor data into a data packet, and transmit the averaged data to the cloud-based database via a receiver. The receiver may be one of a cellular network, a wired network, a satellite, a shortwave radio, a CDMA network, or a GSM networks.

The embodiment of the system as in FIGS. 3A and 3D or any other sensor system embodiment capable of measuring target gas and weather measurements in a collocated manner may be deployed in a field where prospective emission sources are present. A symbolic map 300C of a prospective field deployment is presented in FIG. 3C. In FIG. 3C, a sensor system 341, as depicted by a rounded-corner square, is deployed in the field to detect emissions plumes 345, 350 of target compounds, depicted by color gradients. These emissions plumes 345, 350 may be emitted by point sources 342, 349 depicted by circles, or by area source 343 depicted by a filled polygon. The plumes 345, 350 are transported by advection by an air flow 346 as denoted by streamline arrows, and by buoyancy and diffusion of the compound in air. Typically, the air flow is of a complex three-dimensional geometry and depends on many parameters including, but not limited to, terrain, surface roughness and obstacles, temperature and pressure differential, insolation and inversion layer position, turbulence, and atmospheric boundary conditions or other atmospheric conditions forced by large-scale weather patterns. The streamlines (i.e., air flow 346) are a simplified view of the average transport (where turbulence is approached as an average) of air parcels during the sampling time. Note that the streamlines 346 are influenced by the effect of a terrain 347, as noted by isoclines, and by the presence of obstacles 348 (e.g., trees) represented by the small black dots. In this specific snapshot, the point source 342 is emitting the target gas, thereby producing plume 350 which is transported by the air flow 346 to the sensor system 341. Note that the cross section of the plume 350 increases when further from the point source 342 due to diffusion and turbulent mixing. Plume 350 can also appear to have a tortuosity due to the dynamic change in wind speed and direction during the transport. In this example, point source 349 is not emitting and area source 343 is emitting but its plume 345 does not intersect the position of the sensor system 341 in this particular snapshot. Note that plumes are typically three dimensional and may vary in vertical cross sections, though this is not displayed in this figure.

It may therefore be necessary to have precise wind measurement collocated at the sensor system as well as a modeling of the emission transport that considers terrain, obstacles, rugosity, and other field parameters that can affect transport. For instance, in the specific snapshot presented in FIG. 3C, local wind pattern 351 at long distance comes approximately from the East direction before entering the field of interest. The wind measurement collocated at sensor system 341 is approximately Northeast as denoted with streamline 346 intersecting the sensor system 341. From the perspective of sensor system 341, diffusing area source 343 is located in the northeast sector, point source 342 is located in the east-northeast sector, and point source 349 is in the east sector. Only plume 350 from point source 342 is measured by sensor the system 341 in this particular snapshot.

If a model only accounted for a wind direction and/or speed from a local weather pattern, such as that for a distant wind measurement of local wind pattern 351, the perceived source for plume 350 detected by sensor system 341 would be in the East sector, thereby leading to the incorrect guess that point source 349 is the source that is emitting plume 350. However, if the collocated measurement of wind direction at sensor system 341 is considered, plume 350 appears to be coming from area source 343, which is also incorrect. Note that a simple, linear local back-tracing of the wind parcel from the perspective of the wind sensor in sensor system 341 would have led to the same bad conclusion that area source 343 is the source since the terrain is the main source of the non-linear wind flux geometry. What this example shows is that identification of sources from wind speed and direction measurements alone is difficult without large numbers of wind measurements.

In one embodiment, fine measurements of wind around the site would be taken to properly measure the complex wind pattern responsible for the plume transport. Using multiple wind measurements can be cost-prohibitive. In another embodiment, a simulation of the emission transport using a digital twin of the site is performed. Such a digital twin can reconstruct an estimation of the actual flux responsible for the transport and consider the effect of terrain 347, obstacles 348, point source [geometry] 343, 342, 349, as well as other parameters relevant for the turbulent advection/diffusion of the target emitted compounds. With that simulation, the accuracy of the flux in the site is enhanced and closer to the actual flux of air flow 346. Because of this, attributing the plume 350 to point source 342 with a single deployed point sensor is possible.

The same model may allow for reconstructing a detection limit 344 of the sensor system 341. Detection limit 344 denotes the limit for which the smallest leak size is only detected 50% of the time. Other criteria for detection limit 344 may be specified for different leak size or different confidences of detection. In a perfectly flat model with a uniform chance of wind in any direction, the detection limit at a constant altitude is circular (approximated by a cardioid in three dimensions). In practical cases, the shape of the detection limit may be very complex and may change based on wind pattern, temperature and pressure, terrain and other parameters impacting the transport of the compounds as well as detection limits of the sensor itself. FIG. 3C gives an approximation of the detection limit at constant altitude as an ellipse. In this case, sensor system 341 is adequately positioned to detect emissions from point sources 343, 342, and 349 as these potential sources are within a range of the detection limit 344 of the sensor system 341. Note that other positions may lead to higher sensitivity to point sources 343, 342, and 349 but the position of sensor system 341 may be dependent on other factors, such as land usage authorization, better line of sight for communications, or network optimization positioning for a deployment with more than one sensor system.

Multiple sensor systems as described in FIGS. 3A, 3C, and 3D may be deployed in a field for the acquisition of weather measurement and compound measurements. The sensor system takes these measurements and relays messages related to these measurements with timestamps, identifiers, and other metadata regarding sensor operations to a centralized computing unit 327 in FIG. 3B. The communication of data and commands is represented in FIG. 3B. Sensing unit 333, which may or may not be the same as that described in FIG. 3A, can incorporate components such as a power system 323, weather sensors 322, compound sensors 321, a computing unit 324, and a communication unit 325. Sensing unit 333 can relay messages, as described above, to centralized computing unit 327 using network layer. The network layer may rely on existing communication infrastructure such as cellular or satellite, or dedicated infrastructure such as custom wired or wireless systems, including but not limited to, Wi-Fi, Bluetooth, SCADA systems, LoRa, and other telemetry and data transmission systems. The data transmission may rely on other network infrastructure, such as the internet or on dedicated networks such as intranet or LAN. Sensing unit 333 may also directly transmit messages to non-networked systems or local systems 334 as may be the case for a local interface used by the sensor system user. The message from sensing unit 333 may be relayed through other sensor units as in daisy-chained or starred sensor system networks or through a dedicated unit for the local storage, scheduling and packaging of messages from various sensing units 333, 335, deployed in the vicinity of each other. This may be done to amortize the cost of expensive transmission technology such as satellite links.

Once in centralized computing unit 327, message processing is performed to transform raw data into actionable data. This may include simple operations such as data formatting or more complex operations such as creating a maintenance tracking system for the operator. In one embodiment, the data processing is the conversion of weather and compound measurements into detection, localization, quantification, and qualification of target compound emissions. To transform the raw compound measurement into speciation and concentrations, an external database 336 such as the HiTRAN database may be queried for reference spectra, or internal databases of calibration measurements taken with the specific sensing unit 333 during calibration runs. Other information such as sensor units' metadata 338 may be used for the specific instrument characteristics to enhance speciation and concentration measurements.

In order to perform localization, quantification and qualification, centralized computing unit 327 may reference field metadata 337 collected by field operators such as, but not limited to, topological maps of the field deployment, images of site, the potential sources and equipment, equipment inventory and GPS coordinates of features of interest, for the purpose of creating a digital twin of the site for the purpose of atmospheric transport modeling and simulation. Other field metadata may include previous local weather information and the external weather databases 336 are queried.

Centralized computing unit 327 may use other messages from another sensing unit 335 for enhanced localization, quantification, and qualification of the emissions. Sensing unit 335 may include multiple sensing units and may be of the same type as sensing unit 333 or any other sensing units present on the sites. For example, sensing unit 335 may be a flare lighting sensor used as an indicator to help attribute an emission detected by sensing unit 333 to a flare misfiring.

Actuator commands may be used as a sensor feed as well. For example, the actuation of pneumatic equipment at oil sites may result in a predictable emission; therefore, command signals from actuators may be used to help predict expected emissions from an oil site. An example in the landfill industry may be variation in the pressure head of wells which may be correlated with a local emission hotspot. This concept can be extended to all existing command signals and process sensors already present in equipment associated with potential emissions sources.

Once detection, quantification, qualification, and localization of sources is obtained by the processes in the centralized computing unit 327, actionable data may be generated. Actionable data may mean the data necessary to take a corrective action, including, but not limited to, emission reports, maintenance lists, maintenance tracking and emissions-reduction tracking tools. The actionable data may further be used as commands or scripts for automation systems 331. For example, actuators on a site may be automatically put in a safe position if an explosive concentration of a flammable compound is detected. Another example would be the operation of alert equipment such as sirens or visual cues triggered to alert operators to perform emergency evacuation if a toxic compound is detected. At times, robotic or automated inspection and repair or maintenance of equipment may be deployed as a response to a command. For example, a drone may be deployed to perform precise automated inspection of a certain area identified by sensing unit 333 to perform fine-scale equipment leakage detection. Another example would be automated excavation equipment which can be deployed for placing additional ground cover on a detected emission hotspot at a landfill. A third example would be triggering an automated self-diagnostic system in a continuous production environment which may require large computation power for distinguishing problems in the process.

Actionable data may be used to generate automated reports in document generation task 332. For example, the sensor data may be used to generate regulation-mandated emission inventory reporting and edit auto-completed reports to be physically or digitally sent to the concerned agency with or without operator intervention.

Actionable data, emission data and raw data may be transmitted to other servers 330, that may be internal or external. The purpose of this may be to relate raw data for archiving or post-processing, or to send data to servers behind a firewall in specific user instances where proprietary data is collected and require different levels of encryption. In that case raw encrypted data may not be decrypted in the centralized computing unit 327 for data safety reasons and may only be safely decrypted behind a client's firewall.

Actionable data such as triage information, reports, maintenance, and abatement data may be communicated through emails, text messages, dashboards, or dynamic notebooks, to static I/Os 329 and mobile I/Os 328. Static I/Os 329 can include PC and other fixed computing units such as in the office of the field manager. Mobile I/Os 328s can include pagers, PDAs, phones, tablets or laptop computing units and equivalents such as the phone of a field operator such as a pumper or a field foreman for oil and gas applications. As seen in FIG. 3B, the centralized computing unit 327 processes the messages received by the sensing unit 333.

Figure 4A:
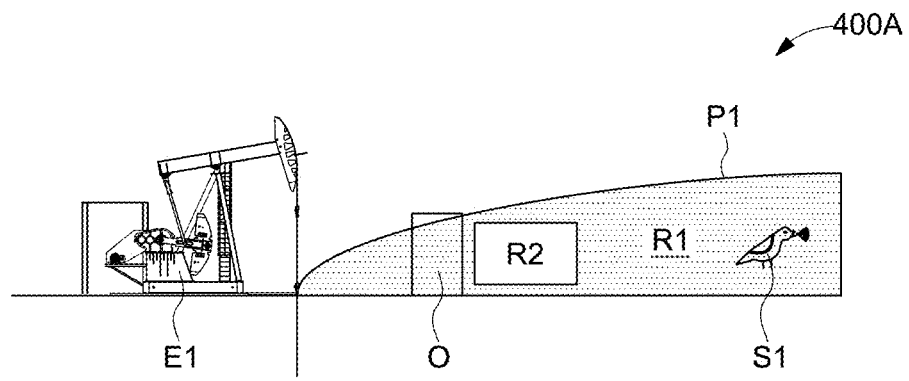
FIGS. 4A-4B illustrate a front view and a top view, respectively, of an example site that includes an emission source, in accordance with an illustrative configuration of the present disclosure.
Figure 4B:
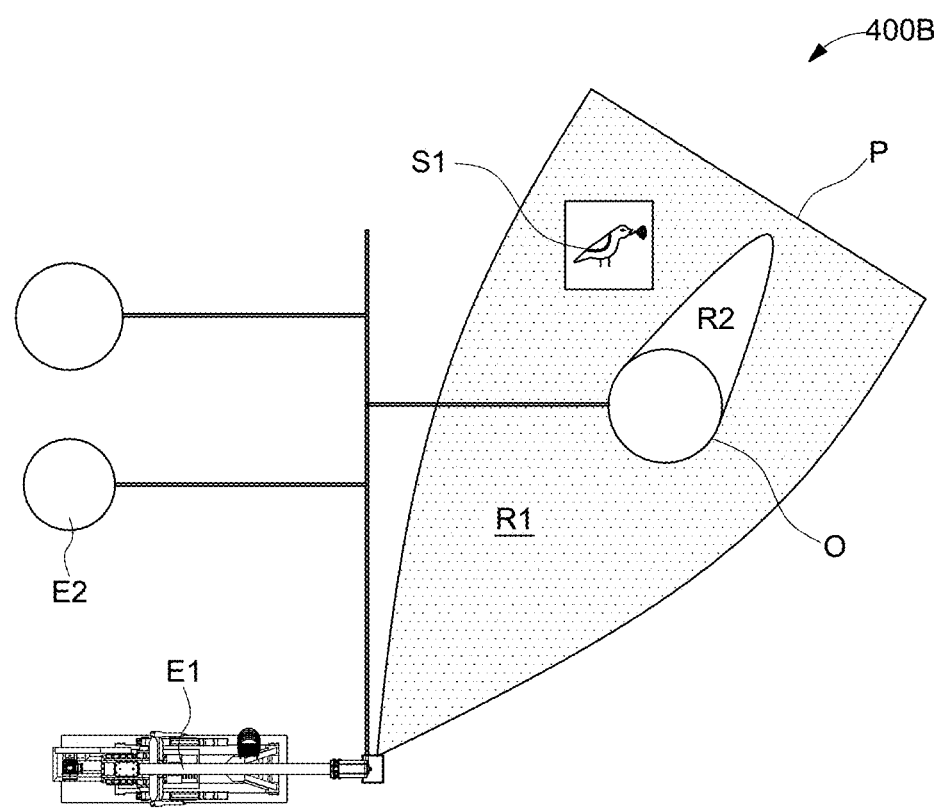

For example, FIGS. 4A-4B illustrate a front view 400A and a top view 400B, respectively of an example site. The site may include multiple potential emission sources E1, E2, etc. Further, the site may include a sensor S1. In the scenario depicted in the FIGS. 4A-4B, a target compound C1 is emitted from the source E1 and forms a plume P1 covering a region R1. Further, an obstruction O is present which may obstruct the plume P1. As such, the obstruction may result in a region R2 within the region R1 where the target compound C1 is not present or is minimally present. The sensor S1 which may be lying within the region R1 but outside the region R2 may detect the target compound C1.

Figure 4C:
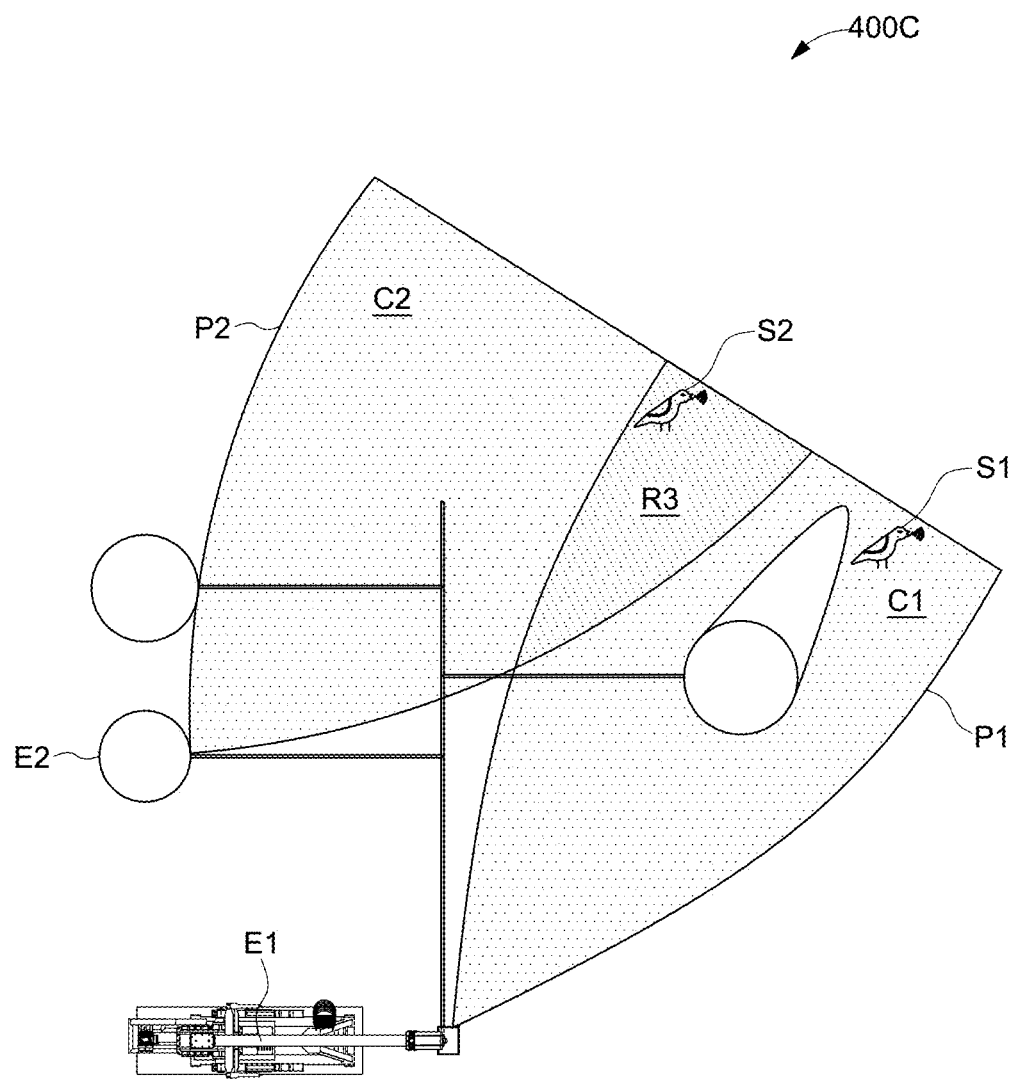
FIG. 4C illustrates a top view of a scenario with respect to an example site that includes multiple emission sources, in accordance with an illustrative configuration of the present disclosure.

Referring now to FIG. 4C, a top view 400C of another scenario with respect to an example site is shown where mixing of multiple target compounds takes place. As shown in the FIG. 4C, the site may include multiple potential emission sources E1, E2, etc. Further, the site may include the sensor S1 and S2. Target compound C1 is emitted from the source E1 and forms the plume P1. Further, a target compound C2 is emitted from the source E2 and forms a plume P2. The plumes P1 and P2 merge in a region R3. As such, the region R3 includes both the target compound C1 and the target compound C2. The sensor S1 which may be lying outside the region R3 may detect only the target compound C2. The sensor S2 lying in the region R3 detects both the target compounds C1 and C2 and therefore generates a confounding signal.

FIG. 3C presents how a sensor system may be deployed in the field in a manner accounting for terrain, potential source location, transport obstacles and wind pattern. The underlying principle for uncovering a source is to sample from the plume of said source when the wind direction and speed point (in an average sense) form a line from the emission source to the sensor system.

Figure 5A:
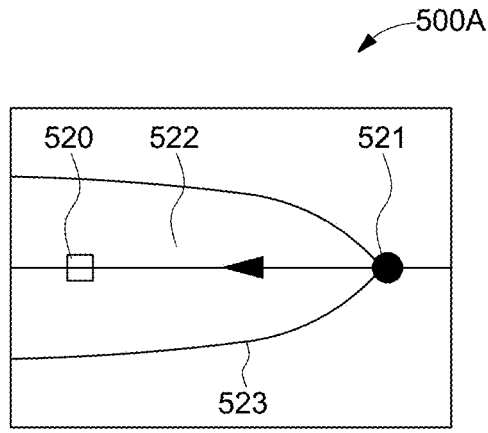
FIGS. 5A-5D illustrate multiple cases of the transport of a compound from a source to a sensor, based on wind direction, wind speed, and dynamic wind effect, in accordance with an illustrative configuration of the present disclosure.
Figure 5D:
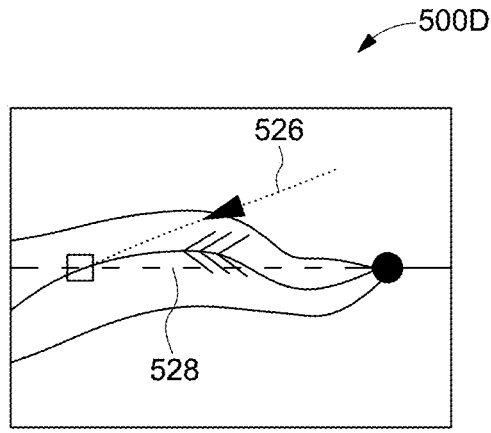
Figure 5B:
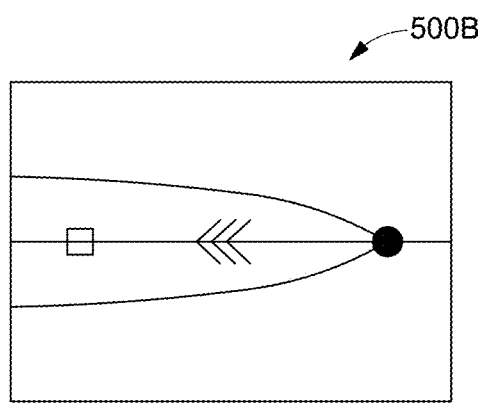
Figure 5E:
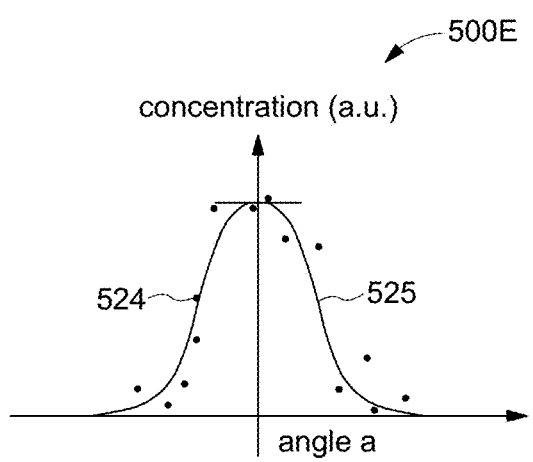
FIG. 5E illustrates a graph related to the concentration across the cross section of an emission plume, in accordance with an illustrative configuration of the present disclosure.
Figure 5C:
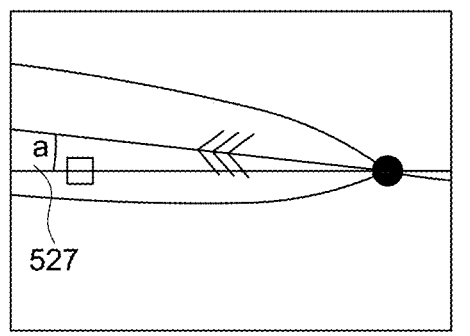

The fundamental principles of this plume detection are detailed in FIGS. 5A-5E. FIG. 5A presents a symbolic top view 500A of the transport of an emission plume 523 from a source 521 to a sensor system 520 via transport denoted by streamline 522. In reality, the plume 523 may not be contiguous and may have a complex three-dimensional shape. FIG. 5A presents the transport in the case of a steady medium-speed wind pointing directly to the sensor system 520. FIG. 5B illustrates a similar symbolic top view 500B but with a faster wind speed. FIG. 5C illustrates another symbolic top view 500C showing effect of a change in wind direction. FIG. 5D yet another symbolic top view 500D showing the effect of a tortuous streamline. FIG. 5E illustrates a symbolic representation 500E of construction of a plume cross-section using the wind direction to 'scan' across the plume.

Comparing FIG. 5A to FIG. 5B, it can be observed that an increase in speed may result in a narrower plume extent since the plume spread is determined by a balance between diffusion and turbulent mixing, and advection, and at higher wind speeds, horizontal advection becomes the dominant force. This results in a change in an observed concentration at the sensor system 520, namely that a maximum concentration observed across the plume may be higher in the case of higher wind speeds. However, higher wind speed can also result in more turbulent mixing in some conditions which may influence this result, particularly resulting in a large spread of measurements of maximum concentrations. This change from low speed to high speed clearly denotes the importance of wind speed in transport, and therefore the necessity to measure wind speed when measuring concentrations of the emitted compounds.

In FIG. 5C, the average wind transport is shifted angularly compared to the direct line from the source to the sensor as in 5A and 5B. Angle 527 is denoted "a". In idealized conditions, an increase in "a" may result in a reduction of the observed plume concentration. The concentration in an idealized plume is maximum at the center. In practice, due to turbulence, the plume may be branched, and its cross-section profile may not follow a regular pattern like the one shown in FIG. 5E. FIG. 5E presents an idealized profile of the cross section of the plume as measured by the sensor system 520. The sensor system 520 may sample the plume at different angles and register an associated concentration point 524. When sufficient numbers are obtained, a fit of a point cloud 525 can be obtained. If the measurements occur in idealized conditions when the wind speed, temperature and other parameters beside wind direction are stable, the plume flux may be calculated using a simple mass conservation equation by multiplying the area concentration of the plume cross section by its normal speed and by estimating the plume concentration in the height direction. This approach may be taken using plume theory for the estimation of the plume geometry and using a mobile sensor across the plume cross section to estimate the average plume concentration.

One illustrative configuration instead uses shifts in wind direction to estimate the plume average concentration, as depicted in FIG. 5E. Another, more precise embodiment is given in the description of the inverse model used to estimate emission source and flux. The wind may change dynamically during transport from the source to the sensor system 520, as shown in FIG. 5D. FIG. 5D shows a case where the transport from source to sensor is on average direct as denoted by an average flow direction 528 but may have a dynamically tortuous path. Moreover, a wind direction as sensed by the sensor system 520 is shown as vector 526. This exemplifies that in case of dynamic wind or when the topology influences the actual path taken by air flow, the source position may not be given by the wind direction measurement at the sensor system or at the source. This exemplifies the need for modeling of the air flow in the vicinity of the sensor to better understand the transport of the emission from a source to a sensor system when dynamic effects, obstructions, topology, or other effects may influence the transport.

Figure 6A:
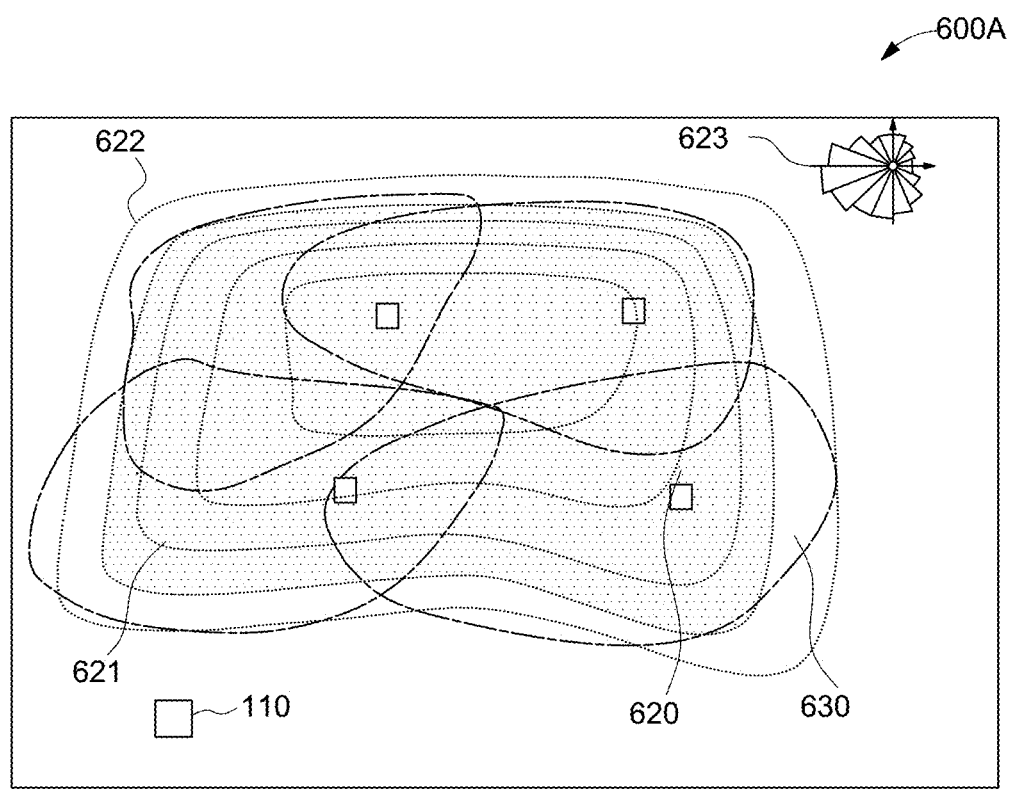
FIGS. 6A-6B show two symbolic maps of sensor network deployments for a diffuse source area and for point sources, respectively, in accordance with an illustrative configuration of the present disclosure.
Figure 6B:
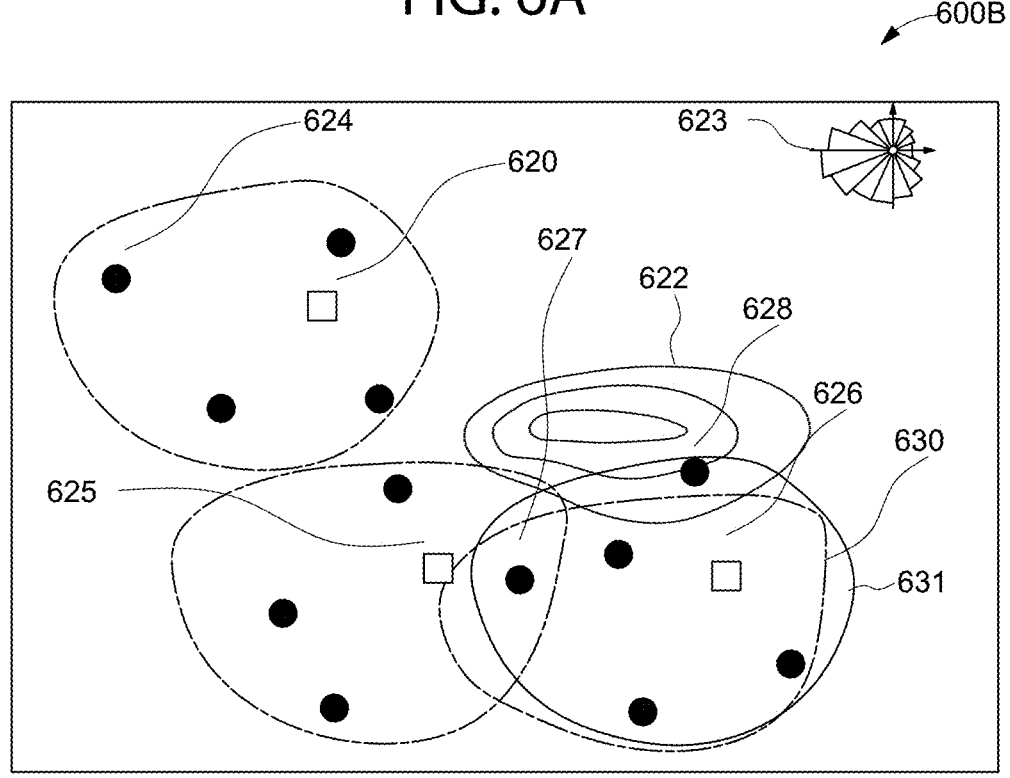

FIGS. 6A-6B illustrate symbolic maps 600A and 600B of sensor network deployments for a diffuse source area and for point sources, respectively. The symbolic map 600A of FIG. 6A is constituted of two sensor networks, for a large diffuse source akin to a landfill. The symbolic map 600B of FIG. 6B is for a site with multiple point sources, akin to an onshore natural gas field with multiple well pads. In both cases the wind speed and direction distribution are given by the wind speed rose 123.

FIG. 6A shows four sensors 620 deployed on a mound that is akin to a landfill. The isoclines 622 denote the altitude change and the greyed area 621 the diffuse sources. The dotted line 630 indicates the detection threshold of the sensor 620. It should be noted that a quasi-total coverage of the diffuse source is realized by the sensor placement choice and that the area of detection of each sensor is influenced by both the wind pattern and the topography of the land. Such a complex detection area may not be easy to define without a digital twin simulation without redundant coverage necessitating more sensor systems to be deployed. The diffuse source may further be divided into sectors that have equivalent emission contribution to each sensor and consider sensor area detection overlap.

FIG. 6B illustrates the deployment of sensors in a field with many sources (indicated by solid black circles) 624 and three sensors (indicated by white hollow squares) 620, 625, 626. Sensor 620 detection area (dash-dot line surrounding the sensor 620) is mainly influenced by the wind pattern, while sensors 625 and 626 are also influenced by the topology noted by the isocline 622. The grey line 631 denotes the hypothetical detection area of the sensor 626 if the topology was not considered. Note that the source 628 is not actually contained in the detection area of any sensor even though could hypothetically detect source 628 were topology (isocline) 622 not present. Similarly, source 627 may be detected by either of the two sensors; in practice, source 627 may be partially occulted by another source from the point of view of sensor (or sensor system) 626. The coverage of the source 627 by the sensor system 1625 provides distinguishable coverage of the source 627.

The examples of FIGS. 6A and 6B exemplify the need for optimization in the deployment of a sensor network and the need for a fine understanding of the effect of external variables on the behavior of emission transport. The methods presented herein cover both conceptual, experimental and simulation approaches to optimize a network of deployed sensors that monitor emissions in real time. In some configurations, the systems can include an air quality monitoring system and/or other systems or components disclosed herein. FIG. 6A illustrates the system including the air quality monitoring system 60 discussed in connection with FIG. 1 and can be programmed to receive output from the sensors 620, 625, 626 via wireless, wired, and/or optical connections.

One embodiment of the disclosure concerns a method to generate emission predictions, preventative maintenance predictions, and targeted equipment and process replacement from existing data streams that may be interpreted to quantify, qualify, localize, and reduce emissions. Another embodiment of the technology can be a hybrid inspection method that may involve additional sensing modalities beyond static, real-time sensors, namely, fence-line monitoring, operator-based, drone-based, plane-based, or satellite-based systems that may or may not be used in conjunction with stationary sensing.

Another embodiment of the technology is a method for the monetization of emission reduction by taking advantage of financial markets. The systems can be programmed to identify emissions, track emissions (e.g., track for emissions credits/compliance), and manage emissions by controlling equipment, generating schedules (e.g., operation schedules), etc. For example, the system can be programmed to monetize emission reductions based on one or more monetization algorithms. Sensor deployment techniques discussed in connection with FIG. 3C can be used to select the number of sensors, sensor position, etc.

The quality of the information obtained by existing datastream analysis may be enhanced by increased inspection frequency such as through the static monitoring device described herein and may justify the usage of static monitoring for some sites. However, real-time monitoring may not be the most cost-effective method for inspection for all the sites or at all times. A method for dynamically selecting the most effective inspection method based on the datastream described above is presented herein. Other inspection methods such as operator-based, drone-based, plane-based, satellite-based or fence line monitoring may be used together with continuous monitoring from static sensors to provide a holistic approach to monitoring. Indeed, some sites may have topological, environmental, technical and/or economic criteria that would make a particular embodiment of a compound monitoring system more worthwhile from an emission reduction perspective at a certain time. For example, densely packed oil and gas production sites that produce large volumes, as well as compressor stations, tank batteries or other concentrated sites with a large number of potentially emitting sources, may be ideal for continuous or close to continuous monitoring; while remote, sparsely located, low production volume sites may gain from being monitored less frequently by aerial inspection. Similarly, the emission risk over the life of the equipment may change significantly and as a result the optimal inspection strategy may change over time. Finally, the overlay of different inspection methodologies may change the inspection requirements of a site based on the availability of information about emission at a certain time and the rapidity with which a particular inspection embodiment can be deployed.

The technology can dynamically blend different data-sensing methodologies to provide a hybrid method which may utilize more of the advantages of multiple configurations of disparate systems for the measurement, quantification, localization, qualification of emission of certain compounds as well as for the reduction of such emissions, all while optimizing for capital utilization. Different types of sensors can be used on a site. The number of sensors, sensor functionalities, and/or sensor configurations can be selected based on the sensor locations.

In particular, the analysis from the existing data-stream informs about which sites are large emitters and which sites are emitting less. If an operator has many sites, such as in the upstream oil and gas industry, having different approaches for different sites may be a cost-effective emissions reduction strategy. For example, in the oil and gas upstream market, approximately 20% of sites may be responsible for 80% of the leaks by volume. This would suggest that the budget dedicated for monitoring, as well as the frequency of monitoring, should be highest in this 20% of sites. These sites may be identified through the data streams presented herein. Prevalence of failure points also influences the necessity of monitoring. An oil and gas site, for instance, with numerous wells and other systems such as separation units, tanks, injection pumps and so on will have more emissions and more leaks than a site with lower equipment counts. The average number of failures or leaks per equipment type may be predicted from a maintenance report, and the combined number of failures or leaks per year for a site may be calculated from these equipment failures or leaks or extracted from the maintenance or leaks report data streams. In particular, frequency of monitoring may be set in relation to the frequency of failure or leaks of a certain site. In some cases, the frequency of monitoring may be predicted as lower than the mandated inspection frequency, in which case no additional monitoring may be required. In other cases, the frequency of monitoring needed may be higher than the mandated inspection frequency in which case additional monitoring may be prescribed. The schedule of that additional monitoring may be selected to minimize the uncertainty associated with the state of the equipment from the site. For instance, for a site mandated to be monitored once a year, it may be necessary to add the additional monitoring step at the six-month mark such that monitoring inspections are equally spaced in time. This scheduling may be influenced by other factors such as seasonality, operational state of the site, density of neighboring site or other factors. For instance, monitoring for butane gas leaks in Alberta during wintertime may not be sensible because butane does not vaporize at low temperatures. Another factor of interest is the intensity of the leaks. Scientific literature suggests that the emission of typical airborne compounds of interest (e.g., methane or other compound) can generally follow the 80/20 rule, meaning that 20% of the largest leaks emit 80% of the compound. This means that this larger type of leak, while less common, emits more than an average-sized leak. Other rules can be determined and used. Identifying the sites or equipment with the highest probability of large leaks can inform the order or priority of inspection, maintenance, etc. A third factor of interest is the intermittency of leaks. Some leaks are intermittent at a certain frequency, and this informs the frequency at which the measurement needs to be performed. A fourth factor is the response time of the operator. Indeed, certain sites are inaccessible, and the operator may not be able to respond rapidly to a leak, in which case the rapidity of measurement may matter less than the certainty of it. A fifth factor is the possibility of overlapping inspection methodologies. For example, one may use satellites at the field level to inform of leaks sufficiently large to be detectable from space, which may dynamically trigger inspection visits to target sites, reducing the cost of monitoring a large area. A sixth factor is the proximity of various sites. Indeed, sites sufficiently close together may be inspected by a single static monitor, therefore amortizing the instrument cost over multiple sites.

Leaks are not the only type of emission that may be observed, identified, and/or analyzed at a site. A large fraction of emissions can result primarily from the activity or from the operation of the equipment. If the total emission is of importance from an inspection standpoint, real-time (continued or periodic) or frequent inspection methods may be of interest.

Externalities such as weather and remoteness of the site may influence the best method to be used. High cloud cover can for instance block observation from space and harsh weather conditions and low communication infrastructure can influence the cost of deployed sensors.

The return on investment for a certain inspection method may reduce with frequency: once initial leaks are repaired, a long period of time may elapse before new leaks occur, meaning that the probability of leaks is dependent on the history of the site and may widely vary. Thus, the use of data-stream and statistical inference of the conditional probabilities of leaks is tremendous for the prediction of potential leaks and appropriate inspection schedules and methods. The proposed method weights these various factors to select the most appropriate inspection embodiment.

The advantage of each inspection method is described herein. Static monitoring through a single sensor or through a network of sensors may provide high-frequency measurements, with tailored detection thresholds based on the distance of the sensor to the potential source, and address at least equipment identification, as presented in the disclosure. Because the sensor is static, the cost of the inspection is determined by the number of potential leak points observable in the detection area, site size, and the cost of ownership of the sensor system, which may be higher than a mobile solution on a per-year basis. The advantage of a mobile solution could be the possibility of amortizing the measurement price on a larger number of potential sources to the cost of lower frequency and/or lower detection limit. For instance, drones may be used once per quarter and have a low detection limit, while satellites may have a 24-days frequency and cover large swaths of land but only detect the largest leaks. Monitoring by plane falls in between the satellite and the drone, and thus could offer a balance of price, inspection frequency, and detection limit. Manual site inspections or operator-based inspections are driven by the cost of labor and a variable measurement quality depending on operator competency, but these inspections can generally pinpoint the leak location and partially assess their size.

Similarly, a larger firm could amortize labor costs across many sites, whereas smaller firms may pay more in labor costs per site.

In certain configurations, methods can identify the best method or methods for site inspection at a given time by calculating the advantages and disadvantages as a function of the expected site emissions volume and frequency and the externalities associated with the measurements in order to maximize a measured emission volume while minimizing the cost. The higher volume of measured emission may then be used to provide a higher volume of reduced emissions.

One embodiment of the technology involves using monitoring information and data streams to enhance product recovery and emission reduction and to generate income by emissions reduction credits, such as carbon credits or added value at the sale of the product via product labeling or certification. For example, this technology could be employed to certify low-emission natural gas or biogas, or some other certification or labeling of interest, in the case that the measured compound is a greenhouse gas, valuable gas, or commoditized product.

Indeed, the detection of greenhouse gases emitted during operations may be used as a quantification of carbon-equivalent intensity. In general, carbon credits in a cap-and-trade market may be allocated based on the carbon emission offset compared to competitors for a certain product intensity. For example, a certain number of carbon allocations may be provided for a certain number of MMBtu produced in a gas field. An operator that emits fewer greenhouse gases and can demonstrate that fact through emissions quantification may demonstrate emitting less per MMBtu produced, and thereby earning carbon credits which may be sold on the carbon market for a profit. In another embodiment, in the case of an open carbon market, the measurement of carbon equivalent emissions through the use of the method proposed herein may be presented as a carbon offset method directly by quantifying the amount of carbon equivalent reduced through the application of the method and may be sold as such. For instance, the use of a static sensor may lead to the reduction of methane emissions that if related to the cost of operation of the sensor, may lead to a significantly lower cost per carbon ton equivalent than the spot price. The reduction of the carbon footprint may be evaluated, and the difference may be sold as a carbon offset on the carbon market.

The other path to revenue that commoditizes emission monitoring and reduction resides in the certification of the product being produced by the monitored equipment. Indeed, the environmental impact of the condition in which the product is produced may impact the certification of the product to certain standards, which in turn can be sold at a higher price than a product that does not meet the standard. For example, the emissions due to the production of natural gas may reach levels that make the greenhouse gas impact of natural gas on par with burning coal, negating its value proposition of being a more environmentally friendly fuel. Some certified natural gas products attain a price that is up to 1% to 10% higher than the non-certified commodity. The monitoring of emissions and reduction of emission disclosed herein can help producers meet the strict rules and burden of proof associated with certification.

In all or some configurations, the method can include the quantification of emissions and emission offsets obtained by a hybrid/dynamic inspection, preventative maintenance, and operational optimization for the generation of low emission certified products, carbon offsets, or the reduction of carbon credit consumption through emissions reductions and total emission reporting.

The construction and arrangement of the elements of the systems and methods as shown in the configurations are illustrative only. Although a number of configurations of the present disclosure have been described in detail, those skilled in the art who review this disclosure will readily appreciate that many modifications are possible (e.g., variations in number of sensors, sensor position, removal and addition of sensors, weather detection elements, etc.) without materially departing from the novel teachings and advantages of the subject matter recited. For example, elements shown as integrally formed may be constructed of multiple parts or elements. Any embodiment or design described herein is not necessarily to be construed as beneficial or advantageous over other configurations or designs. Accordingly, all such modifications are intended to be included within the scope of the present disclosure. The order or sequence of any process or method steps, including the steps discussed in connection with the algorithms discussed herein may be varied or re-sequenced according to alternative configurations. Other substitutions, modifications, changes, and omissions may be made in the design, operating conditions, and arrangement of the configurations without departing from scope of the present disclosure or from the spirit of the appended claims. For example, the techniques disclosed herein can be used to monitor other locations, including inside factories, warehouses, shipping centers, homes, apartments, or the like.

The present disclosure contemplates systems and methods which may be implemented or controlled by one or more controllers to perform the actions as described in the disclosure. For example, in some configurations, the controller, whether part of a sensor, computing device, etc., may be configured to process data from sensors, users, or operators and model, calculate, and perform one or more simulations within different data sets, tables or maps described, perform any or all described algorithms and any others similarly suitable, and control operation of any disclosed parts or components in a manner necessary or appropriate for proper function, operation, and/or performance of any disclosed systems or methods.

Figure 7:
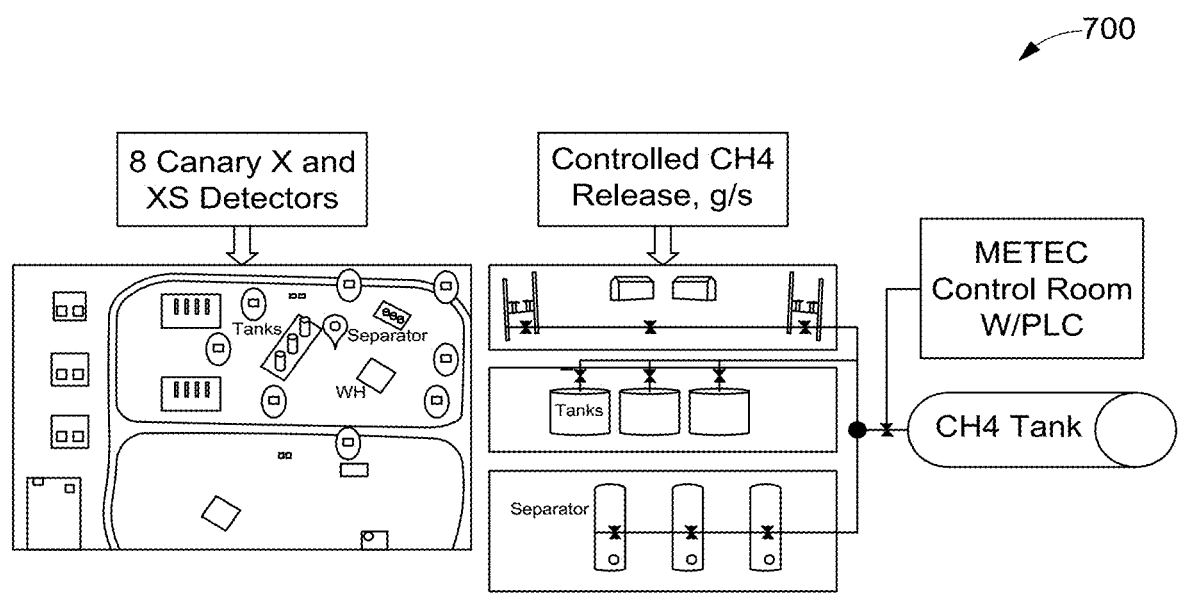
FIG. 7 illustrates a workflow diagram showing a framework of quantification, in accordance with an illustrative configuration of the present disclosure.

FIG. 7 illustrates a workflow diagram 700 depicting a framework of quantification. As shown in, the quantification workflow diagram of FIG. 7, as field testing progresses, time series data from individual detectors are streamed to Amazon Web Servers (AWS) in real time. The data is comprised of signals from the sensing element as it responds to local methane concentrations, at the location of the detector in addition to wind speed in m/s and wind direction measurements (0° to 360°). Detector data are pushed to AWS for pre-processing before being passed on to the developed model for emission rate and source location prediction. When the data is downloaded into local servers, it is passed on to an extraction, transformation, and loading (ETL) computational pipeline before being ready for the prediction algorithm. The concentration data (ppm) is augmented by GPS coordinates of the individual sensors and a single file encompassing the experimental time of a given test (typically one hour) before being ingested by the model.

Figure 8:
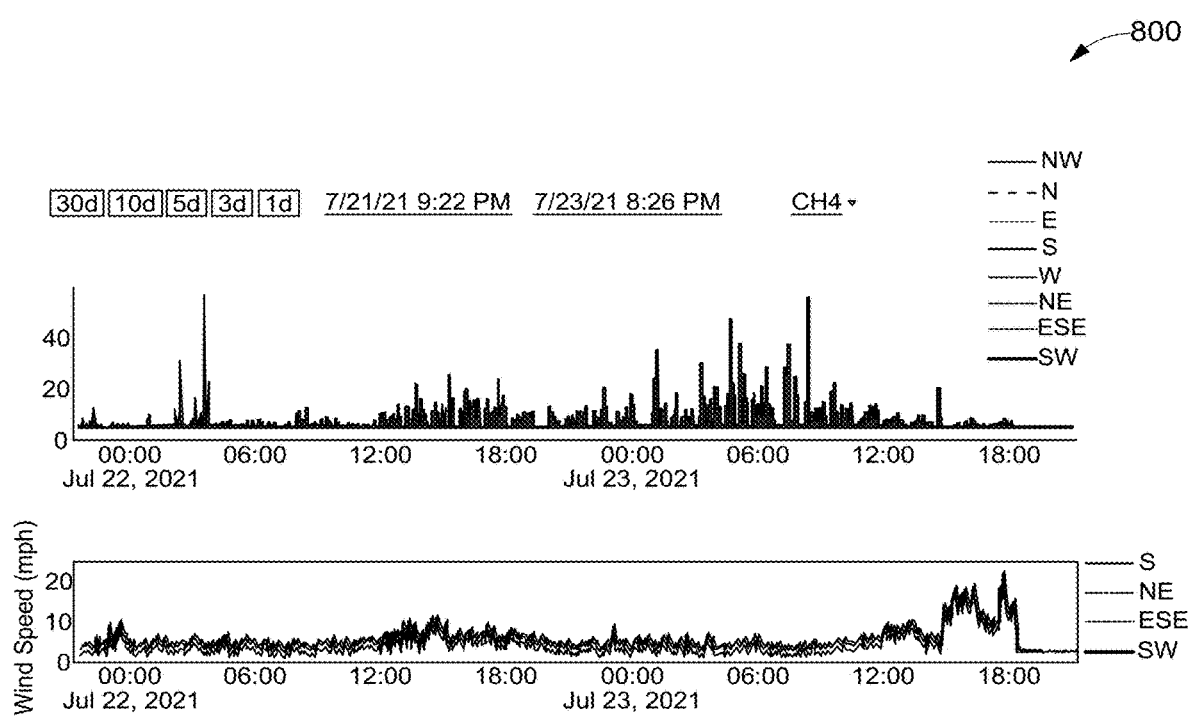
FIG. 8 illustrates an example wind rose diagram defined by a weather data for a site (e.g., METEC site), in accordance with an illustrative configuration of the present disclosure.
Figure 9:
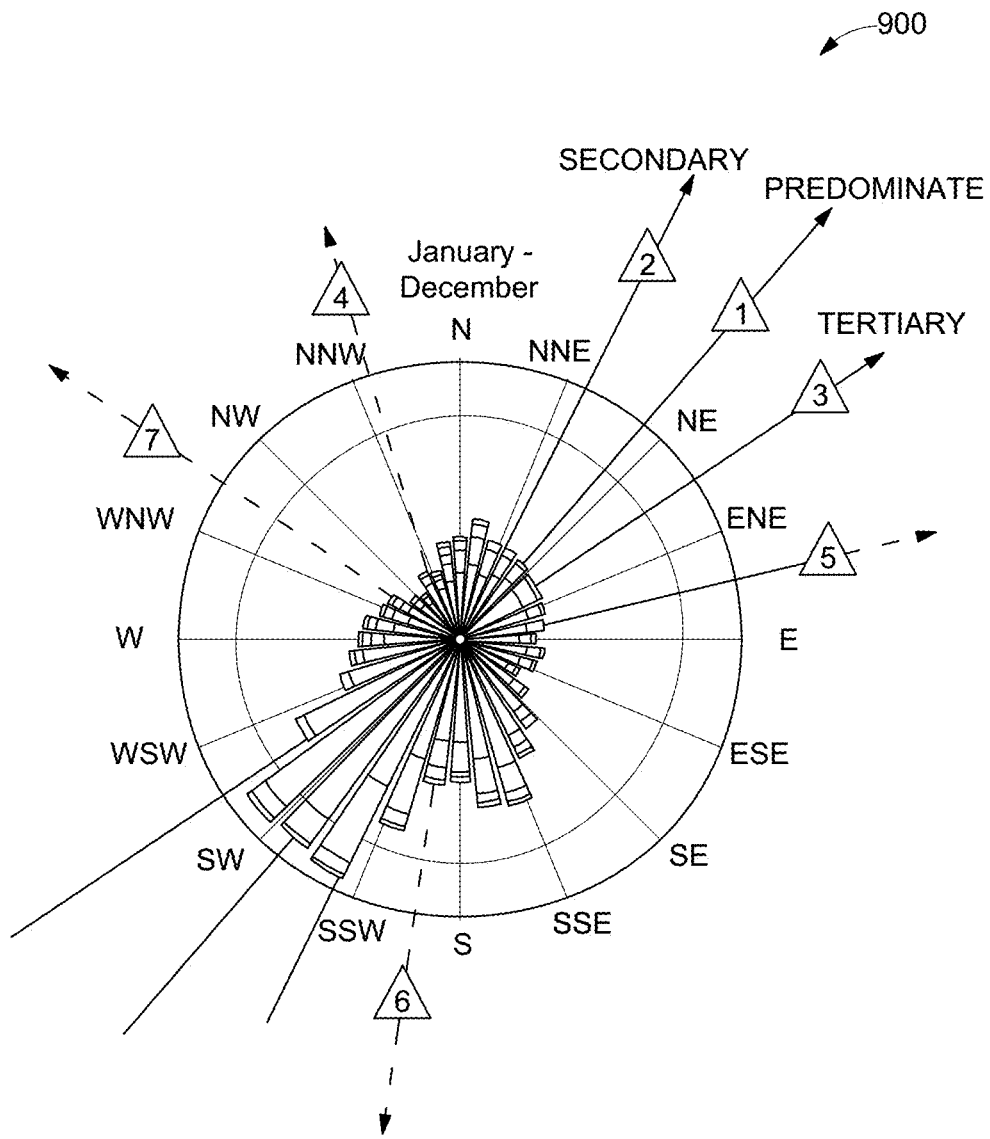
FIG. 9 illustrates another example wind rose diagram including a predominate wind direction, a secondary wind direction, and a tertiary wind direction over a period of time (e.g., a year), in accordance with an illustrative configuration of the present disclosure.
Figures 10A, 10B, 10C:
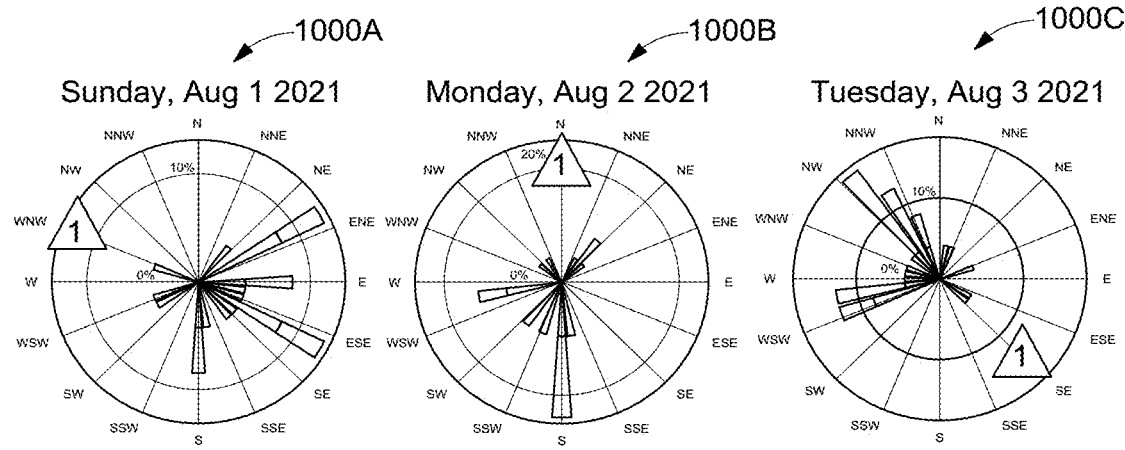
FIGS. 10A-10G illustrate a wind rose diagram for each of a week including a predominate wind direction (shown as "1") during that day, in accordance with an illustrative configuration of the present disclosure.
Figures 10D, 10E, 10F:
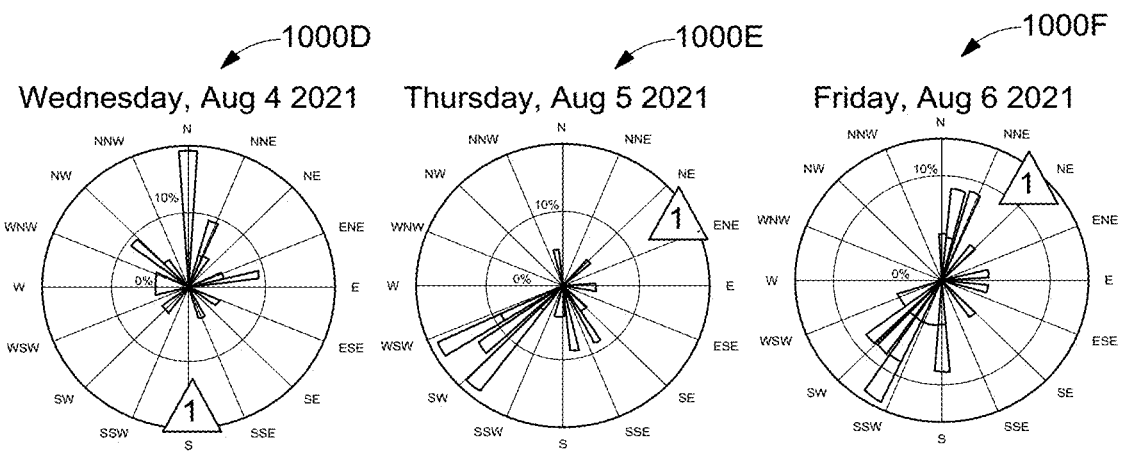
Figure 10G:
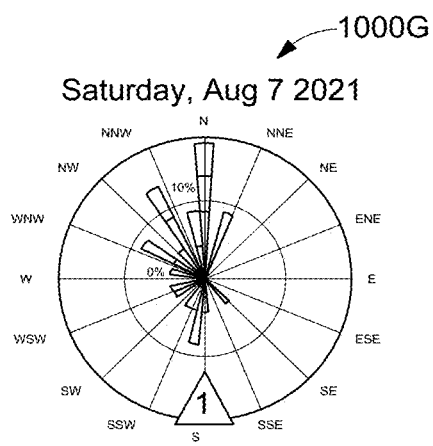

Detector placement is initially decided prior to the testing campaign by studying multiple wind rose diagrams from historical weather stations data and identifying the most likely dominant wind directions around the location of the testing. Visualization of time series and hourly aggregated statistics of concentration, wind speed, and wind direction from all detectors and weather sensors enable the user to assess node engagement and to adjust the experimental setup, if necessary, to maximize alignment of sensors with the dominant methane dispersion directions by the prevailing wind. FIG. 8 illustrates an example wind rose diagram 800 defined by a weather data for a site (e.g., the METEC site). As will be appreciated, wind rose diagrams are graphical charts that characterize the speed and direction of winds at a location. FIG. 9 illustrates another wind rose diagram 900 including a predominate wind direction (shown as "1"), a secondary wind direction (shown as "2"), and a tertiary wind direction (shown as "3") over a period of time (e.g., a year). FIGS. 10A-10G illustrates a wind rose diagram for each of a week, respectively including a predominate wind direction (shown as "1") during that day. In other words, a wind rose diagram 1000A for Sunday (Aug. 1, 2021), a wind rose diagram 1000B for Monday (Aug. 2, 2021), a wind rose diagram 1000C for Tuesday (Aug. 3, 2021), a wind rose diagram 1000D for Wednesday (Aug. 4, 2021), a wind rose diagram 1000E for Thursday (Aug. 5, 2021), a wind rose diagram 1000F for Friday (Aug. 6, 2021), and a wind rose diagram 1000G for Saturday (Aug. 7, 2021).

Figure 11:
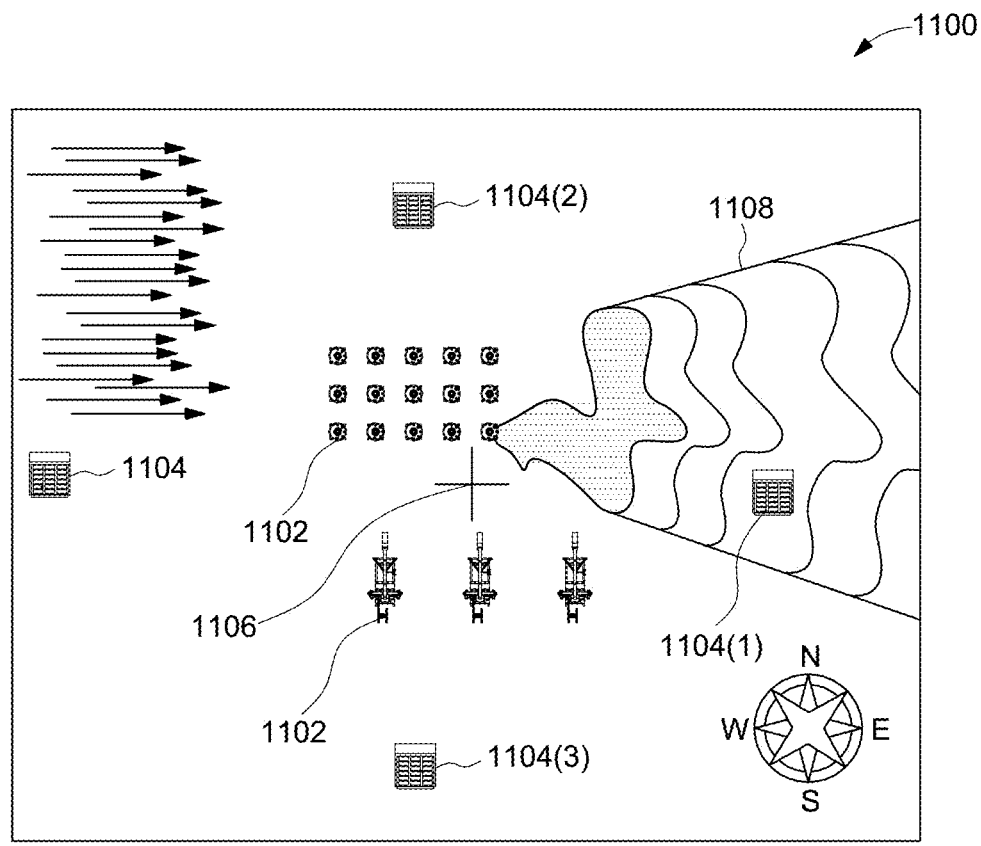
FIG. 11 illustrates a plan of an example site under monitoring, in accordance with an illustrative configuration of the present disclosure.

Referring now to FIG. 11, a plan 1100 of an example site under monitoring is illustrated. The site may include equipment 1102, and a plurality of air quality monitors 1104 (as mentioned before, air quality monitors may also be referred to as sensors, sensors systems, sensing system, detectors in this disclosure). Further, a method of installing an air quality monitor system at the site may be performed. The method may include surveying the site by procuring: an equipment log of a plurality of leak-prone equipment 1102 at the site, a centroid 1106 of the leak-prone equipment, and a wind-rose diagram representative of wind at the site. Surveying the site may further include procuring a 3D point cloud of topography of the site and procuring a 3D point cloud of the leak-prone equipment 1102 of the site. Upon surveying, the wind-rose diagram may attached be to the site.

The wind rose diagram is already illustrated in the FIG. 9. As shown in the FIG. 9, the wind-rose diagram may include the predominate downwind direction ("1"), the secondary downwind direction ("2") angularly offset from the predominate downwind direction ("1"), and a tertiary downwind direction ("3") angularly offset from the predominate downwind direction ("1") and oppositely disposed from the secondary downwind direction ("2").

A predominate air quality monitor 1104(1) may be installed at the site in the predominate downwind direction ("1") from the centroid 1106 at a location where the predominate air quality monitor 1104(1) has a maximal angular separation between the leak-prone equipment 1102. Before installing the predominate air quality monitor 1104(1), a site operator may be instructed to install a first vertical object (for example, a post, a pole, or any vertically aligned shaft) where the predominate air quality monitor 1104(1) will be installed. The predominate air quality monitor 3504(1) may be installed to the first vertical object. Further, a secondary air quality monitor 1104(2) may be installed in the secondary downwind direction ("2") from the centroid 1106 where the secondary air quality monitor 1104(2) has minimal observational overlap with the predominate air quality monitor 1104(1). Before installing the secondary air quality monitor 1104(2), the site operator may be instructed to install a second vertical object where the secondary air quality monitor 1104(2) will be installed. The secondary air quality monitor 1104(2) may be attached to the second vertical object. Furthermore, a tertiary air quality monitor 1104(3) may be installed in the tertiary downwind direction ("3") from the centroid 1106 where the tertiary air quality monitor 1104(3) has minimal observational overlap with the predominate air quality monitor 1104(1) and with the secondary air quality monitor 1104(2). Before installing the tertiary air quality monitor 1104(3), the site operator may be instructed to install a third vertical object where the tertiary air quality monitor 1104(3) will be installed. The tertiary air quality monitor 1104(3) may be attached to the third vertical object.

The predominate air quality monitor 1104(1), the secondary air quality monitor 1104(2), and the tertiary air quality monitor 1104(3) may be configured to obtain the first weather reading of local weather from a weather station and modify transmission of an emission data according to the weather reading obtained from the weather station. This is already explained in conjunction with FIG. 3A. As mentioned before, the sensor system (or the air quality monitor) may include a weather sensor system 311 (also referred to as weather station 311). The weather sensor system 311 may include sensing elements to measure wind speed and direction. The wind speed and direction may be measured by a combination of a wind vane and an anemometer or by an anemometer alone, such as in the case of using an ultrasonic anemometer.

Further, a predominate connector may be communicatively coupled to the predominate air quality monitor 1104(1). Further, a predominate weather station may be communicatively coupled to the predominate air quality monitor 1104(1) at the predominate connector. Similarly, a secondary connector may be communicatively coupled to the secondary air quality monitor 1104(2). Further, a secondary weather station may be communicatively coupled to the secondary air quality monitor 1104(2) at the secondary connector. In the same way, a tertiary connector may be communicatively coupled to the tertiary air quality monitor 1104(3), and a tertiary weather station may be communicatively coupled to the tertiary air quality monitor 1104(3) at the tertiary connector.

The weather data from each of the predominate weather station, the secondary weather station, and the tertiary weather station may be transmitted to a cloud computing device (for example, "Amazon Web Services" or simply "AWS"). This weather data may be analyzed to determine redundant or non-contributing weather data. Further, at least one of the predominate weather station, the secondary weather station, and tertiary weather station may be removed. As will be appreciated, all the weather stations (i.e., the predominate weather station, the secondary weather station, and the tertiary weather station) may not contribute to the analysis, and therefore, the non-contributing weather station may be discarded.

In some configurations, a ground temperature probe may be communicatively coupled to at least one of the predominate air quality monitor 1104(1), the secondary air quality monitor 1104(2), and the tertiary air quality monitor 1104(3). This ground temperature probe may provide a ground temperature. One of the predominate air quality monitor 1104(1), the secondary air quality monitor 1104(2), and the tertiary air quality monitor 1104(3) may transmit the ground temperature (for example to the "AWS"). Based on the ground temperature, a diffusion-area of emissions may be estimated. It may be noted the ground temperature, or the diffusion-area of emissions may be fed to the plume model for analysis.

In an illustrative configuration of the system, the environmental sensors are not collocated to the target gas sampling point. As explained in this disclosure, the collocation of environmental sensors such as the anemometer with the gas analysis sensor intake may improve the interpretation of the data because of the effect of topology and obstacles on the transport of the target gas. To this end, as mentioned above, the weather station may include the anemometer which may further include a due-North indicia. The weather station may be communicatively coupled to the predominate air quality monitor 1104(1) at the connector. The due-North indicia of the anemometer may be aligned to North of the Earth. A first weather reading of local weather may be transmitted from the weather station. The weather reading of local weather may include a wind speed and a wind direction.

In some configurations, multiple sensors, for example, three sensors (i.e., the predominate air quality monitor 1104(1), the secondary air quality monitor 1104(2), and the tertiary air quality monitor 1104(3)) may be deployed at the site, for example, a gas pad. If the topology and obstacles configuration allow the environmental variables such as wind direction and wind speed are only marginally variable from the perspective of the different sensors deployed at the site. It may then be possible to reduce the number of environmental sensors, such as anemometers, by only positioning a single environmental sensor for multiple gas sensors. For example, on the site with three gas sensors, only one anemometer may be collocated with one of the three gas sensors, while no anemometer is used with the remaining two gas sensors. This allows for a reduction of the cost of deployment with only a marginal reduction of the efficacy of localizing, quantifying or qualifying emissions.

One illustrative configuration of the disclosure concerns the deployment of sensor to a site and the collection of site metadata. As mentioned above, once a site is selected for continuous monitoring, information about the site (i.e., surveying) is first collected in order to identify the best deployment locations. First site boundary and topologies are obtained. This may be offered by the site owner, or by consulting a satellite map databank. For example, in the case of a natural gas pad, the edge of the 50×75 m pad may be identified, and the terrain may be obtained using lidar maps from google earth. Then, the emplacement of equipment groups that are to be observed are identified. This may be done by inspection of the site, LIDAR mapping or by satellite image analysis. The equipment groups type, geometries and location are collected to establish the geometry and location of sources in the predictive simulations. For example, a trained operator may identify the equipment group and their size from satellite image and add then to the site topology of the digital twin. Additional local topology information about the terrain surrounding the site may also be added to the digital twin to improve simulations, for example by adding obstacles like trees and buildings, following a process similar to the identification of equipment groups. The next step or concurrent step is to identify local weather patterns. Historical wind conditions of the site may be extrapolated from the wind conditions at a proximate weather station, in particular the identification of the primary and secondary wind directions. For example, the cli-MATE tool from the Midwestern Regional Climate Center database may be used to construct historical wind rose from reference weather stations in the proximity of the site. Once the historical weather data is obtained, the position of the sensors may be decided. The sensors may follow deployment rules that are site dependent. In general, the objective is to maximize separate observations of the observed equipment groups or areas of interest. This means that the angular separation of the centroid of each equipment group from the perspective of the sensor should be maximized to enhance plume differentiation. Second, the sensor may only be deployed in an allowed area of the site. In the case of oil and gas pads, the site boundary is generally allowable as it is part of the site and far enough away from the hazard zone around the equipment groups. Third, the position of the sensor shall maximize the number of plume observations, this means that sensor shall be placed downwind of the observed equipment groups. With a limited number of sensors, this means that sensors shall be placed with regard to the principal (i.e., predominate) and secondary wind directions extracted from the historical weather data. If additional sensors are allowed, these shall be placed to maximize angular coverage of the equipment groups.

The first sensor (or predominate air quality monitor) is therefore placed close to the downwind direction of the principal (or, predominate) historical wind direction from the centroid of the equipment groups in a position that maximizes angular separation of the equipment groups. Assuming a secondary wind direction exists, a second sensor (or secondary air quality monitor) shall be placed downwind of the secondary historical wind direction in front the centroid of the equipment groups in a position that maximizes separation of the equipment groups and minimizes observational overlap with the first sensor. Subsequent sensors shall follow equivalent rules if additional secondary wind direction exists or maximize angular coverage of the site. For example, in a three-sensor deployment on an oil and gas site, the first sensor position may be selected north of the site because of the south principal wind direction. The second sensor may be positioned southwest because of the secondary northeast wind direction and the third sensor (or tertiary air quality monitor) location may be set east of the site to maximize coverage. The exact position of the sensor may be shifted by few degrees based on local conditions and angular coverage. In the precedent example. The third sensor location may be shifted to southeast because this would give it a better angular position for observing all the equipment groups.

Once the prospective sensor position is established, the map of potential sensor location is shared with the operator of the site for approval and for site preparation. The operator may move or object to certain locations due to risk, need of access or future development project. The position may then either be corrected to accommodate this or the alternate location provided by the operator accepted. The operator may then proceed to the site preparation. For anchored sensors, this means the position of an anchor (e.g., a T-post) for the fastening of the sensor. Once the site preparation is over, the sensor systems may be deployed at the specified location of the site.

Optionally, the position of the sensor may further be shifted. This may happen if the operators plan requires the sensor to be removed (e.g., the site may be modified) or if the observation data from the continuous monitoring of the site is suboptimal (e.g., the historical wind data from a proximate weather station was not applicable to the site). A new plan from the data acquired by the deployed sensors may then be conceived to relocate the sensor to more favorable locations.

Figure 12:
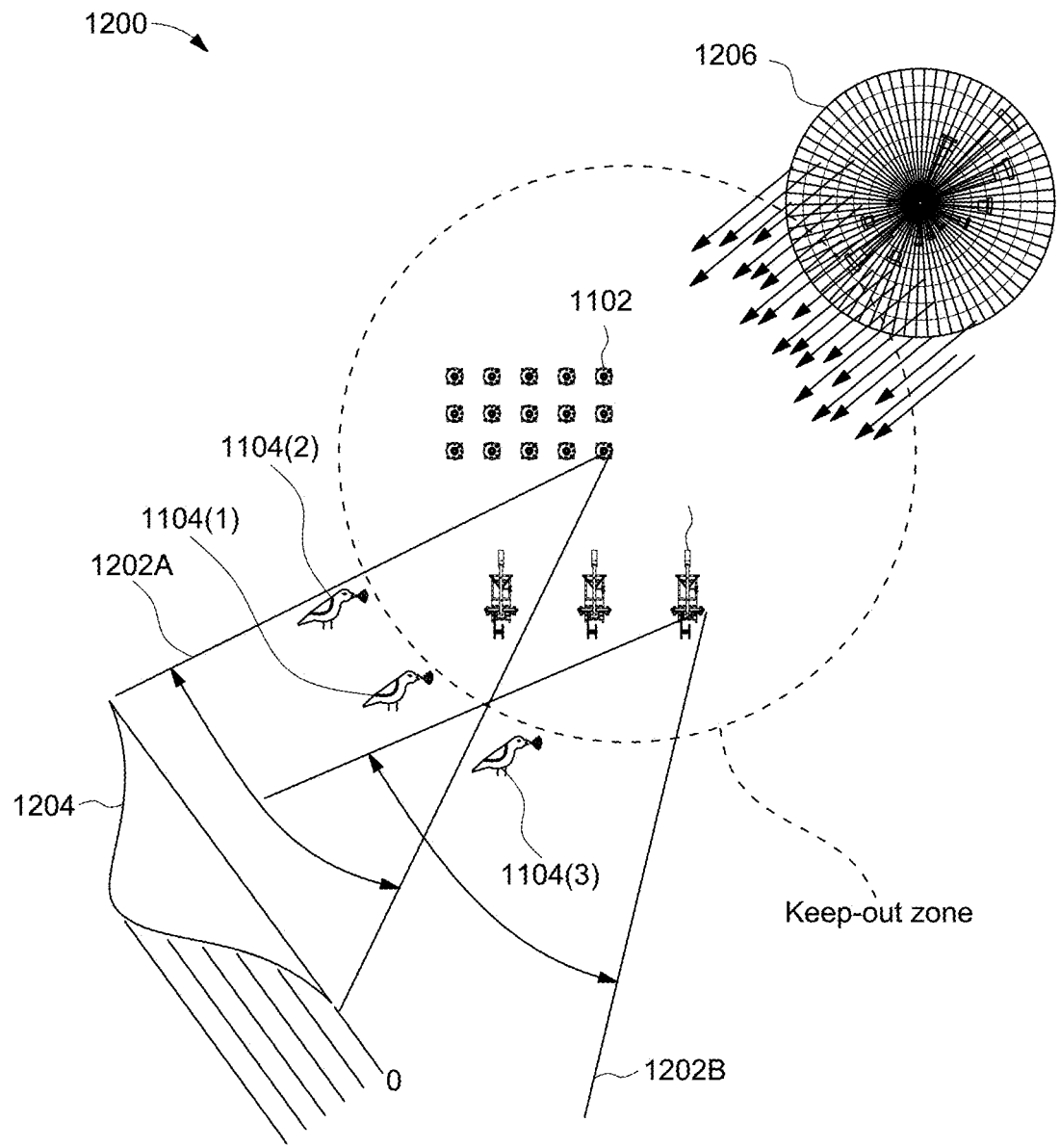
FIG. 12 illustrates another plan of an example site under monitoring, in accordance with an illustrative configuration of the present disclosure.

In particular, in order to identify a source of a target chemical at a site, a computer-implemented method may be performed. Referring now to FIG. 12, a plan 1200 of an example site under monitoring is illustrated. The site may include equipment 1102, the plurality of air quality monitors 1104 (as mentioned before, air quality monitors may also be referred to as sensors, sensors systems, detectors in this disclosure). According to the method, the predominate air quality monitor 1104(1) may be provided which may include a first sensor responsive to the target chemical and a first location information at which the predominate air quality monitor 1104(1) is located at the site. Further, a first concentration of the target chemical at the predominate air quality monitor 1104(1) may be measured as a function of a wind speed and a wind direction. It may be noted that other factors (for, example air temperature, air pressure, etc.) other than the wind speed and the wind direction may be taken into consideration as well. The wind speed and the wind direction may be measured using a wind sensor (e.g., an anemometer) which may be provided at the air quality monitor (as shown in FIG. 3C). The wind sensor may be located at the first location at the predominate air quality monitor 1104(1) or the second location at the secondary air quality monitor 1104(2). In case of an emission, a plume 1108 of the emission (i.e., the target chemical) may occur at the site. Further, the wind speed and the wind direction may be obtained from a wind rose diagram 1206.

In some configurations, the predominate air quality monitor 1104(1) may include a second sensor responsive to a second chemical that is different than the target chemical. Further, the method may include creating a containment table defined as a composition of liquid contained at each of the plurality of sources. The composition may include at least the target chemical or the second chemical. A second concentration of the second chemical at the predominate air quality monitor 1104(1) may be measured, and the measurements of each of the target chemical and the second chemical to the containment table may be compared. The source of the target chemical or the second chemical may be determined according to the containment table, and the identified source may be outputted to a computer device (for example, the mobile device 152).

As mentioned earlier, the air quality monitors (i.e., the predominate air quality monitor 1104(1), the secondary air quality monitor 1104(2), etc.) may obtain measurements of the concentration of air samples at regular intervals (i.e., a predetermined frequency/cadence). Further, under some conditions, the frequency/cadence of obtaining the measurements may be automatically increased or decreased for more accurate emission detection. To this end, in some configurations, a wind-speed-threshold algorithm indicative of improved confidence of sensor readings by the predominate air quality monitor 1104(1) and the secondary air quality monitor 1104(2) may be predetermined. As such, the wind speed may be monitored, and the wind speed may be compared to the wind-speed-threshold. At the wind-speed-threshold, cadence of the measuring of the first concentration may be increased.

In some configurations, a population of the actual emissions measurements may be transmitted to the cloud server (e.g., "AWS"). As mentioned above, some measurements may have noise, and therefore, may not be suitable for performing the plume analysis and may be discarded. To this end, a highest first concentration of the population of emissions measurements may be identified. Further, a lowest first concentration of the population of emissions measurements may be identified. Furthermore, an SNR threshold may be determined. For example, an SNR ratio may be determined by dividing the first concentration by a difference between the highest first concentration and the lowest first concentration. The individual readings of the first concentration that have an SNR ratio below the SNR threshold may be discarded.

Additionally, in some configurations, the secondary air quality monitor 1104(2) may be provided that may include a second sensor responsive to the target chemical, and a second location information at which the secondary air quality monitor 1104(2) is located. A second concentration of the target chemical at the secondary air quality monitor 1104(2) may be measured as a function of the wind speed and the wind direction. According to the method, a first bearing of the source relative to the predominate air quality monitor 1104(1) may be identified using the simulation model. Further, a second bearing of the source relative to the secondary air quality monitor 1104(2) may be identified using the simulation model. Thereafter, in some configurations, coordinates of the location of source of the target chemical may be identified using the first bearing and the second bearing. Further, the source may be identified from a plurality of possible sources of the target chemical by correlating the identified coordinates of the source with the emission rate. The coordinates and the emission rate of the identified source may be outputted to the computing device.

According to the method, a concentration profile may be built according to a plurality of inputs. The plurality of inputs may include concentration of emission and the wind direction. Further, a wind speed dependent variable may be created according to the concentration profile sourced as the wind speed fluctuates. The location of the emission source may be determined according to the plurality of concentration profiles effected by the wind speed.

Further, in some configurations, a maximum of the first concentration of the target chemical at the predominant air quality monitor along with the wind direction may be logged. Further, a plume centerline may be established as the wind direction less 180 degrees from the location of the predominant air quality monitor, to thereby identify a direction of the source of the target chemical from the predominant air quality monitor.

In one embodiment, the composition of the emission may be an indicator for refining the localization of emission. Emissions may contain different compounds based on their origin in the site. Indeed, the product may be separated or transformed at the site. If multiple target compounds are monitored, the ratio of these may indicate different processes.

For example, in natural gas extraction, natural gas from the well may contain various compounds such as methane, heavier hydrocarbons such as ethane, propane and butane, trace VOC such as H2S, Toluene, additives such as methanol (for preventing hydrate formation) and additional gas and liquids such as CO2 and water. This multiphase flow is then separated in the separator, and liquids are stored in tanks. As a result, emission prior to separation, during separation, after separation and from the tanks may have different ratios and composition of these compounds. If the sensor system can detect more than one compound, or group of compounds, refinement can be obtained in process step identification. For example, a VOC sensor may be used in conjunction with a methane sensor to differentiate emission within the process. Methane emissions with less VOC may come from post separation methane gas while emission with more VOC may come from the tanks.

In one configuration, virtual emissions and/or simulation models created by a mathematical model may be utilized. One illustrative mathematical model is the Navier-Stokes function in fluid mechanics that describes the flow of fluids (such as, for example, the flow of air). The Navier-Stokes function may be derived from an equation devised by Swiss mathematician Leonhard Euler to describe the flow of incompressible and frictionless fluids. Other physicists and mathematicians (e.g., Sir George Gabriel Stokes) have evolved the model to improve both two-degree and three-degree models. Complex vortices and turbulence, often referred to as chaos, which occur in three-dimensional fluid (including gas) flows as velocities increase have proven intractable to any but approximate numerical analysis methods. Examples of methods include Euler's original equation, Guglielmo Marconi wireless communications models, Laplace's equation, Gaussian Plume Model (GPM), Large Eddy Simulation (LES), and the like. Navier-Stokes equations.

Figure 13:
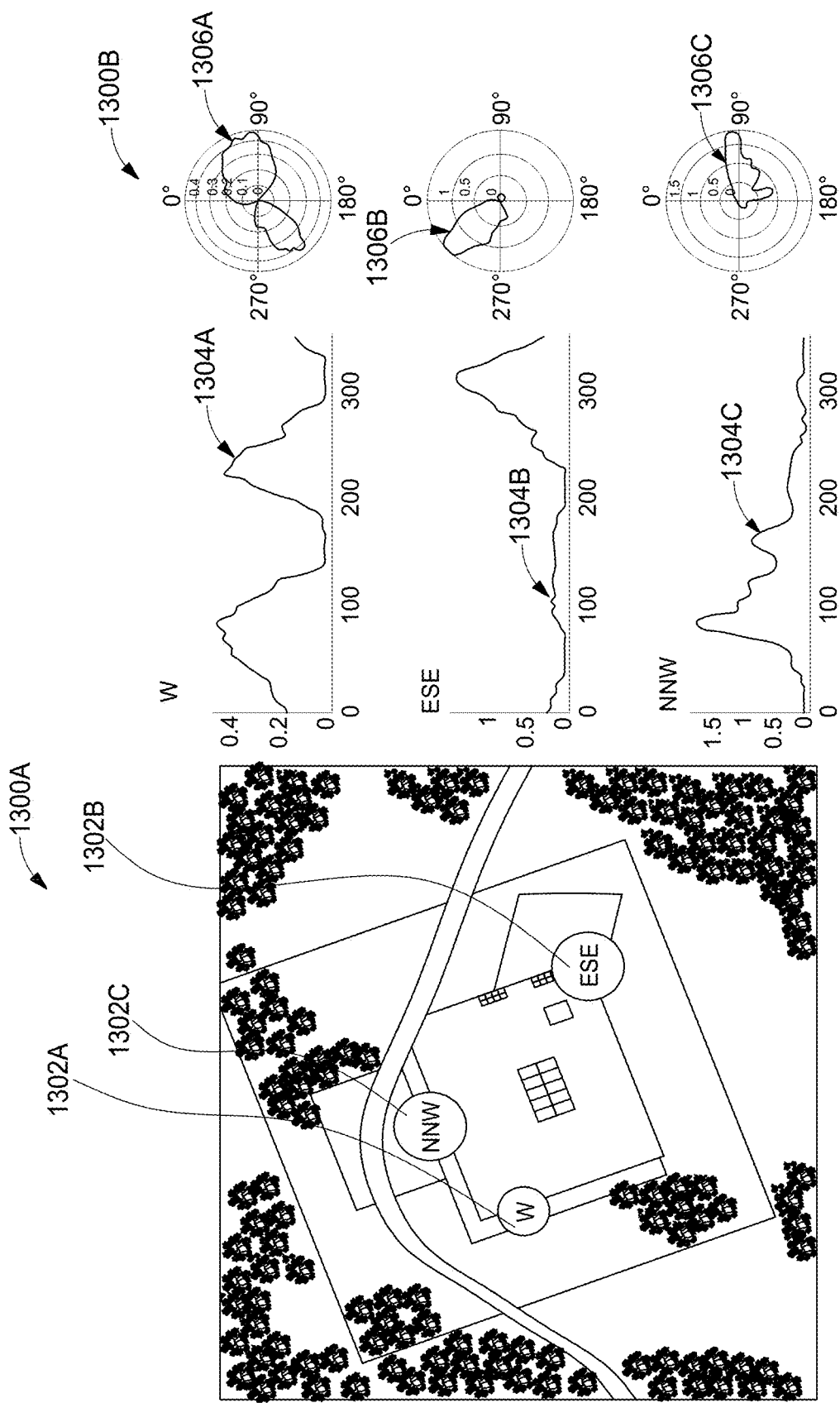
FIG. 13 illustrates a topological view of a site, and mappings charts associated with mapping of weighted mean of first predicted substance concentrations grouped in each of a predetermined of wind-direction buckets are illustrated, in accordance with some configurations of the present disclosure.

Referring now to FIG. 13, a topological view of a site 1300A, and mappings charts 1300B associated with mapping of weighted mean of first predicted substance concentrations grouped in each of a predetermined of wind-direction buckets, are illustrated in accordance with some configurations. As mentioned above, the predetermined number of the wind-direction buckets together are representative of wind-directions over 360 degrees. As shown in FIG. 13, the site includes three air quality monitors 1302A (W), 1302B (ESE), and 1302C (NNW). Corresponding to each air quality monitor, a line chart from 0-360 degrees with the y axis as the elevated concentration (ppm) and a polar chart is shown. In particular, for the air quality monitor 1302A (W), the line chart 1304A and a polar chart 1306A is shown. For the air quality monitors 1302B (ESE), the line chart 1304B and a polar chart 1306B is shown. For the air quality monitor 1302C (NNW), the line chart 1304C and a polar chart 1306C is shown. The mapping charts i.e., the line charts 1304A, 1304B, 1304C and the polar charts 1306A, 1306B, 1306C help to visualize the circular distribution of the wind-direction.

By way of an example, the prediction model (regressor model) may be used to predict the methane concentration for a time period, for example, of the last 10 days. The time period may be selected so as to ensure that data representing the wind blowing in every direction is obtained. Further, the wind-direction contribution value may be calculated for all of the predictions. The wind-direction contribution value may be an amount in parts per million (ppm) that the individual wind-direction affected the predicted ppm. All the predictions may be then grouped into 72 wind buckets (for every 5 degrees of the full circle or 360 degrees) based on the wind direction from the individual measurements. Further, a weighted Methane Mean may be calculated for each 5-degree bucket. A value function may be defined as: FeatureContribution[WindDirection]+ActualCh4−PredictedCh4. It should be noted that the function may be weighted with a recency bias. If no wind data is available for a specific wind bucket, the missing data may be filled in by interpolating it from the surrounding buckets for which data is available. In this way, for each of three air quality monitors, a weightCh4Mean value associated with a 5-degree wind bucket is obtained, that is represented in the line charts 1304A, 1304B, 1304AC and the polar charts 1306A, 1306B, 1306C.

Figure 14:
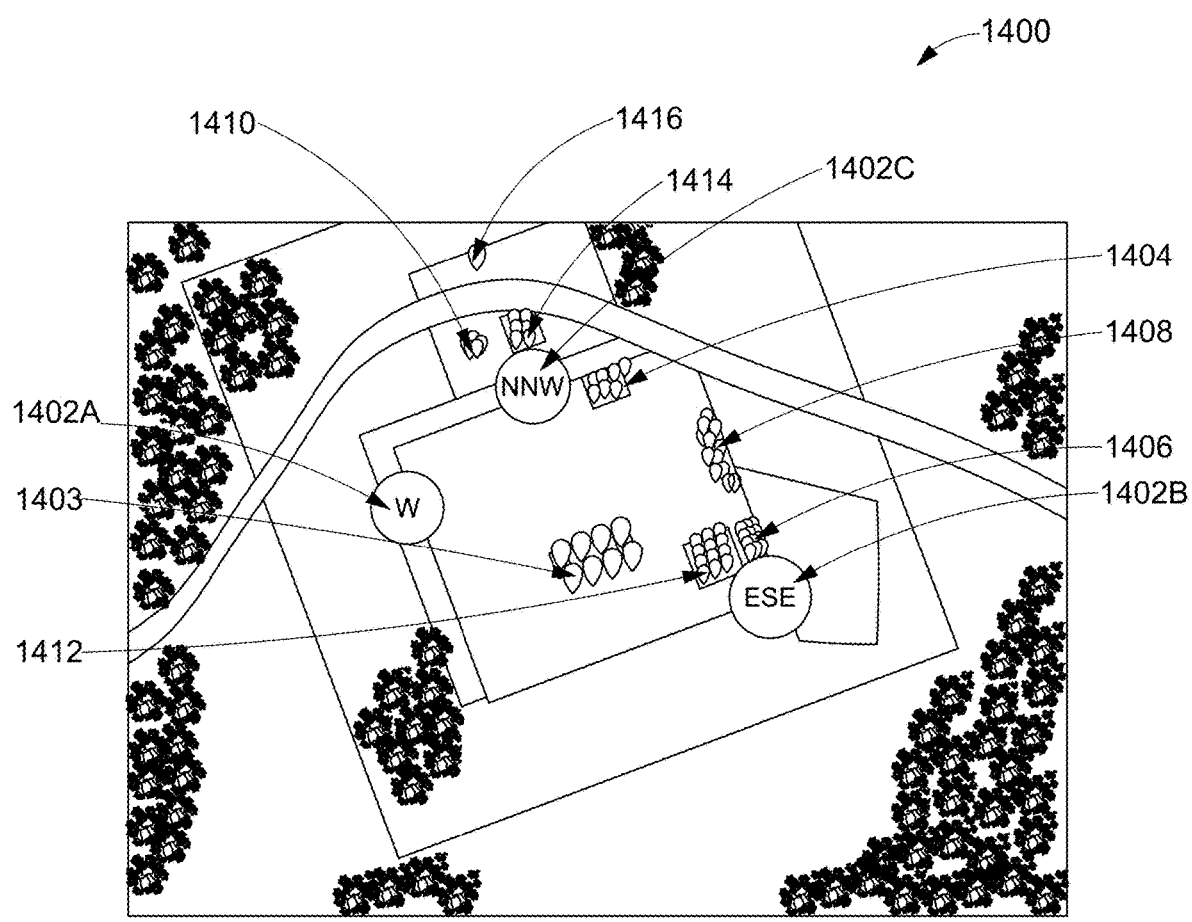
FIG. 14 illustrates an example location map for a site, in accordance with some configurations of the present disclosure.

A location map of a plurality of emission sources at a site may be obtained. The location map may include a location and an identity associated with each of the plurality of emission sources. An example location map 1400 for a site, for example, an oil rig, is shown in FIG. 14. As shown in FIG. 14, the location map 1400 includes a plurality of tags representative of an identity and a location of the plurality of potential emission sources present at the site. For example, the plurality of emissions sources may include one or more wellheads 1403, tanks 1404, separators 1406, processing equipment 1408, offsite separators 1410, flowback tanks 1412, offsite tanks 1414, and offsite wells 1416. As can be further seen in FIG. 14, some emission sources like offsite wells 1416 may be located outside the periphery of the site, and as such, the emissions from these offsite wells may sometimes also contribute to the total emission values detected at the site. Further, as shown in FIG. 13, the site may include the three air quality monitors 1402A (W), 1402B (ESE), and 1402C (NNW).

Figure 15:
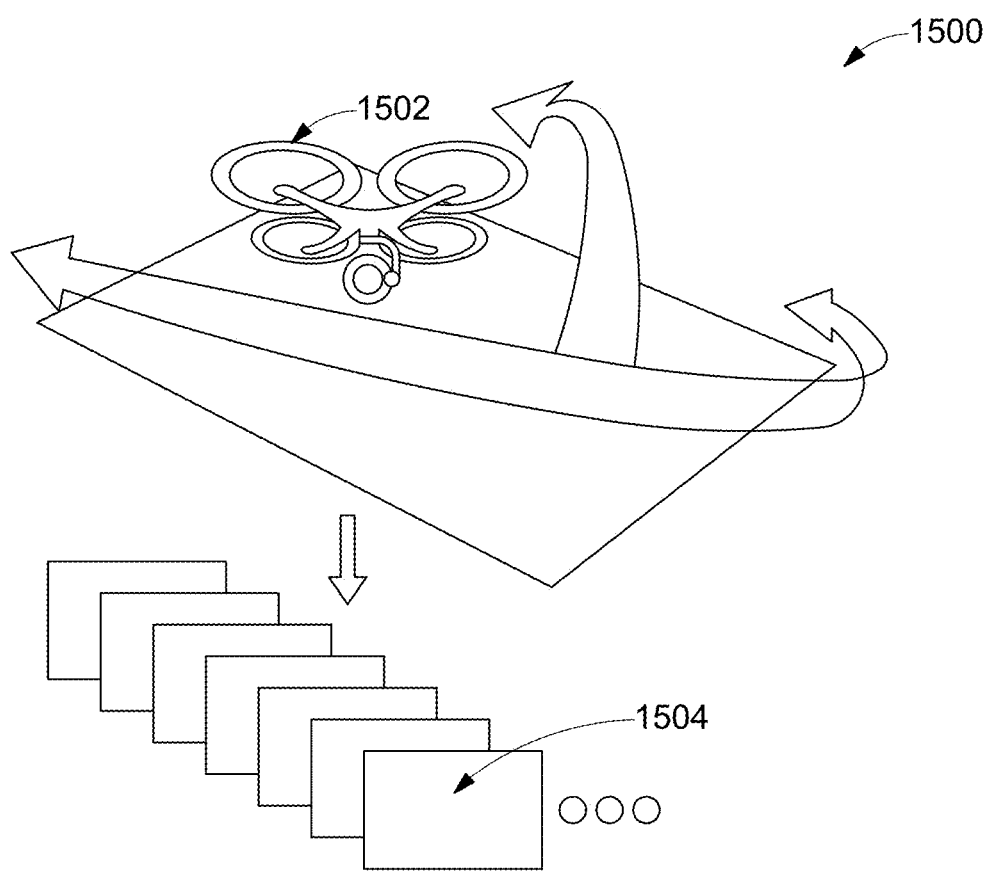
FIG. 15 illustrates a schematic view of a process of obtaining the location map using drone imagery, in accordance with some configurations of the present subject matter.

In some configurations, the location map may be obtained using drone imagery. In such configurations, the location map may be created by obtaining a plurality of two-dimensional images using the drone imagery. FIG. 15 shows a schematic view of a process 1500 of obtaining the location map using drone imagery, in accordance with some configurations of the present subject matter. For example, as shown in FIG. 15, a drone 1502 (i.e., an aerial vehicle implementing one or more still-image or video capturing cameras) may be used for obtaining a plurality of two-dimensional images 1504. As will be appreciated by those skilled in the art, the drone 1502 may be made to traverse across the location region for which the location map is to be obtained.

Once the plurality of two-dimensional images 1504 are obtained, three-dimensional measurements corresponding to the plurality of two-dimensional images 1504 may be extracted. Each of the three-dimensional measurements may include a distance between two points lying on a plane parallel to a photographic image plane, corresponding to measured associated distances on the plurality of two-dimensional images 1504, using a scale. In particular, the location map may be obtained using principles of photogrammetry for the air quality monitors. As will be appreciated, photogrammetry may be used to obtain reliable information about physical environments through the process of recording, measuring and interpreting photographic images. To this end, three-dimensional measurements may be extracted from two-dimensional data (i.e., images). The distance between two points that lie on a plane parallel to the photographic image plane can be determined by measuring their distance on the image, if the scale of the image is known. Further, close-range photogrammetry may be used that may include collection of photography from a lesser distance than traditional aerial (or orbital) photogrammetry. Thereafter, photogrammetric analysis may be applied to one photograph. Alternatively, high-speed photography and remote sensing may be used to detect, measure, and record complex two-dimensional and three-dimensional motion fields by feeding measurements and imagery analysis into computational models, so as to successively estimate, with increasing accuracy, the actual, 3D relative motions. As such, photogrammetry may be used for surveying the above site to accurately mark locations of a boundary line, equipment located on the site, and at least one ground control point to establish a point-of-truth from which the scale and orientation may be set. In one configuration, a single ground control point may be sufficient to establish the point-of-truth. However, some applications may benefit from multiple ground control points. In order to carry out the survey the site based on photogrammetry, some commercial tools may be used, for example, including but not limited to, Photo-Modeler (of Vancouver BC), Pix4D (of Prilly, Switzerland), and Topodrone (of Montreux, Switzerland).

Figure 16:
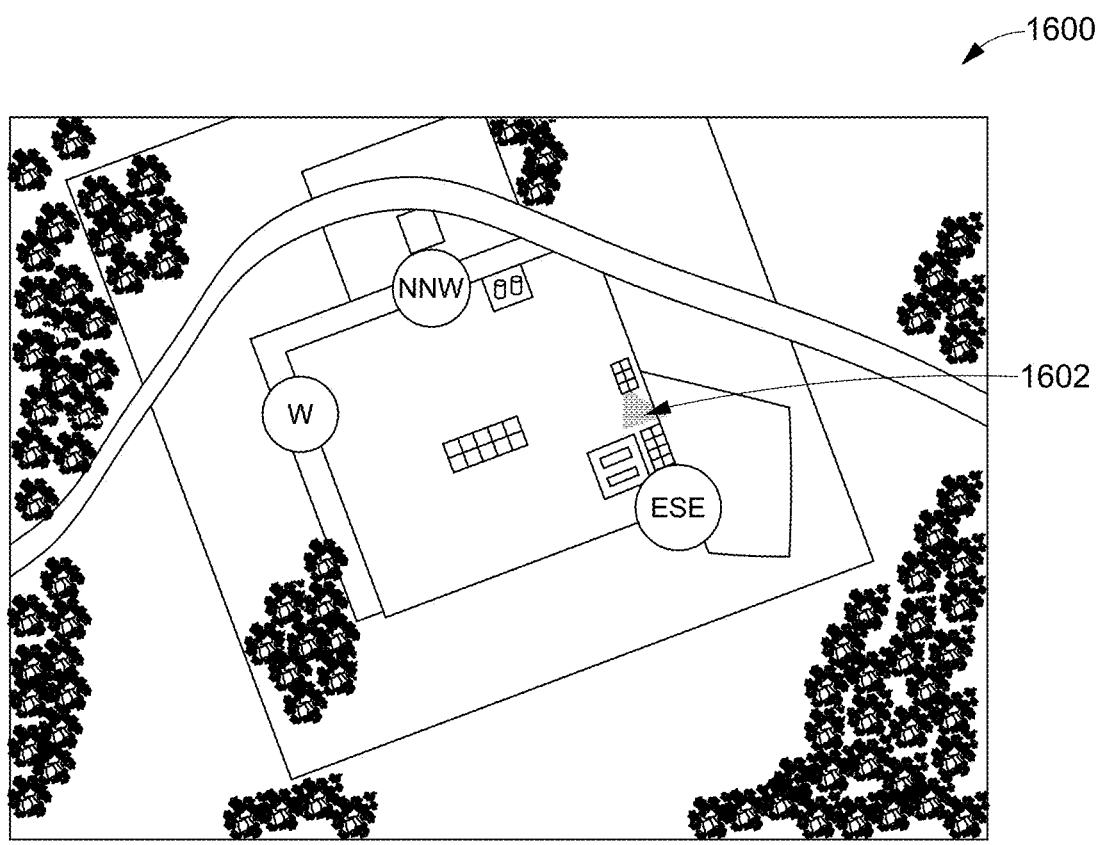
FIG. 16 illustrates a topological view of a site along with a simulated plume model for one of the emission sources, in accordance with some configurations of the present subject matter.
Figure 17:
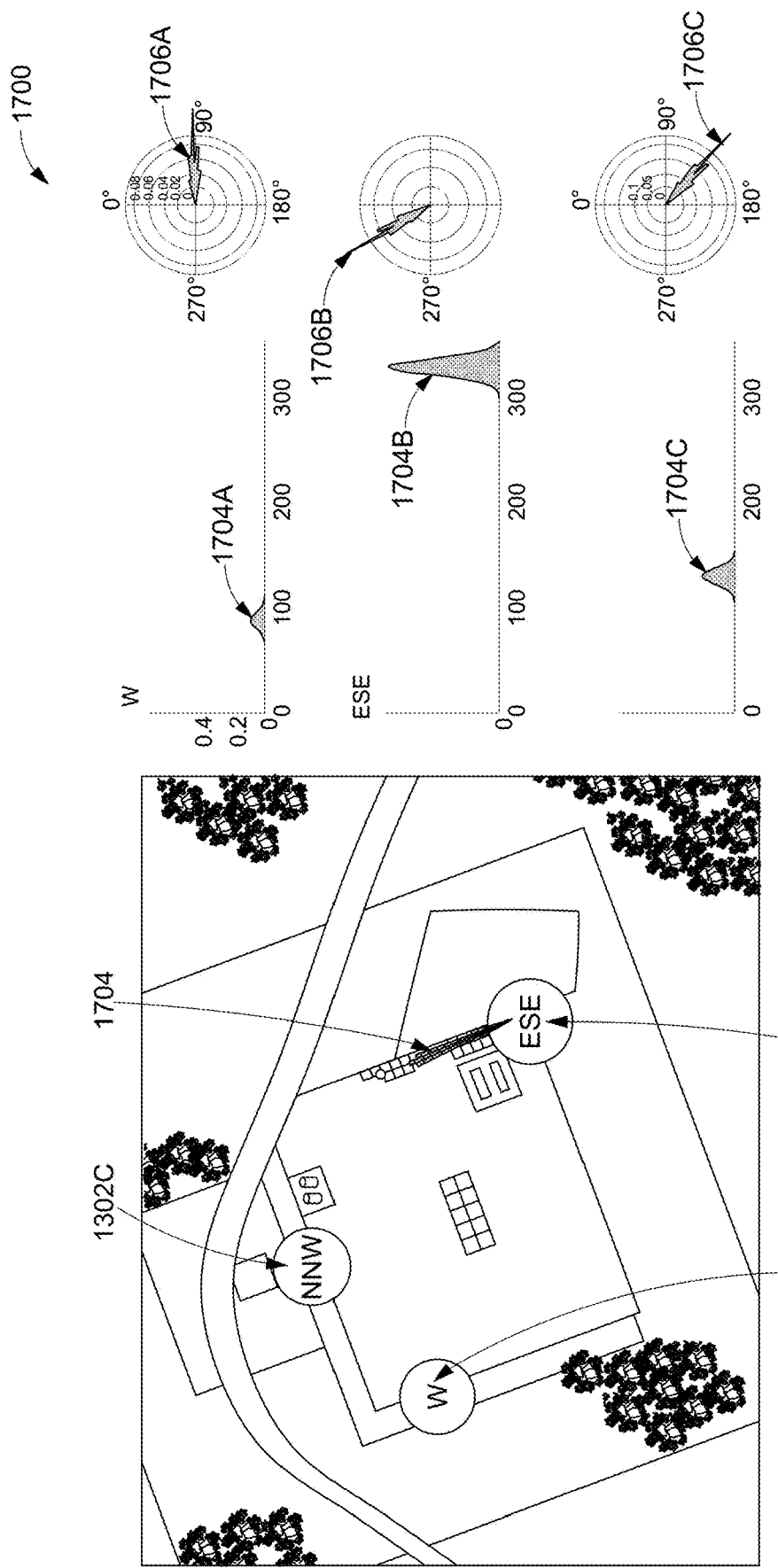
FIG. 17 illustrates a topological view of the site along with a representative Von Mises distribution for the one emission source, in accordance with some configurations of the present subject matter.

As mentioned above, FIG. 14 illustrates the location map 1400 for an example site. FIG. 16 illustrates a topological view 1600 of the site along with a simulated plume model 1602 for one of the emission sources (e.g., 1408). FIG. 17 illustrates a topological view 1700 of the site along with a representative Von Mises distribution 1704 for the one emission source (e.g., 1408). As shown in FIG. 16, the plume model 1602 may be generated using the techniques mentioned in the above-sections. The simulated plume for all the wind directions is use to fit the mapping (i.e., elevated concentration vs wind direction distribution) from the previous steps.

As shown in FIG. 17, the site includes the three air quality monitors 1302A (W), 1302B (ESE), and 1302C (NNW). It should be noted that for each of the emission sources, a representative Von Mises distribution may be generated corresponding to each of the three air quality monitors 1302A (W), 1302B (ESE), and 1302C (NNW). FIG. 17 further shows graphical representations of the Von Mises distributions. For example, the graphical representations of the Von Mises distributions may include a line graph 1704A and a polar graph 1706A for an emission source (e.g., 1408) corresponding to the air quality monitor 1302A. Further the graphical representations of the Von Mises distributions include a line graph 1704B and a polar graph 1706B for the emission source (e.g., 1208) corresponding to the air quality monitor 1302B. Furthermore, the graphical representations of the Von Mises distributions include a line graph 1704C and a polar graph 1706C for the emission source (e.g., 1408) corresponding to the air quality monitor 1302C.

In a nutshell, for each identified emission source, a representative Von Mises distribution (as shown in FIG. 17) for each of three air quality monitors at the site may be determined using the Gaussian plume models. This represents a linear relationship between the leak flux at the given source and the expected measured pollutant concentration at the device for each wind direction bin. Once the plume models are generated, a plume weight may be set to be the ppm value of the plume from the emission source at each of the three air quality monitors' location, for a given flux, for example, of 1 g/s. Further, based on the Von Mises distribution, a bearing of the plume from the emission source to each of the air quality monitors may be determined. Thereafter, the median standard deviation of the wind-direction for the wind-direction bucket may be calculated (also referred to as Stability Class).

Figure 18:
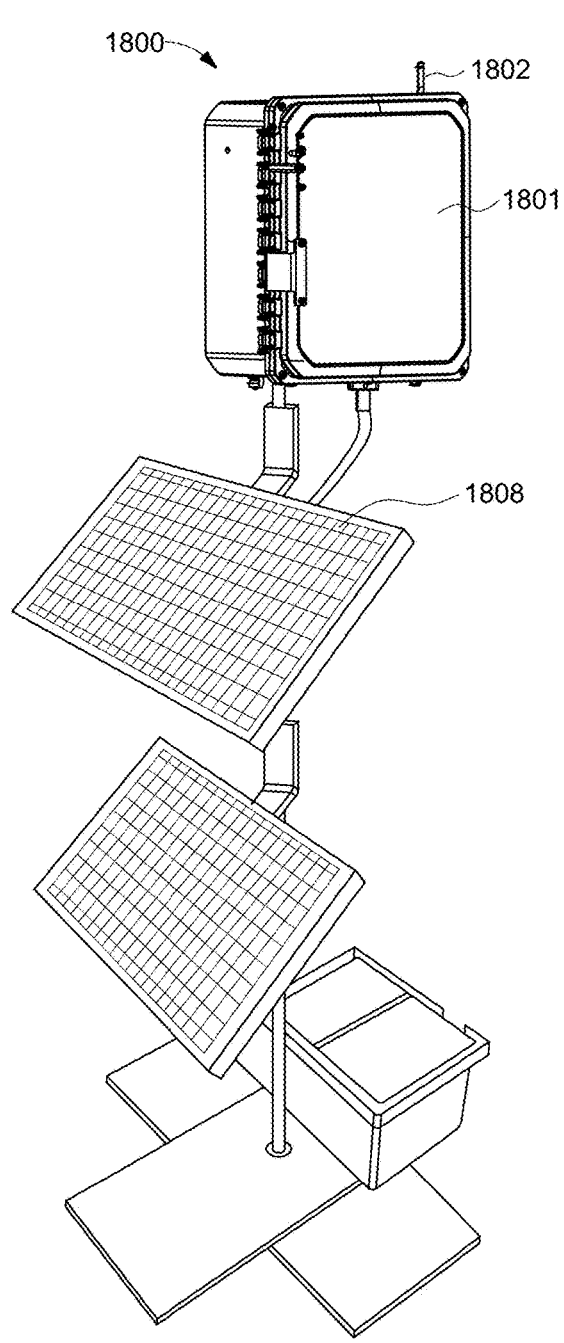
FIGS. 18-19 illustrate perspective views of a system for monitoring air quality, in accordance some configurations of the present subject matter.
Figure 19:
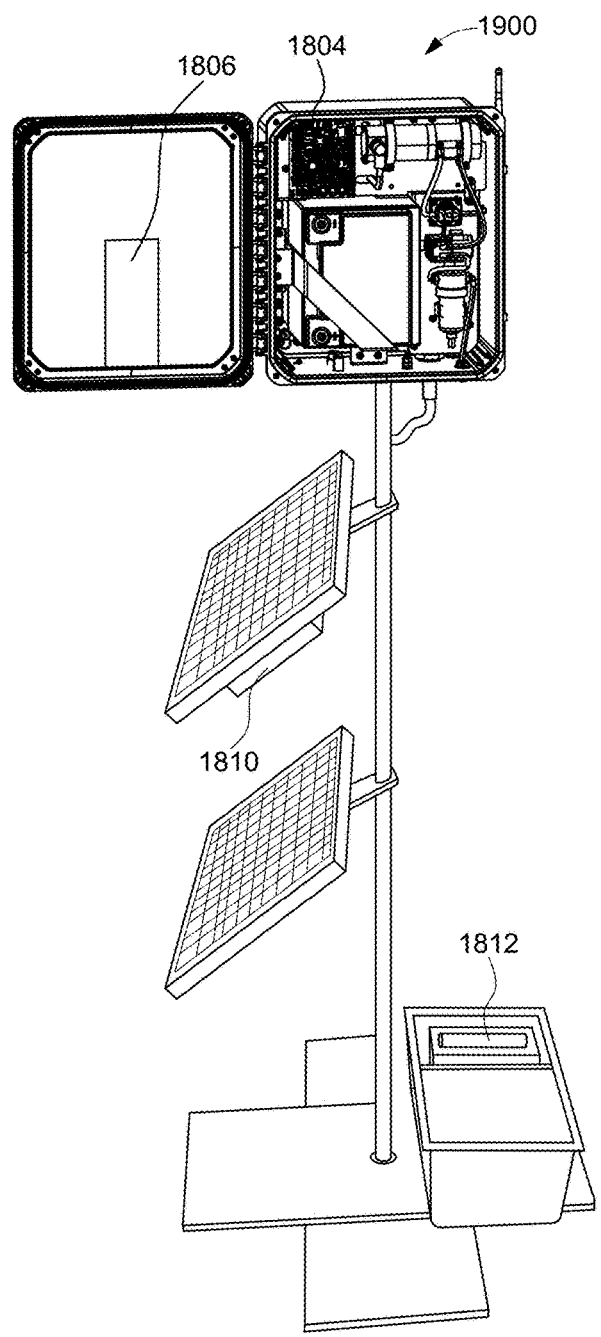

Referring now to FIGS. 18-19, perspective views 1800, 1900 of system for monitoring air quality are illustrated, in accordance with some illustrative configurations. As shown, the system includes an air quality monitor 1801. The air quality monitor 1801 may house a variety of components for sampling air and detecting a concentration of a substance in the air. Further, in some configurations, the air quality monitor 1801 may house a dock 1806 for holding a cellphone which may be used for transmission of data over the cellular network. The system further includes an antenna 1802, and a signal amplifier 1804 for further transmitting and amplifying the signals. The system further includes a solar panel 1808 for charging a battery 1812. The battery 1812 may be configured to power the air quality monitor 1801. The system may further include a MPPT charging controller 1810.

Figure 20:
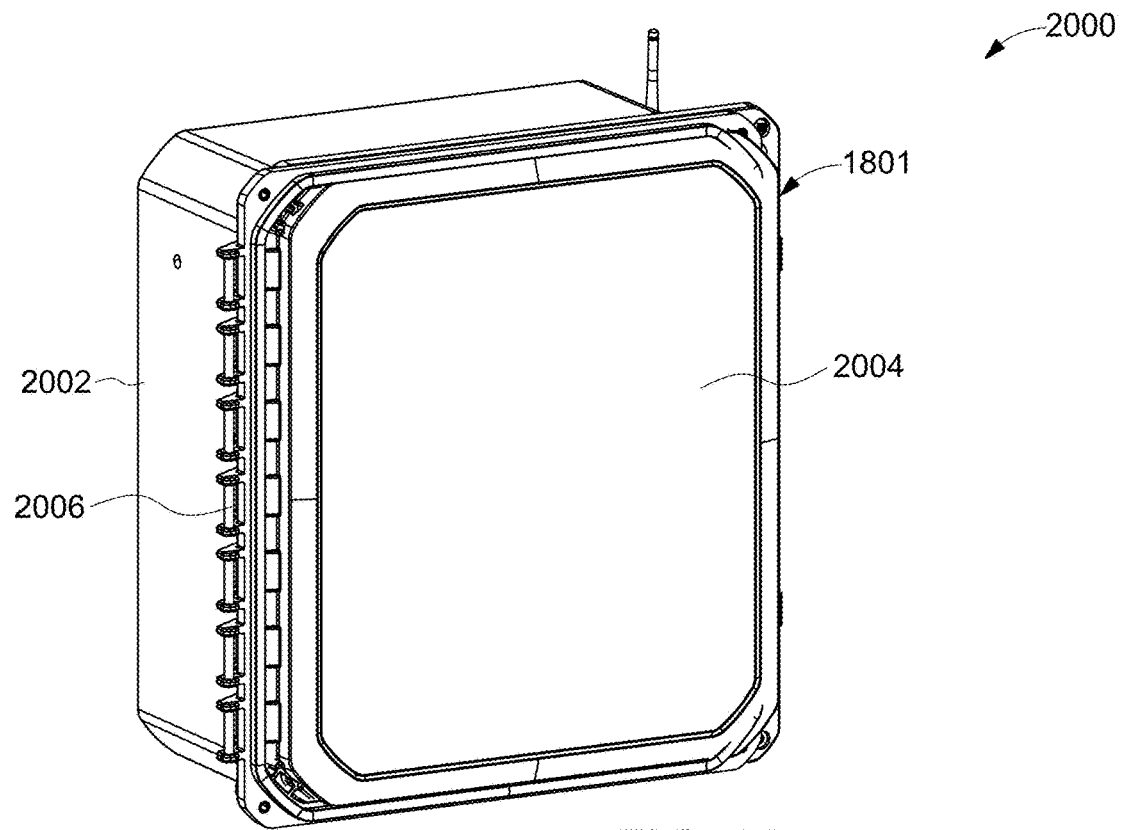
FIGS. 20-22 illustrate various views of an air quality monitor, in accordance with some configurations of the present disclosure.
Figure 21:
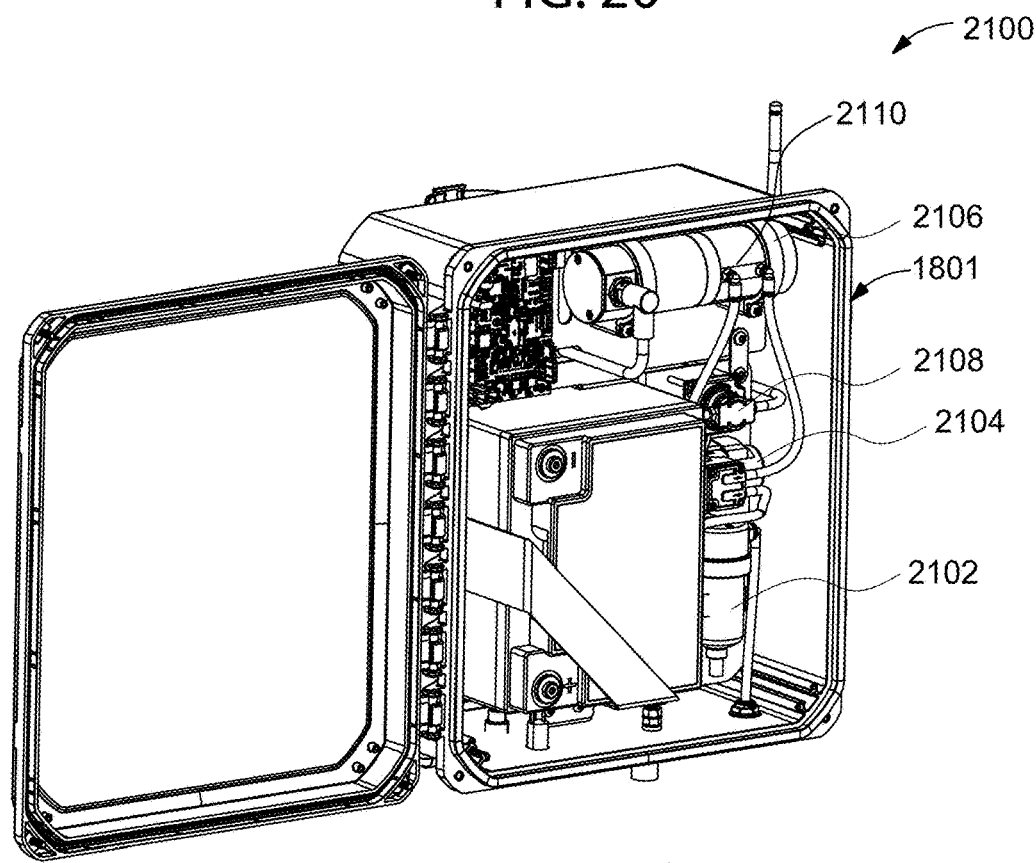
Figure 22:
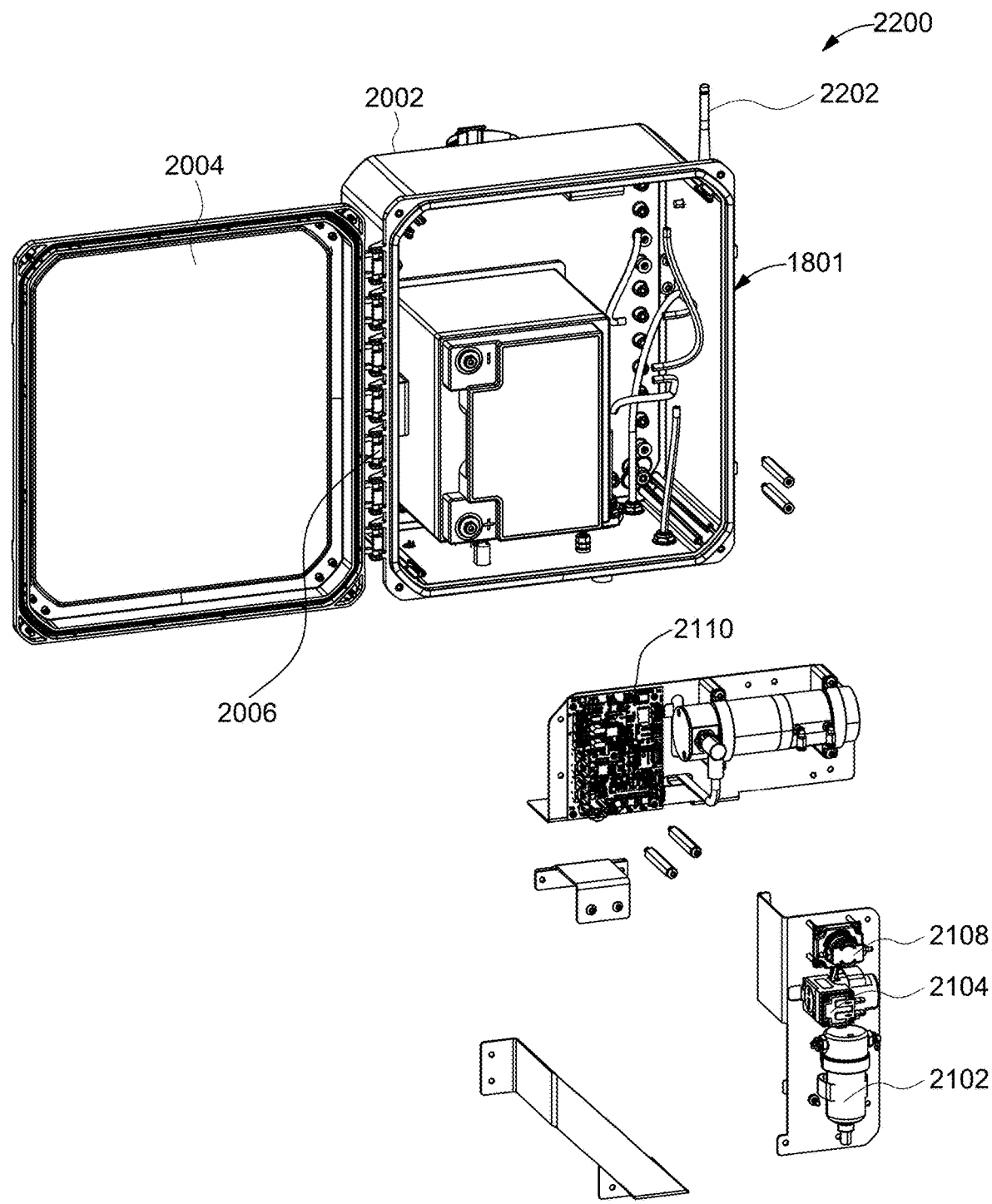

Referring now to FIGS. 20-22, various views 2000, 2100, 2200 of the air quality monitor 1801 are illustrated, in accordance with some configurations of the present disclosure. As shown, the air quality monitor 1801 includes a housing 2002 having a door 2004. For example, the door 2004 may be hinged to the housing 2002, to allow the door 2004 to be closed (as shown in FIG. 20) and opened (as shown in FIG. 21). As such, the door 2004 may be hinged to the housing 2002 via one or more hinges 2006. As shown in FIGS. 21-22, the housing 2002 may include at least one internal atmospheric sensor and a at least one external atmospheric sensor. The at least one internal atmospheric sensor may be configured to detect composition of the air sample that is received inside the housing 2002. The at least one external atmospheric sensor may be configured to detect composition of the atmospheric air surrounding the air quality monitor 1801.

Figure 23:
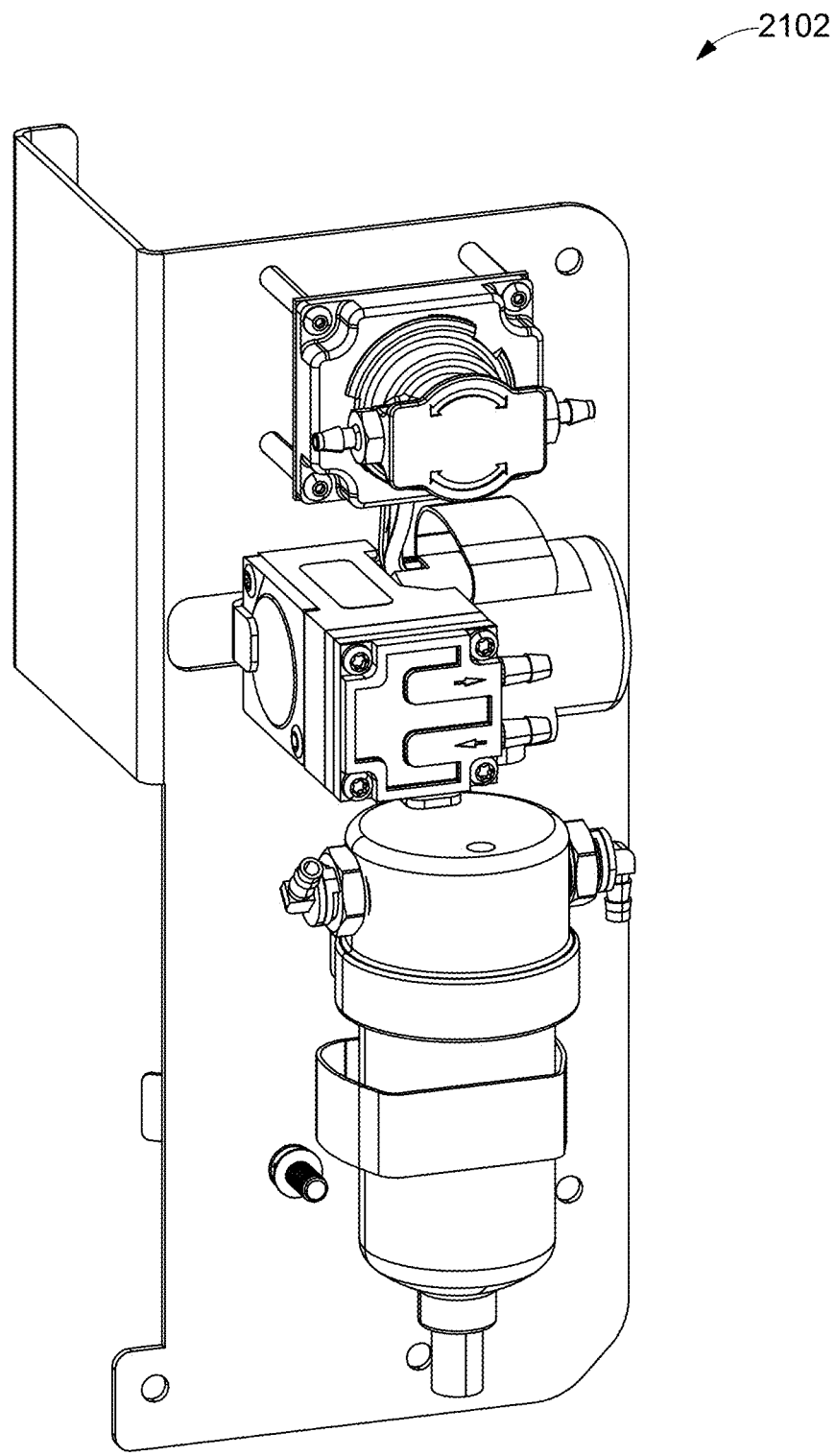
FIG. 23 illustrates a magnified view of a separator, in accordance with some configurations of the present disclosure.

In some configurations, the air quality monitor 1801 may further include a separator 2102 configured to separate liquid (e.g., water) from the air sample. To this end, the separator 2102 may include filter. A magnified view of the separator 2102 is further shown in FIG. 23. The air quality monitor 1801 may further include a diaphragm pump 2104. Further, the air quality monitor 1801 may include a methane (CH4) sensor 2106 configured to detect the presence and concentration of the methane gas in the air sample. The air quality monitor 1801 may further include a Barometer pressure sensor 2108. Further to these components, the air quality monitor 1801 may include a communication module 2110 including a printed circuit board. The communication module 2110 may be configured to perform processing of the data gathered by the sensors and further communicate the data to a remote location over a wireless or a wired communication network. The air quality monitor 1801 may further include a batter 2112 to supply electric power to the communication module 2110 and the other components within the housing 2002.

The air quality monitor 1801 may further include an antenna 2202 that may serve to send and receive radio signals, for example, as Wi-Fi signals. Additionally, the air quality monitor 1801 may include a Wi-Fi module (not shown in FIG. 23) that may be connected with a human presence detecting device 2402 (refer, FIG. 24). It should be noted that the human presence detecting device 2402 may be implemented at a central server or a Cloud. Further, the Wi-Fi module may be connected with the human presence detecting device 2402 over a wireless or a wired communication channel.

As mentioned above, conventional technologies (image-based, LiDAR-based, and radar-based technologies) suffer various disadvantages when it comes to 2D and 3D human pose estimation.

To this end, the present disclosure provides for use of Wi-Fi signals and antennas (i.e. one dimensional (1D) sensors) for human body segmentation and key-point body detection, in outdoor monitored sites, such as petroleum extraction sites. The techniques of the present disclosure use 1D Wi-Fi signals to recover correspondence between image pixels and the vertices indexes of a 3D human body model.

The present disclosure further provides for combining Wi-Fi signals with deep learning architectures (also, referred to as Machine Learning network), commonly used in computer vision, to estimate human pose correspondence. A deep neural network maps phase and amplitude of the Wi-Fi signals to UV coordinates within multiple human regions (for example, 24 human regions). The combination of the Wi-Fi signals and the deep learning architectures is able to estimate concentrated pose of multiple subjects, by utilizing Wi-Fi signals as the only input. A such, the techniques of the present disclosure provide for low-cost, accessible, and privacy-preserving solutions for human sensing. The Wi-Fi signals are unaffected by the factors of illumination and occlusion. Further, the Wi-Fi equipment is reasonably priced, and is already in use at most locations, for example, for Local Area Network (LAN) or Internet communication. Therefore, the application of the already installed Wi-Fi equipment can be extended to human sensing. As such, no specialized hardware is required. As such, the Wi-Fi technology as disclosed herein can be sued for monitoring remote sites to identify suspicious behaviours, verify that required intervention has been performed by the personnel, and also to verify the specific actions that have been performed by the personnel.

Figure 24:
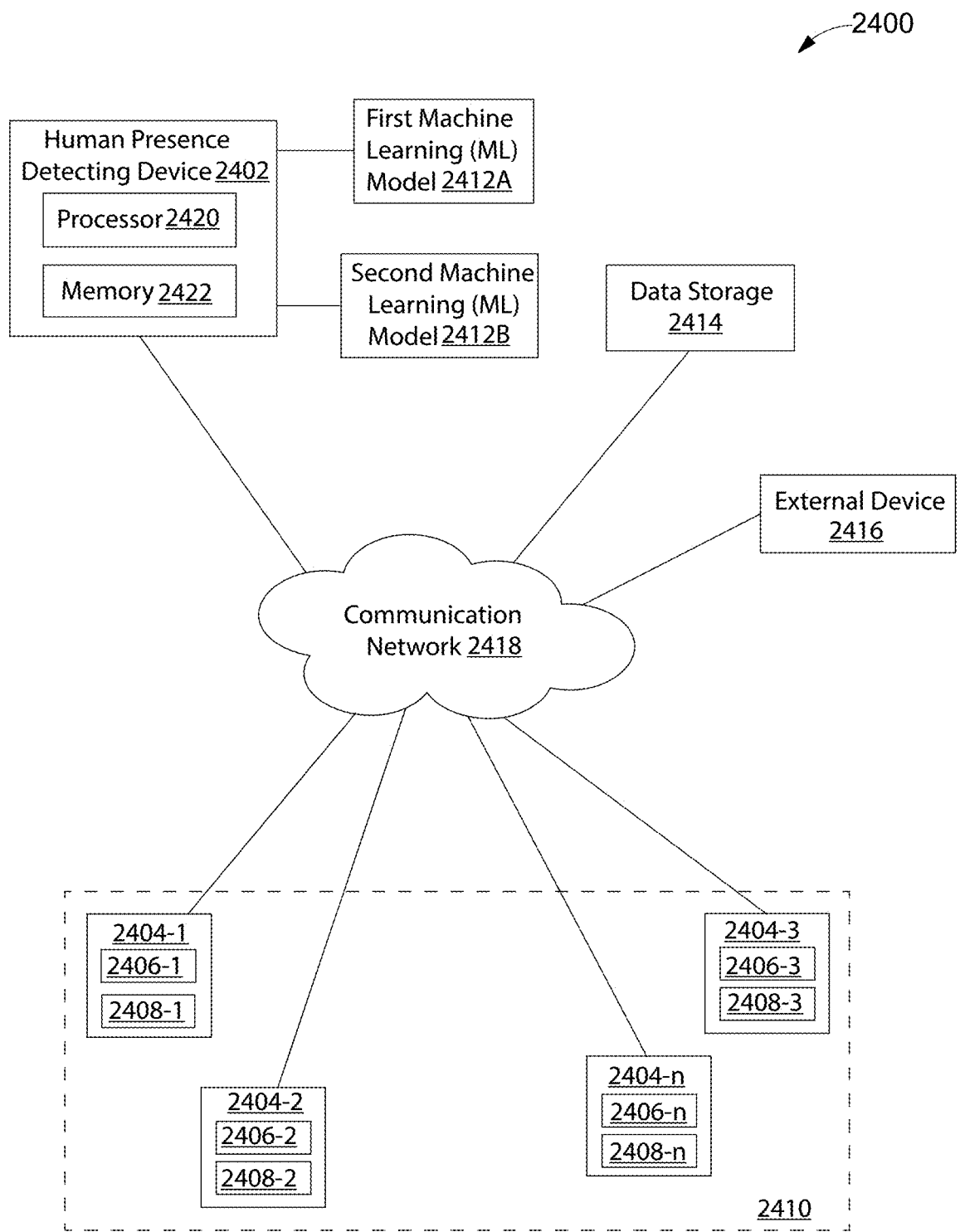
FIG. 24 illustrates a block diagram of an exemplary system for detecting human presence in an outdoor monitored site, in accordance with some configurations of the present disclosure.

Referring now to FIG. 24, a block diagram of an exemplary system 2400 for detecting human presence in an outdoor monitored site 2410 is illustrated, in accordance with some configurations of the present disclosure. For example, the outdoor monitored site 2410 may be an oil extraction site, a petroleum refining site, etc. As mentioned in the above sections of the present disclosure, the outdoor monitored site 2410 may be prone to desired or undesired emissions from the processing equipment installed at the outdoor monitored site 2410.

The system 2400 may implement a human presence detecting device 2402. The human presence detecting device 2402 may be a computing device having data processing capability. Examples of the human presence detecting device 2402 may include, but are not limited to a desktop, a laptop, a notebook, a netbook, a tablet, a smartphone, a mobile phone, an application server, a web server, or the like. Further, the system 2400 may include a plurality of air quality monitors 2404-1, 2404-2, . . . , and so on (hereinafter, collectively referred to as air quality monitors 2404). In an example embodiment, three air quality monitors 2404 may be provided in the outdoor monitored site 2410. It should be noted that the system may be able to perform the required operations using fewer or greater number of air quality monitors 2404 as well; however, different number of the air quality monitors 2404 may be deliver different results. The air quality monitors 2404 may be installed at predetermined locations at the outdoor monitored site 2410.

In some configurations of the present disclosure, each of the air quality monitors 2404 may include at least one of a transmitter and a receiver. Preferably, each of the air quality monitors 2404 may include both the transmitter and the receiver. The transmitter may be configured to emit radio signals. For example, the transmitter may be configured to emit radio signals that are selected from within a frequency range of 2.4 Giga Hertz (GHz) to 5 GHz. As will be understood, this frequency range (2.4 GHz to 5 GHz) falls into the Wi-Fi signal spectrum. The receiver may be configured to receive the radio signals emitted by the transmitter. As such, the transmitter may be a Wi-Fi signal transmission device and the receiver may be a Wi-Fi signal receiving/detecting device. It should be further noted that the air quality monitors 2404 may already be equipped with the Wi-Fi signal transmission and receiving device, for example, for enabling wireless connectivity of the air quality monitors 2404 with a central control system or a server. As such, the transmitters and receivers already provided in the air quality monitors 2404 may be used to perform the added functionality of detecting human presence at the outdoor monitored site 2410, as will be explained in detail in the subsequent sections of this disclosure. In some example scenarios, each of the receivers may be configured to receive radio signals emitted by the one or more transmitters that are not co-located with that receiver.

The system 2400, therefore, may include a plurality of transmitters 2406-1, 2406-2, . . . and so on (collectively, hereinafter, referred to as plurality of transmitters 2406) and a plurality of receivers 2408-1, 2408-2, . . . and so on (collectively, hereinafter, referred to as plurality of receivers 2408). By way of an example, the outdoor monitored site 2410 may include three air quality monitors 2404—a first air quality monitor 2404-1, a second air quality monitor 2404-2, and a third air quality monitor 2404-3. Each of the three air quality monitors 2404 may include (i.e., co-located with) a transmitter and a receiver. In particular, the first air quality monitor 2404-1 may include a transmitter 2406-1 and a receiver 2408-1, the second air quality monitor 2404-1 may include a transmitter 2406-2 and a receiver 2408-2, and the third air quality monitor 2404-3 may include a transmitter 2406-3 and a receiver 2408-3. Therefore, the receiver 2408-1 may be configured to receive radio signals emitted by the transmitter 2406-2 and the transmitter 2406-3. Similarly, the receiver 2408-2 may be configured to receive radio signals emitted by the transmitter 2406-1 and the transmitter 2406-3, and the receiver 2408-3 may be configured to receive radio signals emitted by the transmitter 2406-1 and the transmitter 2406-2.

In order to perform various functionalities associated with detecting human presence, the human presence detecting device 2402 may be assisted by a first Machine Learning (ML) network 2412A and a second ML network 2412B. The first ML network 2412A and the second ML network 2412B may either be a part of the human presence detecting device 2402 or may exist as separate modules and may work in tandem with the human presence detecting device 2402. As such, the embodiment illustrated in FIG. 24 is merely indicative and other iterations (for example, the first ML network 2412A and the second ML network 2412B implemented within the human presence detecting device 2402) may be possible as well.

The system 2400 may further include a data storage 2414. Additionally, the human presence detecting device 2402 may be communicatively coupled to an external device 2416 for sending and receiving various data. Examples of the external device 2416 may include, but are not limited to, a remote server, digital devices, and a computer system. A computing device, a smartphone, a mobile device, a laptop, a smartwatch, a personal digital assistant (PDA), an e-reader, and a tablet are all examples of external devices 2416.

The human presence detecting device 2402 may connect to the air quality monitors 2404, the data storage 2414, and the external device 2416 over a communication network 2418. The human presence detecting device 2402 may connect to external device 2416 via a wired connection, for example via Universal Serial Bus (USB).

The human presence detecting device 2402 may be configured to perform one or more functionalities that may include extracting, by the first ML network 2412A, channel state information (CSI) data from the radio signals received by each of the plurality of receivers, corresponding to a space through which the radio signals propagate. As will be appreciated by those skilled in the art, in wireless communications, the CSI refers to the channel properties of a communication link. The CSI describes how a signal propagates from the transmitter to the receiver and represents the combined effect of, for example, scattering, fading, and power decay with distance. It should be noted that the CSI data may include phase values and amplitude values.

The one or more functionalities that may further include converting, by the first ML network 2412A, the CSI data into an image representation map, by performing domain translation of the CSI data using a two-branch encoder-decoder network. The one or more functionalities that may further include generating, by the second ML network 2412B, a surface map based on the image representation. The surface map may be a representation of correspondence between the image representation map and a 3-dimensional (3D) surface associated with a human body. As such, the surface map may help determine a presence of a human in the space through which the signals propagate. Further, an analysis of the surface map may also help determine an exact pose of the human(s) present in the space, and therefore allow to determine an activity performed by the human(s).

To perform the above functionalities, the human presence detecting device 2402 may include a processor 2420 and a memory 2422. The memory 2422 may be communicatively coupled to the processor 2420. The memory 2422 may store a plurality of instructions, which upon execution by the processor 2420, cause the processor to perform the above functionalities. The human presence detecting device 2402 may further implement a user interface that may further implement a display. Examples may include, but are not limited to a display, keypad, microphone, audio speakers, vibrating motor, LED lights, etc. The user interface 2402C may receive input from a user and also display an output of the computation performed by the human presence detecting device 2402.

Figure 25A:
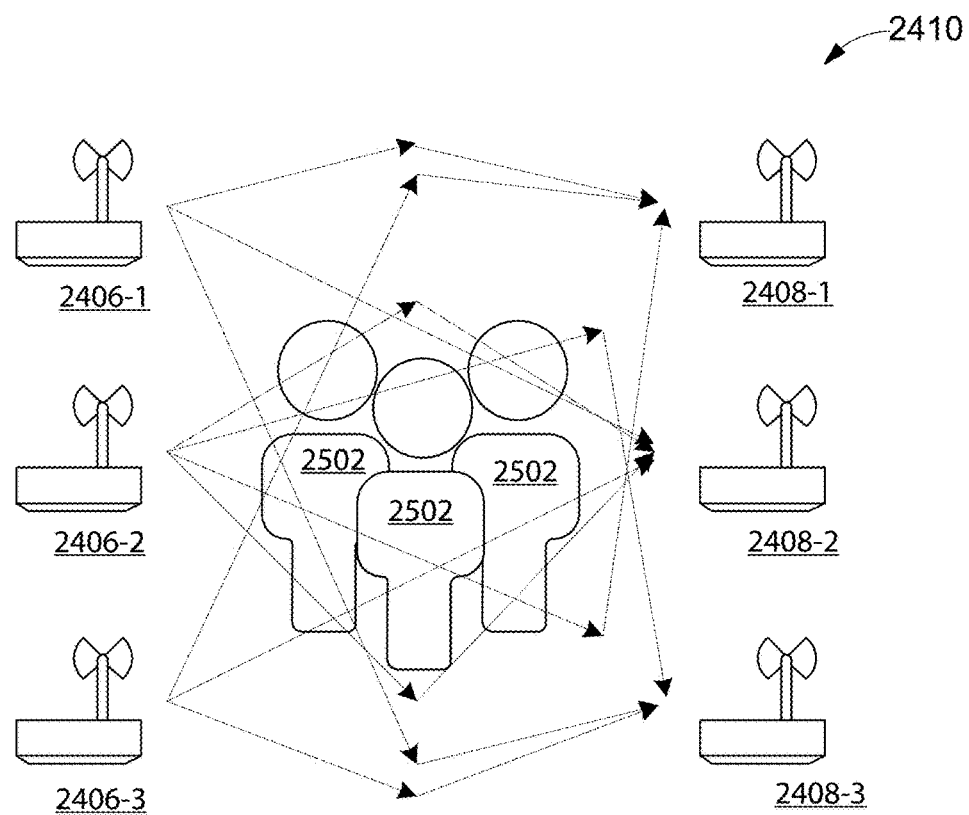
FIG. 25A is a schematic diagram of the exemplary outdoor monitored site equipped with a plurality of the transmitters and a plurality of the receivers, in accordance with some configurations.

Referring to FIG. 25A, a schematic diagram of the exemplary outdoor monitored site 2410 equipped with the plurality of the transmitters 2406 and the plurality of the receivers 2408 is illustrated, in accordance with some configurations. In particular, in the scenario represented in FIG. 25A, the outdoor monitored site 2410 may be equipped with at least three transmitters 2406, for example, a first transmitter 2406-1, a second transmitter 2406-2, and a third transmitter 2406-3, and at least three receivers 2408, for example, a first receiver 2408-1, a second receiver 2408-2, and a third receiver 2408-3. As illustrated in FIG. 25A, the plurality of the transmitters 2406 and the plurality of the receivers 2408 may be located at their respective positions within the outdoor monitored site 2410. Further, the FIG. 25A shows propagation of the radio signals from the plurality of transmitters 2406 to the plurality of receivers 2408. One or more humans 2502 may be present in the space through which radio signals propagate. As the radio signals travel through the space and come across the one or more humans 2502 along their way, the signals may undergo scattering, fading, power decay, etc. that may cause changes in the amplitude data and the phase data of the radio signals. These changes are recorded in the CSI data of the radio signals.

Figure 25B:
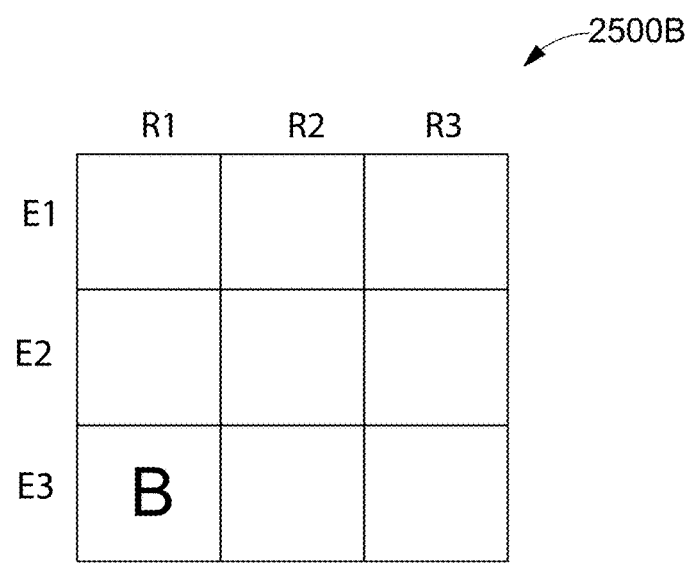
FIG. 25B illustrates a 3×3 tensor dimension corresponding to 3×3 transmitter-receiver antenna pairs, in accordance with some configurations.

FIG. 25B illustrates a schematic diagram 2500B of a 3×3 tensor dimension corresponding to the 3×3 transmitter-receiver antenna pairs. For example, E1 denotes the first transmitter 2406-1 (also, referred to as emitter) and R1 denotes the first receiver 2408-1. Similarly, E2 denotes the second transmitter 2406-2 and R2 denotes the second receiver 2408-2, and E3 denotes the third transmitter 2406-3 and R3 denotes the third receiver 2408-3. By incorporating 5 consecutive complex-valued CSI samples (100 samples/second) under 30 subcarrier frequencies, two input tensors to the network may be: a 150×3×3 amplitude tensor and a 150×3×3 phase tensor.

In some configurations of the present subject matter, UV coordinates associated with a human body surface is determined using the radio signals, and in particular, radio signals belonging to the Wi-Fi spectrum. In order to determine the UV coordinates, the first, raw CSI signals may be cleaned by amplitude and phase sanitization. Upon amplitude and phase sanitization, a two-branch encoder-decoder network may be used to perform domain translation from sanitized CSI samples to two-dimensional (2D) feature maps. These feature maps may resemble images. The 2D features may then be fed to a modified RCNN architecture to estimate the UV map. The UV map may be a representation of concentrated correspondence between 2D (i.e., image representation) and 3D surface associated with the human body. Further, in order to improve the training of Wi-Fi-input network, a transfer learning may be conducted. In the transfer learning, the differences between the multi-level feature maps produced by images and those produced by Wi-Fi signals are minimized, before training the of the main network.

In some example implementations, the raw CSI data may be sampled in 100 Hz as complex values over 30 subcarrier frequencies (linearly spaced within 2.4 GHz±20 MHz) and transmitting among three emitter antennas and three reception antennas. Each CSI sample may contain a 3×3 real integer matrix and a 3×3 imaginary integer matrix. Further, in some example implementations, inputs of the network may contain 5 consecutive CSI samples under 30 frequencies, which are organized in a 150×3×3 amplitude tensor and a 150×3×3 phase tensor, respectively. The network outputs may include a 17×56×56 tensor of key-point heatmaps (one 56×56 map for each of the 17 key-points) and a 25×112×112 tensor of the UV maps (one 112×112 map for each of the 24 body parts with one additional map for background).

Figure 26A:
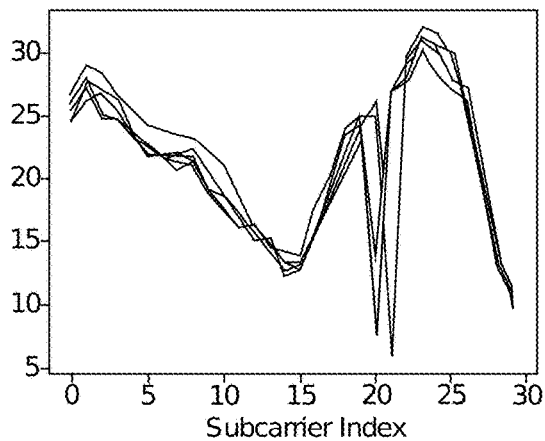
FIG. 26A illustrates a graphical representation of amplitude of five raw CSI signals (depicted by 5 different graphs), in accordance with some configurations.
Figure 26B:
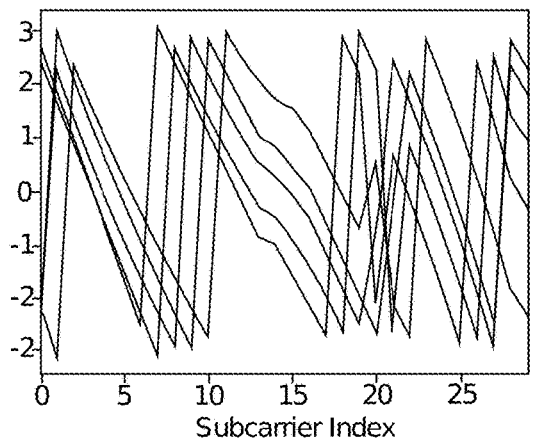
FIG. 26B illustrates a graphical representation of the phase of the five raw CSI signals (depicted by 5 different graphs), in accordance with some configurations.

It should be noted that the raw CSI samples may be noisy with random phase drift and flip. In the present configurations, both the phase information and the amplitude information are taken into consideration. FIG. 26A illustrates a graphical representation of the amplitude of five raw CSI signals (depicted by 5 different graphs). FIG. 26B illustrates a graphical representation of the phase of the five raw CSI signals (depicted by 5 different graphs). As can be seen in FIG. 26B, the raw CSI samples have random phase drift and flip. Sanitization may be performed to obtain stable phase values to enable full use of the CSI information. In raw CSI samples, as shown in FIGS. 26A-26B, the amplitude (A) and phase ($\Phi$) of each complex element z=a+bi may be computed using the formulation A=√(a2+b2) and $\Phi$=arctan(b/a). It should be further noted that the range of the arctan function may be from $-\pi$ to $\pi$ and the phase values outside this range may get wrapped, leading to a discontinuity in phase values. To this end, a first sanitization step may be performed to unwrap the phase following, based on the following Equation 1:

$$\Delta\phi i,j = \Phi i,j+1 - \Phi i,j$$

$$\text{if } \Delta\phi i,j > \pi, \Phi i,j+1 = \Phi i,j + \Delta\phi i,j - 2\pi$$

$$\text{if } \Delta\phi i,j < -\pi, \Phi i,j+1 = \Phi i,j + \Delta\phi i,j + 2\pi \quad \text{Equation (1)}$$

Here, i denotes the index of the measurements in the five consecutive samples, and j denotes the index of the subcarriers(frequencies). Following unwrapping, flipping phase curves may be restored to continuous curves.

Figure 26C:
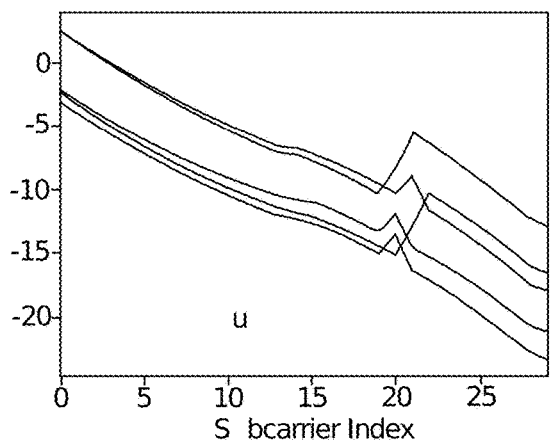
FIG. 26C illustrates a graphical representation of the phase of the five raw CSI signals (depicted by 5 different graphs) of FIG. 26B, in accordance with some configurations.
Figure 26D:
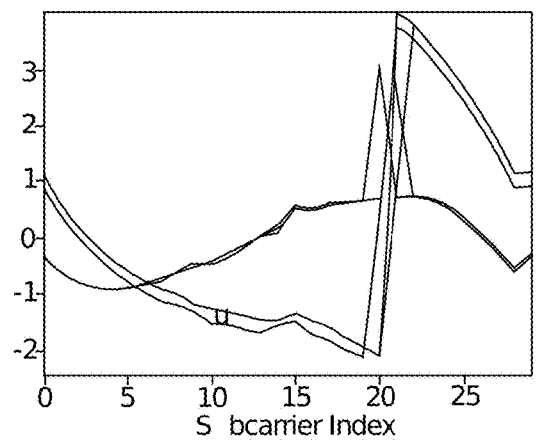
FIG. 26D illustrates graphical representation of the phase of the five raw CSI signals (depicted by 5 different graphs) upon directly applying linear fitting to the phase, in accordance with some configurations.

FIG. 26C illustrates a graphical representation of the phase of the five raw CSI signals (depicted by 5 different graphs) of FIG. 26B. As can be seen in FIG. 26C, among the 5 phase curves captured in 5 consecutive samples, there are random jittering that break the temporal order among the samples. To keep the temporal order of signals, linear fitting may be applied to the phase. Directly applying linear fitting to the phase (of FIG. 26C) may further amply the jittering instead of fixing it. The results of directly applying linear fitting to the phase are shown in FIG. 26D. As such, directly applying linear fitting to the phase may not yield best results.

Figure 26E:
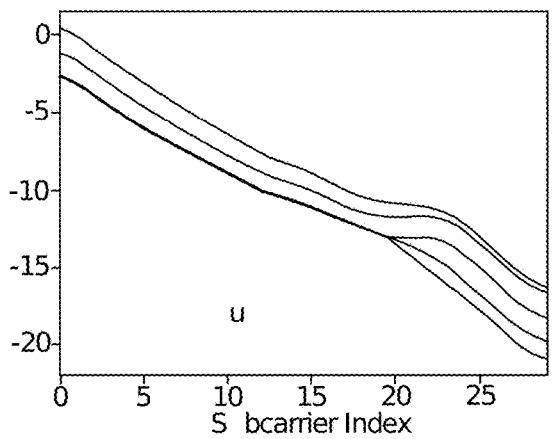
FIG. 26E illustrates graphical representation of the phase of the five raw CSI signals (depicted by 5 different graphs) upon applying median and uniform filters to the phase (i.e. applying both unwrapping and linear fitting to the phase of FIG. 26C), in accordance with some configurations.

Therefore, instead, median and uniform filters are applied to the phase (of FIG. 26C) to eliminate outliers in both the time and frequency domain which leads; results of applying median and uniform filters to the phase (i.e., applying both unwrapping and linear fitting to the phase of FIG. 26C) are illustrated in FIG. 26E. As such, upon extracting, the CSI data may be pre-processed for de-noising the CSI data, based on a linear fit model. As a result, fully sanitized phase values can be obtained by applying the linear fitting, using the equations below:

$$\alpha 1 = (\Phi F - \Phi 1)/2\pi F$$

$$\alpha 0 = 1/\Sigma\_(1 \leq f \leq F) \phi f$$

$$\hat{\phi} f = \phi f - (\alpha 1 f + \alpha 0) \quad \text{(Equation 2)}$$

Figure 26F:
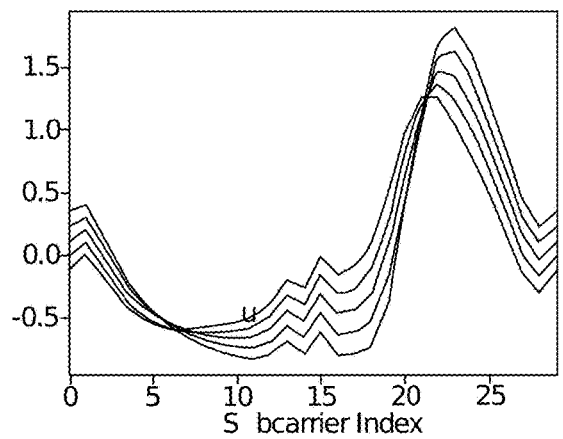
FIG. 26F illustrates a graphical representation of the final phase curves obtained that are temporally consistent, in accordance with some configurations.

Here, F denotes the largest subcarrier index (30 in the above case) and $\hat{\phi}f$ is the sanitized phase values at subcarrier f (the f th frequency). FIG. 26F illustrates a graphical representation of the final phase curves obtained that are temporally consistent.

Figure 27:
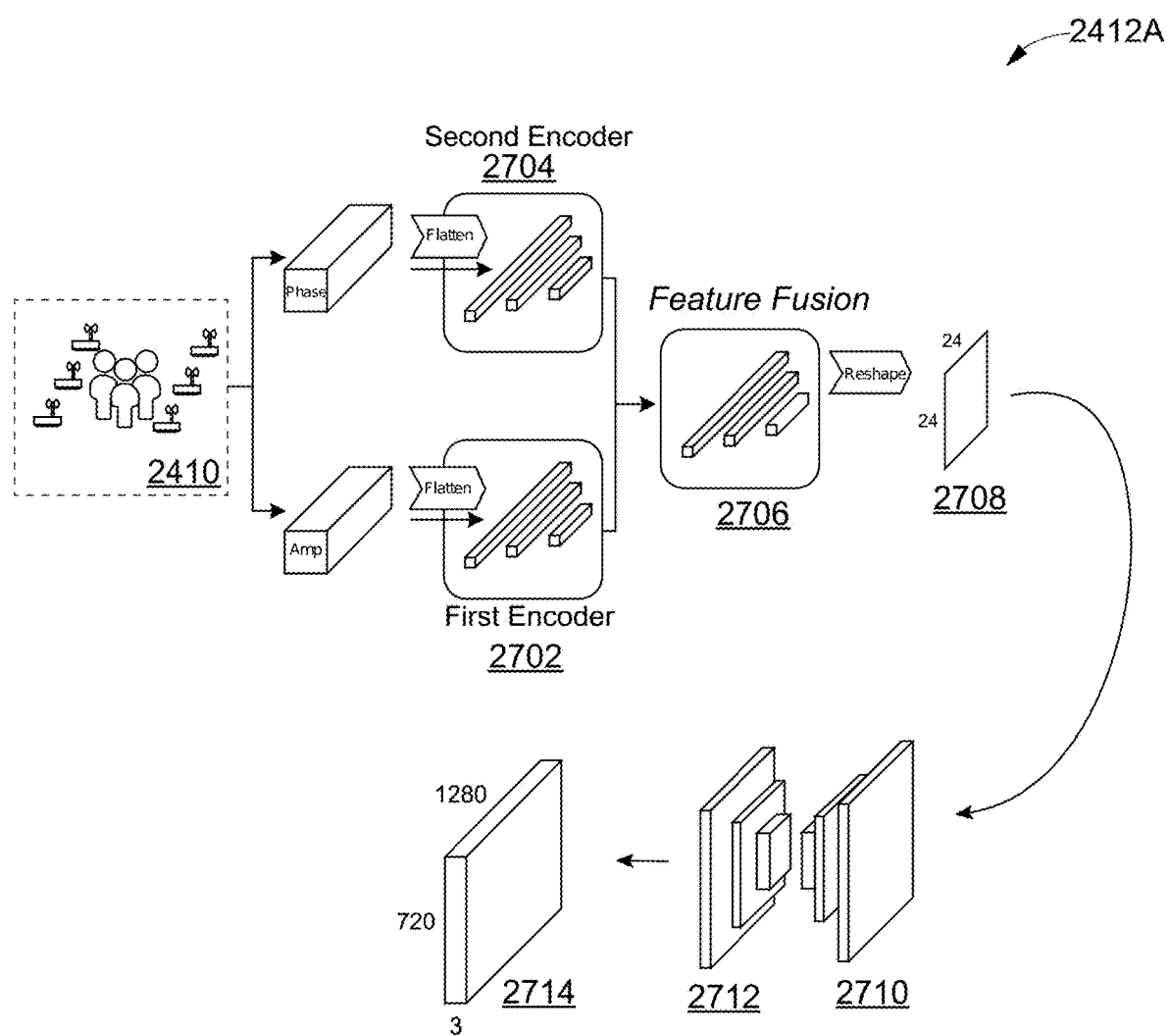
FIG. 27 is a block diagram of a first ML network, in accordance with some configurations.

Referring now to FIG. 27, a block diagram of the first ML network 2412A, in accordance with some configurations. The first ML network 2412A, for example, may be a modality translation network (hence, the terms 'first ML network' and 'modality translation network' may have been used interchangeably in this disclosure). In order to estimate the UV maps in the spatial domain from the one-dimensional (1D) CSI signals, first, the network inputs from the CSI domain may be transformed to the spatial domain. This may be performed via the modality translation network 2412A, as illustrated in FIG. 27. CSI latent space features may be extracted using two encoders—a first encoder 2702 for the amplitude tensor and a second encoder 2704 for the phase tensor. By way of an example, both the amplitude tensor and the phase tensor have a size of 150×3×3 (based on, 5 consecutive samples, 29 frequencies, 3 emitters and 3 receivers). Conventional approaches relied on Convolutional Neural Network (CNN) to extract spatial features from the last two dimensions (the 3×3 transmitting sensor pairs) of the input tensors. However, locations in the 3×3 feature map do not correlate with the locations in the 2D scene. More specifically, as depicted in FIG. 25B, a Blue colored element (indicated by letter 'B') represents a 1D summary of the entire scene captured by the first emitter 1 and the third receiver (E1-R3), instead of local spatial information of the top right corner of the 2D scene. Therefore, deviating from the conventional approaches, it is considered that each of the 1350 elements (in both tensors) captures a unique 1D summary of the entire scene.

To this end, as shown in FIG. 27, the amplitude and phase tensors may be flattened before being fed into the first encoder 2702 and the second encoder 2704 (also referred to as multi-layer perceptrons (MLP)) to obtain their features in the CSI latent space. Further, the features from the first encoder 2702 and the second encoder 2704 may be concatenated to obtain a combined tensor. The combined tensor may be fed to a feature fusion-MLP 2706 to perform feature fusion.

Thereafter, the CSI latent space features may be transformed to feature maps in the spatial domain. The fused 1D feature may be reshaped to obtain a 24×24 2D feature map 2708. Thereafter, the spatial information may be extracted by applying two convolution blocks 2710 to obtain a more condensed map (not shown in FIG. 27) with spatial dimension of 6×6. Finally, four deconvolution layers 2712 may be used to upsample the encoded feature map 2714 in low dimensions to the size of 3×720×1280. The output tensor size may bet set to match the dimension commonly used in RGB-image-input network. The output encoded feature map 2714 is a scene representation in the image domain generated by the Wi-Fi signals (hence, the terms 'feature map' and 'scene representation' may have been used interchangeably in this disclosure).

Once the scene representation (of dimensions 3×720×1280) is obtained in the image domain, then image-based methods may be used to predict the UV maps of the human body/bodies. Conventional pose estimation run an independent person detector to estimate the bounding box and then conduct pose estimation from person-wise image patches. However, since each element in the CSI input tensor is a summary of the entire scene, therefore, it is not possible to extract the signals corresponding to a single human from a group of humans in the scene. Therefore, a network structure similar to the RCNN is used, since it can predict the concentrated correspondence of multiple humans in an end-to-end fashion.

Figure 28:
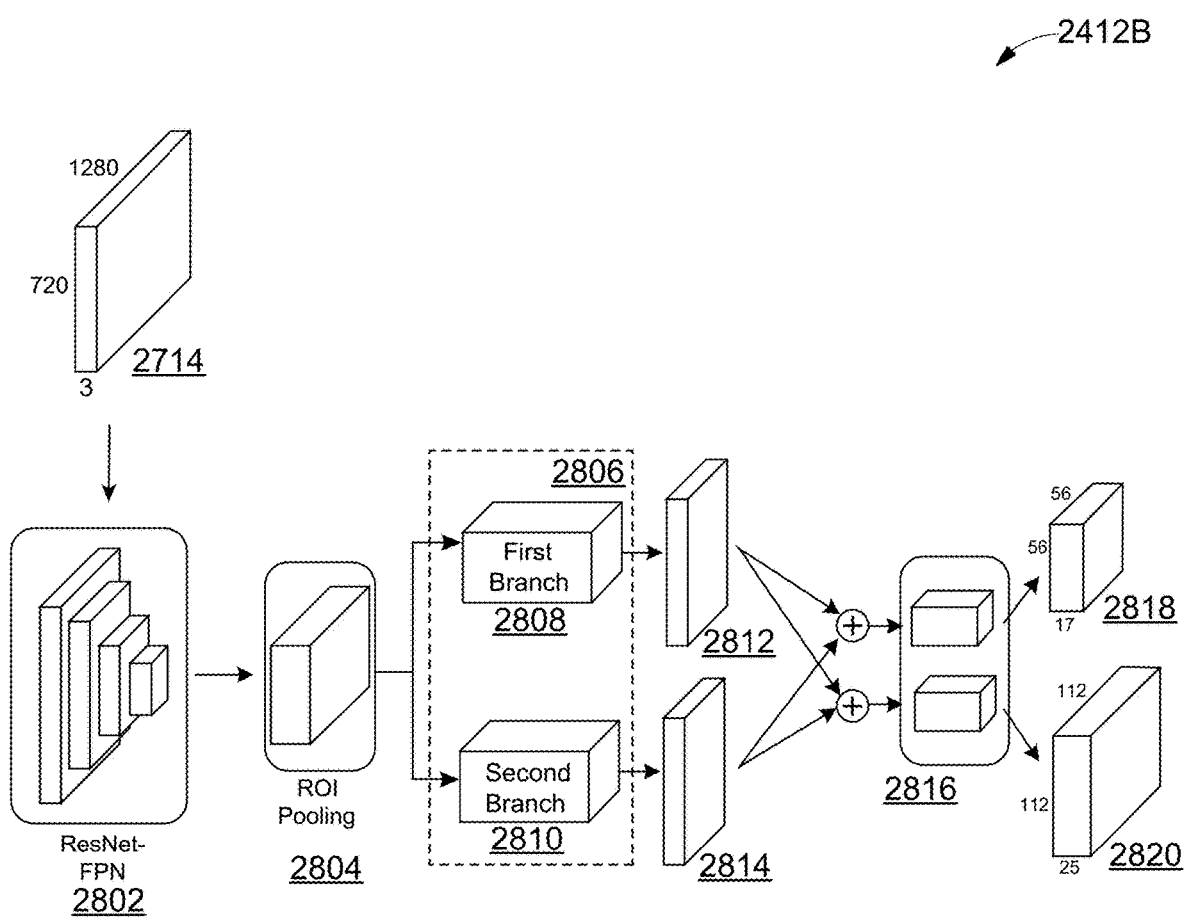
FIG. 28 illustrates a block diagram of a second ML network, in accordance with some configurations.

FIG. 28 illustrates a block diagram of the second ML network 2412B, in accordance with some configurations. The second ML network 2412B may be a radio signal-based RCNN model (hence, the terms 'second ML network' and the 'radio signal-based RCNN model' may have been used interchangeably in this disclosure). The radio signal-based RCNN model 2412B may be used to extract the spatial features from the scene representation 2714 obtained from the modality translation network 2412A, using a ResNet-FPN backbone 2802. Then, the output may go through a region proposal network 2804 where Region of Interest (ROI) pooling may be performed. To better exploit the complementary information of different sources, a Fully Convolutional Network (FCN) 2806 may be applied on the output. It should be noted that estimating key-point locations is more reliable than estimating concentrated correspondences. Accordingly, the network may be trained to use key-points to restrict predictions from getting too far from the body joints of humans.

In one branch of the FCN 2806, the FCN 2806 may predict human part labels and UV coordinates 2812 within each part of the output. In a second branch, the FCN 2806 estimate a key-point heatmap 2814. In other words, in the first branch, the FCN may be used to densely predict human part labels and surface coordinates (UV coordinates) within each part, while the second branch may use the FCN 2806 to estimate the key-point heatmap. The human part labels and UV coordinates 2812 may be combined with the key-point heatmap 2814, and then fed into two convolutional blocks 2816, to obtain a key-point mask 2818 and the surface map 2820.

In particular, the human part labels and UV coordinates 2812 and the key-point heatmap 2814 may be combined and then fed into a refinement unit of each of the first branch 2808 and the second branch 2810. Each refinement unit may include two convolutional blocks followed by an FCN. As such, the radio signal-based RCNN model 2412B may output a 17×56×56 key-point mask and a 25×112×112 UV map.

It should be noted that the modality translation network 2412A and the radio signal-based RCNN model 2412B may be trained together. To improve the training efficiency, a transfer learning may be performed from an image-based Region Based Convolutional Neural Networks (RCNN) model to the radio signal-based RCNN model 2412B.

Figure 29:
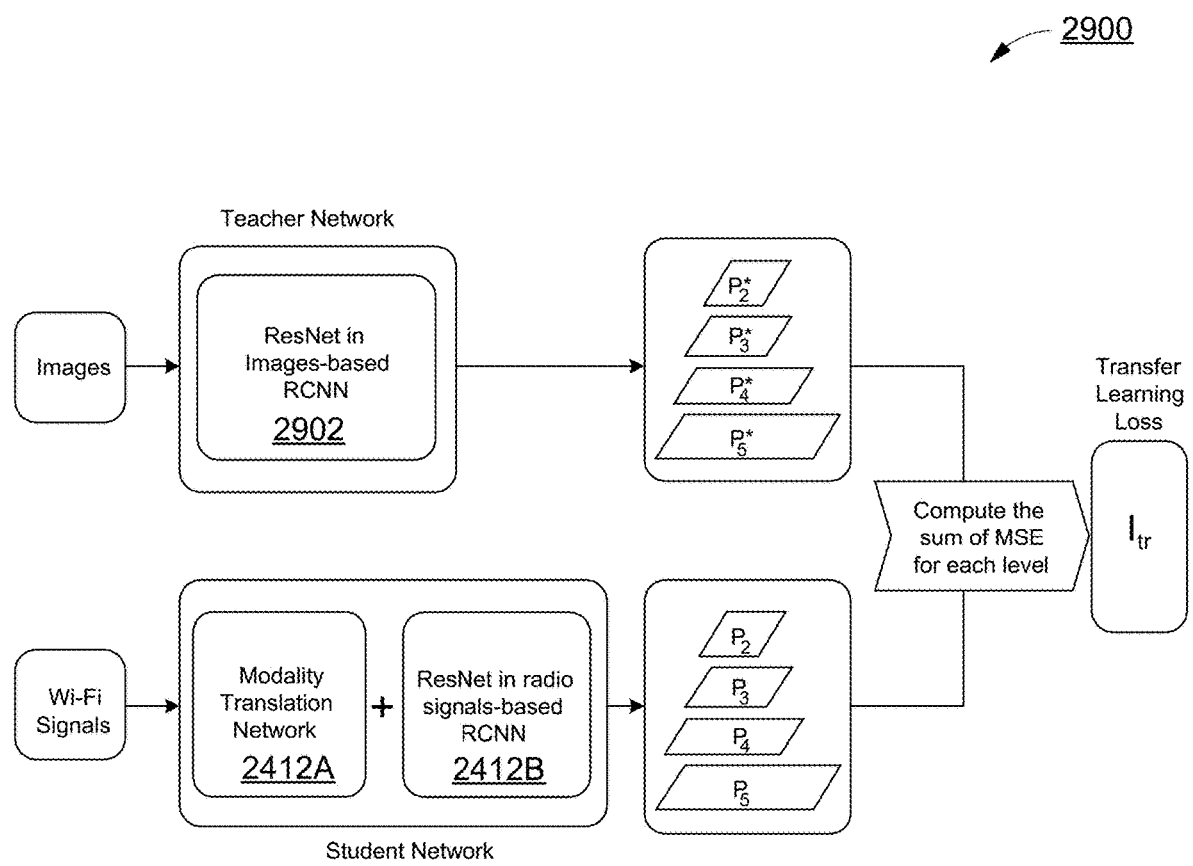
FIG. 29 illustrates a flow diagram of training of the modality translation network and the radio signal-based RCNN model, in accordance with some configurations.

FIG. 29 illustrates a flow diagram 2900 of training of the modality translation network 2412A (first ML network 2412A) and the radio signal-based RCNN model 2412B (second ML network 2412B), in accordance with some configurations. The training of the radio signal-based RCNN model 2412B may be supervised with a pre-trained image-based RCNN model 2902. It should be noted that directly initializing the radio signal-based RCNN model 2412B with the image-based RCNN model 2902 weights may not yield desired results, because the two networks get inputs from different domains (image and CSI). Therefore, first, the image-based RCNN model 2902 may be trained as a teacher network. The modality translation network 2412A (i.e., the first ML network 2412A) and the radio signal-based RCNN model 2412B (i.e., the second ML network 2412B) may be trained as student network. In order to train, the teacher network weights may be fixed and the student network may be trained by feeding the student network with the synchronized images and CSI tensors, respectively. Further, the student network may be updated, such that its backbone (ResNet) features mimic that of our teacher network. It is preferable to minimize the differences of multiple levels of feature maps generated by the student network and those generated by the teacher network. Therefore, a mean squared error between feature maps may be calculated. The transfer learning loss from the teacher network to the student network is calculated as below:

$$Ltr = MSE(P2,P^*2) + MSE(P3,P^*3) + MSE(P4,P^*4) + MSE(P5,P^*5) \quad \text{Equation (3)}$$

where MSE(•) computes the mean squared error between two feature maps,
{P2, P3, P4, P5} is a set of feature maps produced by the teacher network, and
{P*2, P*3, P*4, P*5} is the set of feature maps produced by the student network.

Benefiting from the additional supervision from the pre-trained image-based RCNN model 2902, the student network gets higher performance and takes fewer iterations to converge.

Total loss of during the training may be computed as:

$$L = Lcls + Lbox + \lambda dp Ldp + \lambda kp Lkp + \lambda tr Ltr \quad \text{Equation (4)}$$

Where, Lcls, Lbox, Ldp, Lkp, Ltr are losses for the person classification, bounding box regression, Cross-entropy loss, key-points, and transfer learning respectively.

The classification loss Lcls and the box regression loss Lbox are standard RCNN losses. The Cross-entropy loss loss Ldp may include several sub-components: (1) Cross-entropy loss for the coarse segmentation tasks, and (2) Cross-entropy loss for body part classification and smooth L1 loss for UV coordinate regression. Each pixel is classified as either belonging to the background or one of the 24 human body regions. The losses may be used to determine the exact coordinates of the pixels. For example, 24 regressors may be created to break the full human into small parts and parameterize each piece using a local two-dimensional UV coordinate system, that identifies the position UV nodes on this surface part.

Further, Lkp may be added to help balance between the torso with more UV nodes and limbs with fewer UV nodes. Inspired by Key-point RCNN, each of the 17-ground truth key-points may be one-hot-encoded in one 56×56 heatmap, generating 17×56×56 key-points heatmaps and the output may be supervised with the Cross-Entropy Loss. To closely regularize the regression, the key-point heatmap regressor takes the same input features used by the Denspose UV maps.

Figure 30:
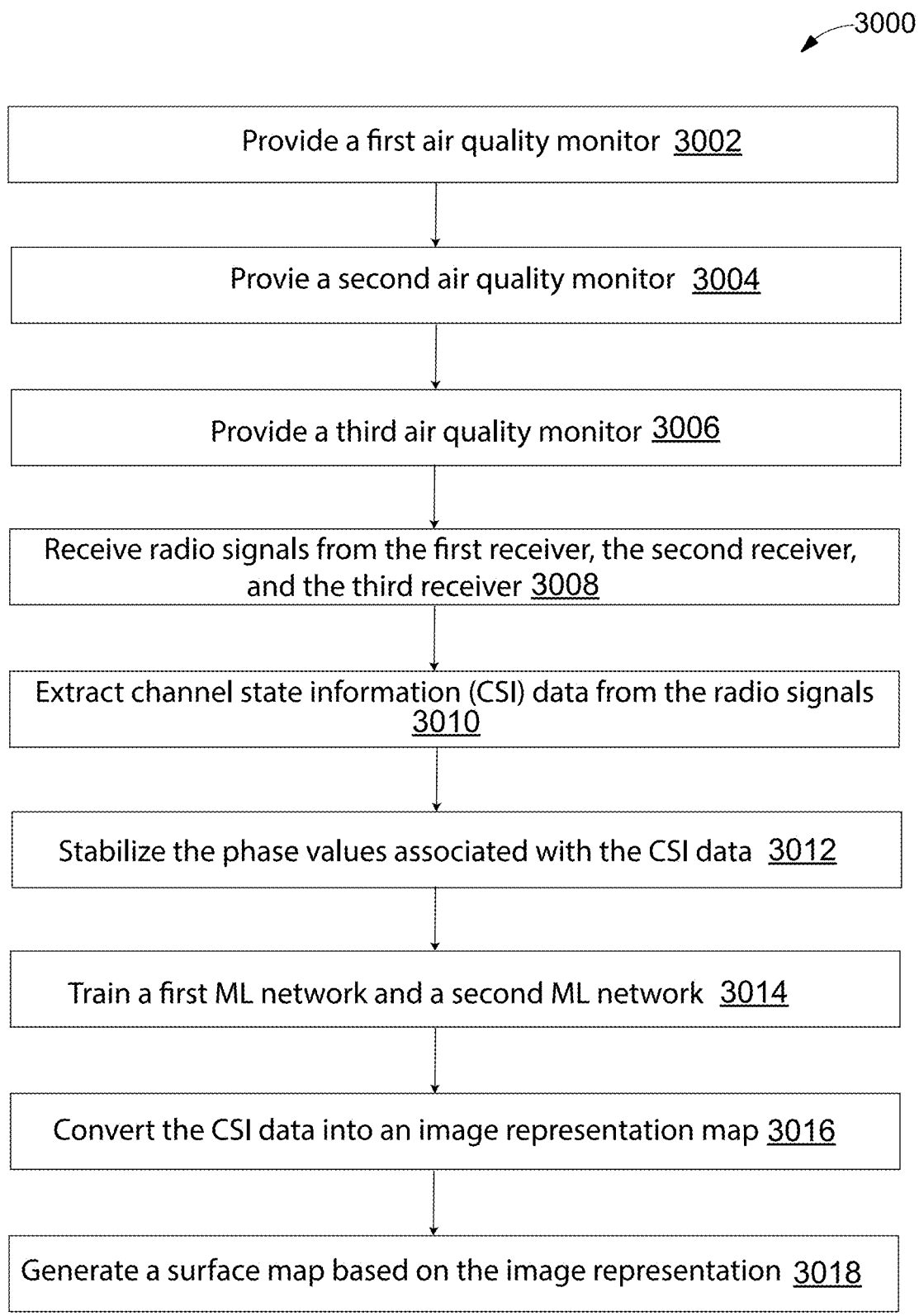
FIG. 30 is a flowchart of a method of detecting human presence in an outdoor monitored site, in accordance with some configurations.

Referring now to FIG. 30, a flowchart of a method 3000 of detecting human presence in an outdoor monitored site 2410 is illustrated, in accordance with some configurations. The method may be performed by the human presence detecting device 2402 in conjunction with the first ML network 2412A and the second ML network 2412B.

At step 3002, the first air quality monitor 2404-1 may be provided. The first air quality monitor 2404-1 may include the first transmitter 2406-1 for transmitting radio signals and the first receiver 2408-1 for receiving the radio signals. The first air quality monitor 2404-1 may include a first location at which the first air quality monitor 2404-1 may be located on the outdoor monitored site 2410. At step 3004, the second air quality monitor 2404-2 may be provided. The second air quality monitor 2404-2 may include the second transmitter 2406-2 for transmitting radio signals and the second receiver 2408-2 for receiving the radio signals. The second air quality monitor 2404-2 may include a second location at which the second air quality monitor 2404-2 may be located on the outdoor monitored site 2410. At step 3006, the third air quality monitor 2404-3 may be provided. The third air quality monitor 2404-3 may include the third transmitter 2406-3 for transmitting radio signals and the third receiver 2408-3 for receiving the radio signals. The third air quality monitor 2404-3 may include a third location at which the third air quality monitor 2404-3 may be located on the outdoor monitored site 2410. Each of the first receiver 2408-1, the second receiver 2408-2, and the third receiver 2408-3 may be configured to receive radio signals transmitted by at least one the first transmitter 2406-1, the second transmitter 2406-2, and the third transmitter 2406-3. In some example configurations, the radio signals may be selected from within a frequency range of 2.4 Giga Hertz (GHz) to 5 GHz.

At step 3008, the radio signals as received by each of the first receiver 2408-1, the second receiver 2408-2, and the third receiver 2408-3 may be received from the first receiver 2408-1, the second receiver 2408-2, and the third receiver 2408-3. The radio signals may correspond to a space through which the radio signals propagate within the outdoor monitored site 2410.

At step 3010, channel state information (CSI) data may be extracted from the radio signals, by the first ML network 2412A. The CSI data may include phase values and amplitude values. The first ML network 2412A may be a modality translation network.

At step 3012, upon extracting the CSI data, the phase values associated with the CSI data may be stabilized. In some configurations, stabilizing may include unwrapping the phase values associated with the CSI data. The stabilizing may further include, upon unwrapping, applying linear fitting to the phase values associated with the CSI data, to obtain stabilized phase values.

In some configurations, at step 3014, the first ML network 2412A and the second ML network 2412B may be trained. In particular, the first ML network 2412A and the second ML network 2412B may be trained together as a student network, using an image-based RCNN network as a teacher network. The training may include fixing teacher network weights and training the student network by feeding the teacher network and the student network with the image data and CSI tensors, respectively, and updating the student network. It should be noted that configuration of the student network may correspond to configuration of the teacher network. In particular, backbone (e.g., ResNet) of the student network may mimic backbone of the teacher network. As will be appreciated by those skilled in the art, a backbone of an ML network may include a series of convolutional layers, which are designed to identify and extract visual features such as edges, shapes, and textures from images.

These extracted visual features may then be passed on to subsequent layers for further processing and analysis.

At step 3016, the CSI data may be converted into an image representation map by the first ML network, by performing domain translation of the CSI data using a two-branch encoder-decoder network. The step 3016 of converting the CSI data into image representation map is explained in detail in conjunction with FIG. 31.

At step 3018, a surface map may be generated based on the image representation, by the second ML network 2412B. The surface map may be a representation of correspondence between the image representation map and a 3-dimensional (3D) surface associated with a human body. The second ML network 2412B may be a radio signal-based RCNN network. The step 3018 of generating the surface map is further explained in detail in conjunction with FIG. 32.

Figure 31:
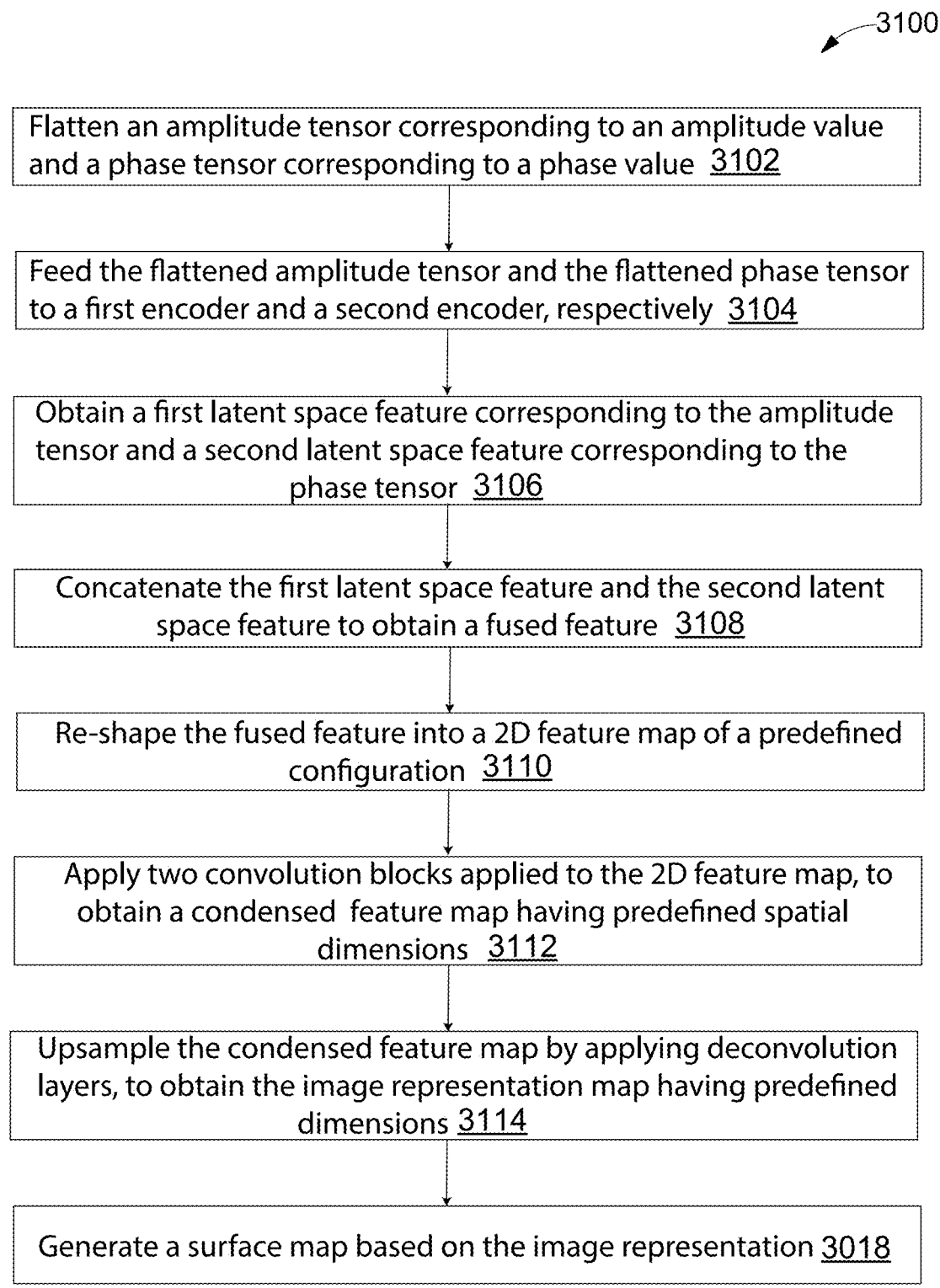
FIG. 31 is a flowchart of a method of converting the CSI data into the image representation map, in accordance with some configurations.

Referring now to FIG. 31, a flowchart of a method 3100 of converting the CSI data into the image representation map is illustrated, in accordance with some configurations. At step 3102, an amplitude tensor corresponding to the amplitude value and a phase tensor corresponding to the phase value may be flattened, to obtain a flattened amplitude tensor and a flattened phase tensor, respectively. At step 3104, the flattened amplitude tensor and the flattened phase tensor may be fed to a first encoder and a second encoder, respectively. For example, each of the first encoder and the second encoder may be a multi-layer perceptrons (MLP).

At step 3106, a first latent space feature corresponding to the amplitude tensor and a second latent space feature corresponding to the phase tensor may be obtained, from the first encoder and the second encoder, respectively. At step 3108, the first latent space feature and the second latent space feature may be concatenated to obtain a fused feature. At step 3110, the fused feature may be reshaped into a 2D feature map of a predefined configuration. In some example implementations, the predefined configuration of the 2D feature map may be 24×24.

Additionally, at step 3112, two convolution blocks may be applied to the 2D feature map, to obtain a condensed feature map having predefined spatial dimensions. At step 3114, the condensed feature map may be upsampled, by applying deconvolution layers, to obtain the image representation map having predefined dimensions. In some example implementations, the predefined configuration of the image representation map may be 3×720×1280.

Figure 32:
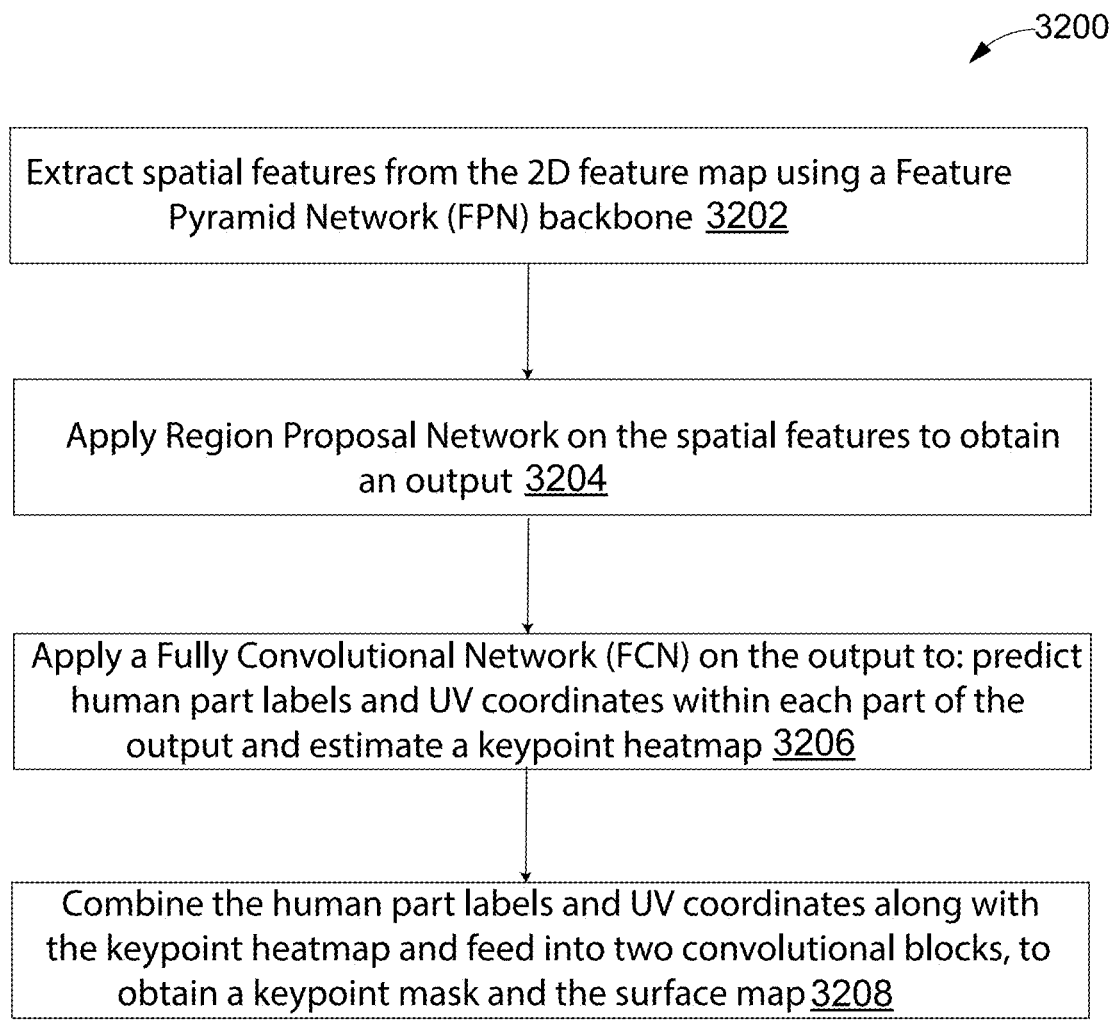
FIG. 32 is a flowchart of a method of generating the surface map, in accordance with some configurations.

Referring now to FIG. 32, a flowchart of a method 3200 of generating the surface map is illustrated, in accordance with some configurations. At step 3202, spatial features may be extracted from the 2D feature map using a Feature Pyramid Network (FPN) backbone. At step 3204, Region Proposal Network may be applied on the spatial features to obtain an output. At step 3206, a Fully Convolutional Network (FCN) may be applied on the output to: predict human part labels and UV coordinates within each part of the output and estimate a key-point heatmap. At step 3208, the human part labels and UV coordinates may be combined along with the key-point heatmap, and fed into two convolutional blocks, to obtain a key-point mask and the surface map.

First Alternative Embodiment

In a configuration, another radio-signal based human pose estimation method and system is disclosed. The method relies on transmitting a low power radio frequency (RF) signal and receiving its reflections. Conventionally, in order to separate RF reflections from different objects, techniques like FMCW (Frequency Modulated Continuous Wave) and antenna arrays are used, wherein the FMCW separates RF reflections based on the distance of the reflecting object, whereas antenna arrays separate reflections based on their spatial direction.

In accordance with the techniques of the present disclosure, a radio is used that generates an FMCW signal and has two antenna arrays: a vertical antenna array and a horizontal antenna array. As such, the input data is in form of two-dimensional heatmaps—one for each of the horizontal and vertical antenna arrays.

Figure 33:
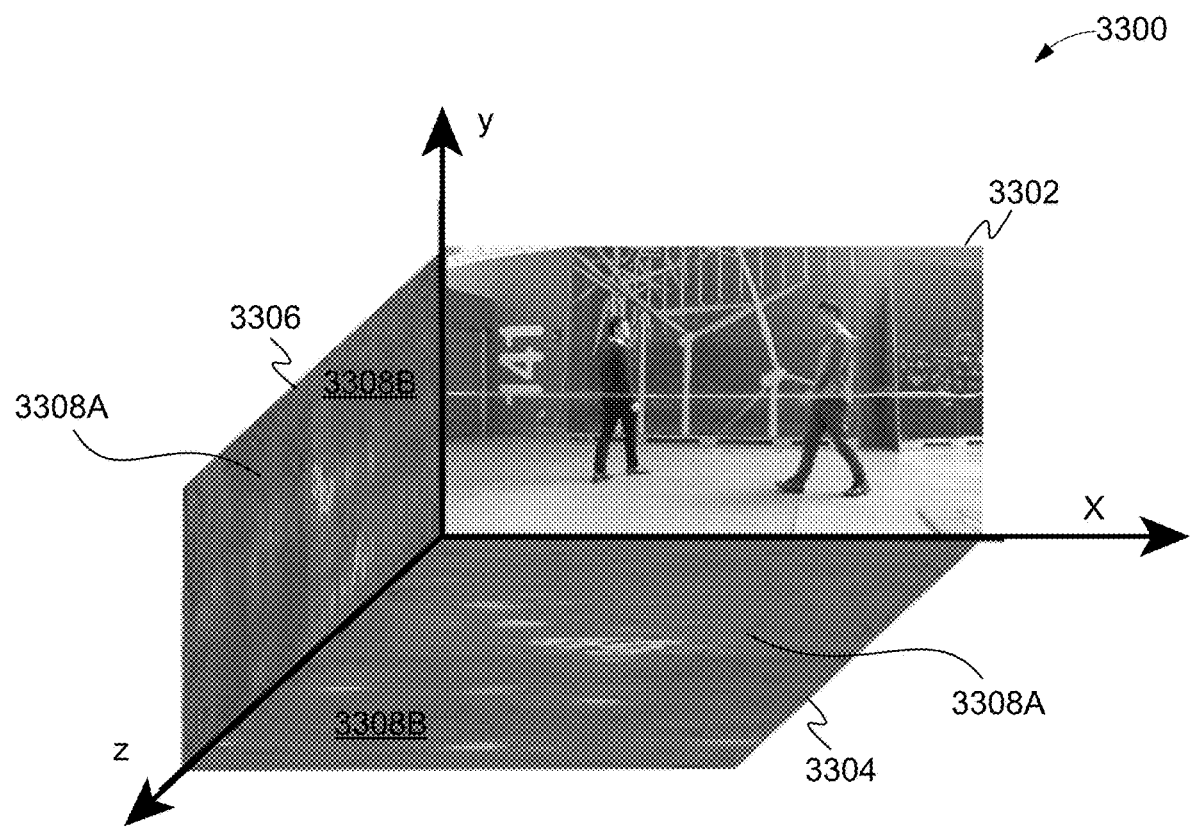
FIG. 33 illustrates a schematic diagram of a RGB image of a physical scenario (for example, of an outdoor site) along with an associated horizontal heatmap and an associated vertical heatmap, in accordance with some configurations.

Referring to FIG. 33, a schematic diagram 3300 of a RGB image 3302 of a physical scenario (for example, of an outdoor site) along with an associated two-dimensional (2D) horizontal heatmap 3304 and an associated 2D vertical heatmap 3306 is illustrated, in accordance with some configurations. The 2D horizontal heatmap 3304 is a projection of the RF signal reflections on a plane parallel to the ground in the scenario. The 2D vertical heatmap 3306 is a projection of the reflected signals on a plane perpendicular to the ground. Sections 3308A (represented in Red color in the actual heatmap) of the 2D horizontal heatmap 3304 and the 2D vertical heatmap 3306 refer to refer to large values, while the remaining sections 3308B (represented in Blue color in the actual heatmap) refer to small values. It should be noted that the RF signals are complex numbers, and each pixel in this heatmap may have real and imaginary components. For example, the radio of the present embodiment may generate 30 pairs of heatmaps per second.

Further, it should be noted that the RF signals may have intrinsically different properties than visual data, i.e., camera pixels. In particular, firstly, RF signals in the frequencies that traverse walls have low spatial resolution, and much lower than vision data (the resolution is typically tens of centimetres), and defined by the bandwidth of the FMCW signal and the aperture of the antenna array. Further, the radio may have a depth resolution of about 10 centimetres (cm), and its antenna arrays may have vertical and horizontal angular resolution of 15 degrees. Secondly, the human body is specular in the frequency range that traverse walls. RF specularity is a physical phenomenon that occurs when the wavelength is larger than the roughness of the surface. In this case, the object may act like a reflector, i.e., a mirror, as opposed to a scatterer. The wavelength of the radio may be about 5 cm and hence humans act as reflectors. Depending on the orientation of the surface of each limb, the signal may be reflected towards a sensor or away from it. Thus, in contrast to camera systems where any snapshot shows all un-occluded key-points, in the present embodiment, a single snapshot may have information about a subset of the limbs and miss limbs and body parts whose orientation at that time deflects the signal away from the sensor. Thirdly, the wireless data has a different representation (complex numbers) and different perspectives (horizontal and vertical projections) from a camera. The above properties may have implications for pose estimation, and therefore need to be taken into consideration for designing a neural network to extract poses from the RF signals.

Dataset:

Synchronized wireless and vision data may be collected. A web camera may be attached to the RF sensor, and the images and the RF data may be synchronized with an average synchronization error of 7 milliseconds. Further, more than 50 hours of data collection experiments may be conducted from 50 different environments, for example, different outdoor sites including petroleum rigs, etc, where people performed natural everyday activities. For example, these activities may include walking, jogging, sitting, reading, using mobile phones and laptops, eating, checking equipment, performing maintenance operations at the equipment, etc. Further, data of people of different age groups may be obtained. For example, a maximum and average number of people in a single frame may be 14 and 1.64, respectively. Moreover, empty data frame (that does not include any person) may also be included. Frames where partial occlusions, parts of the human body are hidden due to furniture and building amenities, may also be included (legs and arms may be the most occluded parts).

Figure 34:
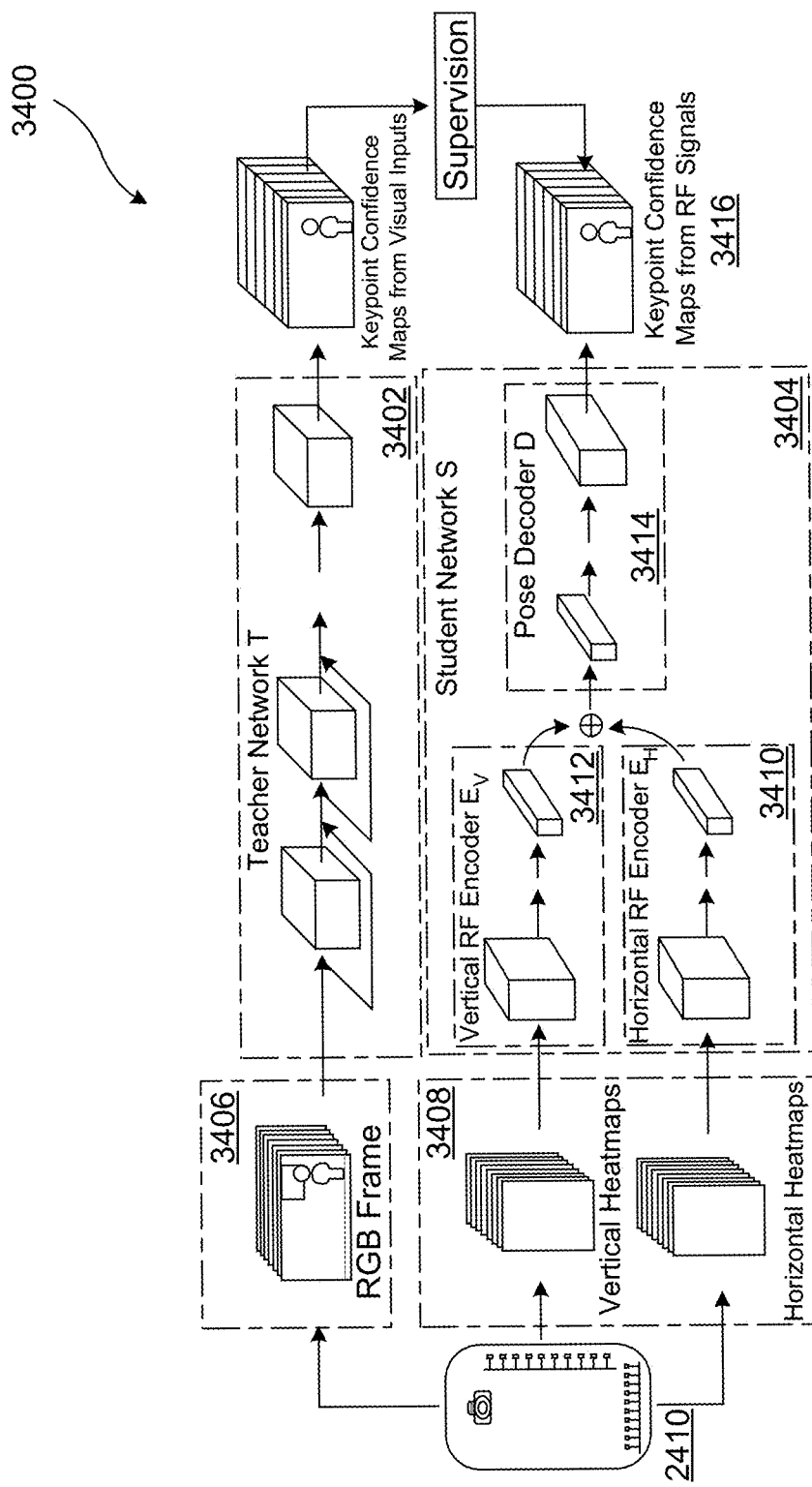
FIG. 34 is a block diagram of a machine learning (ML) network for detecting human presence in the outdoor monitored site, in accordance with some configurations.

Referring now to FIG. 34, a block diagram of a machine learning (ML) network 3400 for detecting human presence in the outdoor monitored site 2410 is illustrated, in accordance with some configurations. The ML network 3400 is based on a teacher-student design, and includes a teacher network 3402 and a student network 3404. The teacher network 3402 may provide cross-modal supervision and the student network 3404 may perform RF-based pose estimation using the heatmaps.

The ML network 3400, which is configured to work as a cross-modal teacher-student network, may transfer the visual knowledge of human pose using synchronized images and RF signals as a bridge. For example, a synchronized pair of image and RF signals (I, R), where R (3408) denotes a combination of the 2D vertical heatmaps and 2D horizontal heatmaps, and I (3406) denotes the corresponding image) may be received corresponding to the outdoor monitored site 2410. In particular, the teacher network 3402 (also, denoted by T(•)) may receive the images I (3406) as input and predict key-point confidence maps as T(I). These predicted key-point confidence maps T(I) may provide cross-modal supervision for the student network 3404 (also, denoted by S(•)). The student network 3404 may learn to predict key-point confidence maps from the RF signals (3408). By way of an example, the teacher network 3402 may be a 2D pose estimation network. The student network may learn to predict 14 key-point confidence maps corresponding to the following anatomical parts of the human body: head, neck, shoulders, elbows, wrists, hips, knees and ankles. The training objective of the student network 3404 [S(•)] is to minimize the difference between its prediction S(R) and the teacher network's prediction T(I), as follows:

$$\lim_{S} \sum_{(I,R)} L(T(I), S(R)) \qquad \text{Equation (5)}$$

The loss is defined as the summation of binary cross entropy loss for each pixel in the confidence maps:

$$L(T, S) = -\sum_{c}\sum_{i,j} S_{ij}^c \log T_{ij}^c + (1 - S_{ij}^c)\log(1 - T_{ij}^c)$$

Where, $T_{ij}^c$ and $S_{ij}^c$ are confidence scores for the (i, j)-th pixel on the confidence map c.

The ML network 3400 takes into account the properties of RF signals (mentioned above). Further, as mentioned above, the human body is specular in the RF range of interest, and, therefore, the human pose cannot be estimated from a single RF frame (i.e., a single pair of horizontal and vertical heatmaps) because the frame may be missing certain limbs even though they are not occluded. Further, RF signals have low spatial resolution. Hence, it may be difficult to pinpoint the location of a key-point using a single RF frame. To this end, the ML network 3400 may learn to aggregate information from multiple snapshots of RF heatmaps so that it can capture different limbs and model the dynamics of body movement. Thus, instead of taking a single frame as input, the ML network 3400 may receive sequences of frames. For each sequence, the ML network 3400 may output key-point confidence maps as the number of frames in the input, i.e., while the network looks at a clip of multiple RF frames at a time, it still outputs a pose estimate for every frame in the input.

Further, it is desired that the ML network 3400 is invariant to translations in both space and time so that it can generalize from visible scenes to through-wall scenarios. To this end, spatiotemoral convolutions may be used as basic building blocks for the student network 3404. The student network 3404 may transform the information from the views of RF heatmaps to the view of the camera in the teacher network 3402. To do so, the ML network 3400 may first learn a representation of the information in the RF signal that is not encoded in original spatial space, and then decode that representation into key-points in the view of the camera. As shown in FIG. 34, the student network 3404 may include two RF encoding networks—a first RF encoding network 3410 [denoted by $E_h(•)$] and a second RF encoding network 3412 [denoted by $E_v(•)$] for horizontal heatmap streams and vertical heatmap streams, respectively. The student network 3404 may further include a pose decoding network 3414 [denoted by D(•)] that takes a channel-wise concatenation of horizontal RF encodings and vertical RF encodings as input and predicts key-point confidence maps 3416. The RF encoding networks 3410, 3412 may use strided convolutional networks to remove spatial dimensions to summarize information from the original views. The pose decoding network 3414 may then use fractionally strided convolutional networks to decode key-points in the camera's view.

In order to train the ML network 3400, each of the RF encoding networks 3410, 3412 may trained. To this end, each of the RF encoding networks 3410, 3412 may receive 100 frames (3.3 seconds) of RF heatmap as input. The RF encoding networks 3410, 3412 may use 10 layers of 9×5×5 spatio-temporal convolutions with 1×2×2 strides on spatial dimensions every other layer. Further, batch normalization may be used followed by the ReLU activation functions after every layer.

For training the pose decoding network 3414, spatio-temporal convolutions may be combined with fractionally strided convolutions to decode the pose. The pose decoding network 3414 may include 4 layers of 3×6×6 with fractionally stride of 1×1/2×1/2, except the last layer that has 1×1/4×1/4. Further, Parametric ReLu may be used after each layer, except for the output layer, where sigmoid may be used.

A complex-valued RF heatmap may be represented by two real-valued channels that store the real and imaginary parts. To this end, a batch size of 24 may be used. In some configurations, the above networks may be implemented in PyTorch.

During operation, the student network 3404 may generate key-point confidence maps 3416 for all key-points of all humans in a scene. The key-points may be mapped to skeletons. To this end, a non-maximum suppression may be performed on the key-point confidence maps to obtain discrete peaks of key-point candidates. To associate key-points of different persons, a relaxation method may be used. Further, Euclidean distance may be used for the weight of two key-point candidates. It should be noted that an association may be performed on a frame-by-frame basis, based on the learned key-point confidence maps.

The performance of the ML network 3400 may be evaluated on through-wall scenes. To this end, a mobile camera system may be used that included 8 cameras to provide ground truth when the people are fully occluded. After calibrating the camera system, 3D poses of people may be constructed and projected on the view of the camera. The camera may be co-located with RF sensor. The maximum and average number of people in each frame in the through-wall testing set, for example, may be 3 and 1.41, respectively. The through-wall data may only be used for testing and not to train the model.

Second Alternative Embodiment

As already mentioned above, when the Wi-Fi signals travel through space, they interact with the human body, and any human activities, either small scale or large scale, that affect the signal propagation. In accordance with present embodiment, with measurable changes in the received Wi-Fi signals, human activities in the physical environment, for example, an outdoor monitored site are inferred.

Further, as mentioned above, CSI data (i.e., the sampled version of the channel frequency response) can be used to estimate the channel condition for fast and reliable communication. The CSI data may be directly exported from the network interface card (NIC) to measure the changes in the CSI amplitude and phase for inferring human activities. In particular, current 802.11a/g/n/ac employs Orthogonal Frequency-Division Multiplexing (OFDM) technology, which partitions the relatively wideband Wi-Fi channel into 52 subcarriers and provides detailed CSI for each subcarrier. The CSI data directly exported from the commodity Wi-Fi devices only provides information on how the wireless channel was interrupted by human activities. In order to determine spatial information regarding human activities, such as the location and the shape of the human body, within the space where the radio signals (i.e. Wi-Fi signals) propagate, the Angle of Arrival (AoA) of the incident signals at the antenna array of Wi-Fi devices may be examined.

One-dimensional (1D) Angle of Arrival (AoA)

Figure 35A:
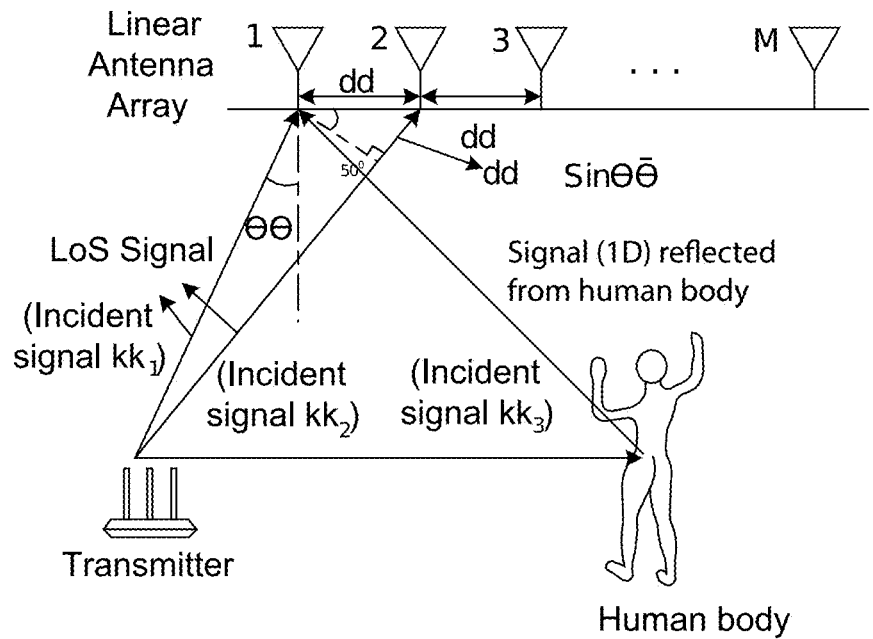
FIG. 35A illustrates incident signals incur different phase shifts across antennas in an array, in accordance with some configurations.

One-dimensional (1D) angle of arrival (AoA) of incident signals (e.g., the Line of Sight (LOS) signals and the reflected signals from the human(s) and environment) may be derived, when the Wi-Fi receiver is equipped with a linear antenna array. This is because the incident signals incur different phase shifts across the antennas in an array, as shown in FIG. 35A. In an example scenario, there may be M number of antennas in a uniform linear array, and the distance between adjacent antennas may be d (d is a half wavelength). Taking the LoS signals of FIG. 35A as example, LoS signal $k_1$ propagates to the antenna array with an AoA of θ. The path difference of the LoS signal between adjacent antennas (e.g., the difference between $k_1$'s path and $k_2$'s path) is d·sin θ. Then, relative to the first antenna in the array, the phase shift introduced at the ma, antenna may be derived as follows:

$$\Phi(\theta)_m = 2\pi f(m-1) \cdot \sin(\theta)/c \quad \text{Equation (6)}$$

where f is the frequency of the signal and c is the speed of light.

The introduced complex exponential phase shift may be denoted as a function of the 1D AoA:

$$\Phi(\theta) = e^{-j2\pi f d \sin(\theta)/c} \quad \text{Equation (7)}$$

For the LoS signal, the phase shifts across the M antennas in the uniform linear array may be denoted as:

$$a(\theta) = [1 \Phi(\theta) \ldots \Phi(\theta)^{M-1}]^T \quad \text{Equation (8)}$$

where, a is called as the steering vector.

The outdoor multipath environment may include multiple incident signals from different directions, for example, the LoS signal (e.g., $k_1$ or $k_2$) and signals reflected from the human body (e.g., $k_3$), as shown in FIG. 35A. Therefore, when K incident signals from different angles arrive at a uniform linear antenna array 3500A of M antennas, the received signal at each antenna is the superposition of all incident signals. Further, the corresponding steering vectors form the steering matrix $[a(\theta_1), \ldots, a(\theta_K)]$. Based on this, AoAs of the incident signals may be derived by using Multiple Signal Classification (MUSIC) algorithm. For example, the MUSIC algorithm may be used for frequency estimation and radio direction finding.

Figure 35B:
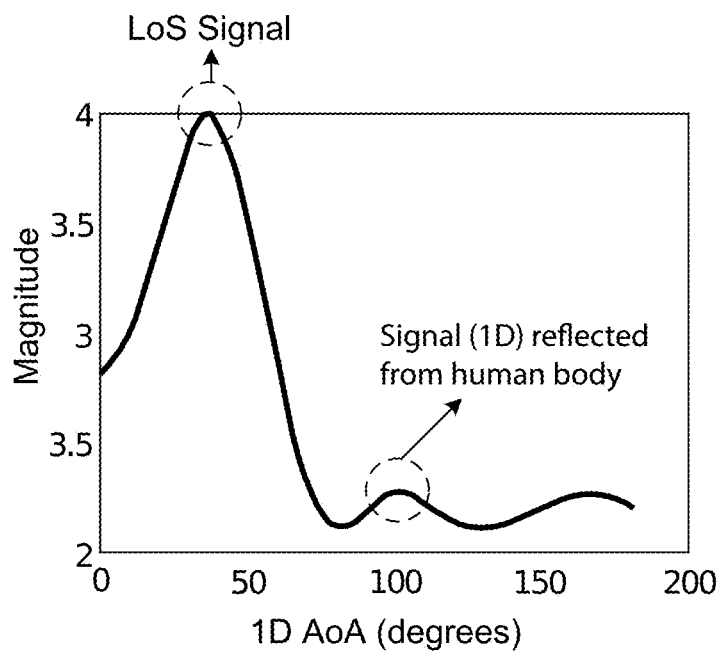
FIG. 35B illustrates a graphical representation of an estimated 1D AoA of the LoS signal and the signal reflected from the human body (corresponding to FIG. 35A), in accordance with some configurations.

FIG. 35B illustrates a graphical representation of an estimated 1D AoA of the LoS signal and the signal reflected from the human body, in accordance with some configurations. As can be seen in FIG. 35B, the 1D AoA may offer the direction of the indicant signal with respect to the antenna array. For example, the peak at around 40 degrees indicates the LoS signal, whereas the second peak at around 100 degrees represents the signal reflected off the human body. However, 1D AoA only provides very limited spatial information, which is insufficient for tracking multiple human limbs. For instance, it cannot provide the position of a person in a 2D space, not to mention to pinpoint the spatial locations of multiple human limbs.

Two-Dimensional (2D) Angle of Arrival (AoA)

The 1D AoA estimation may be extended to 2D AoA estimation with the help of the non-linearly spaced antennas at the Wi-Fi device. This allows distinguishing different signals in the 2D space (instead of the 1D space). In particular, an L-shaped antenna array at the receiver may be used to derive both the azimuth angle Φ and the elevation angle θ of the incident signals. The L-shaped antenna array may have M antennas separated by distance d at the receiver, and these antennas may form the $X_A$-$Y_A$-$Z_A$ coordinate system. Based on this, the 2D AoA estimation may be formulated.

Figure 36A:
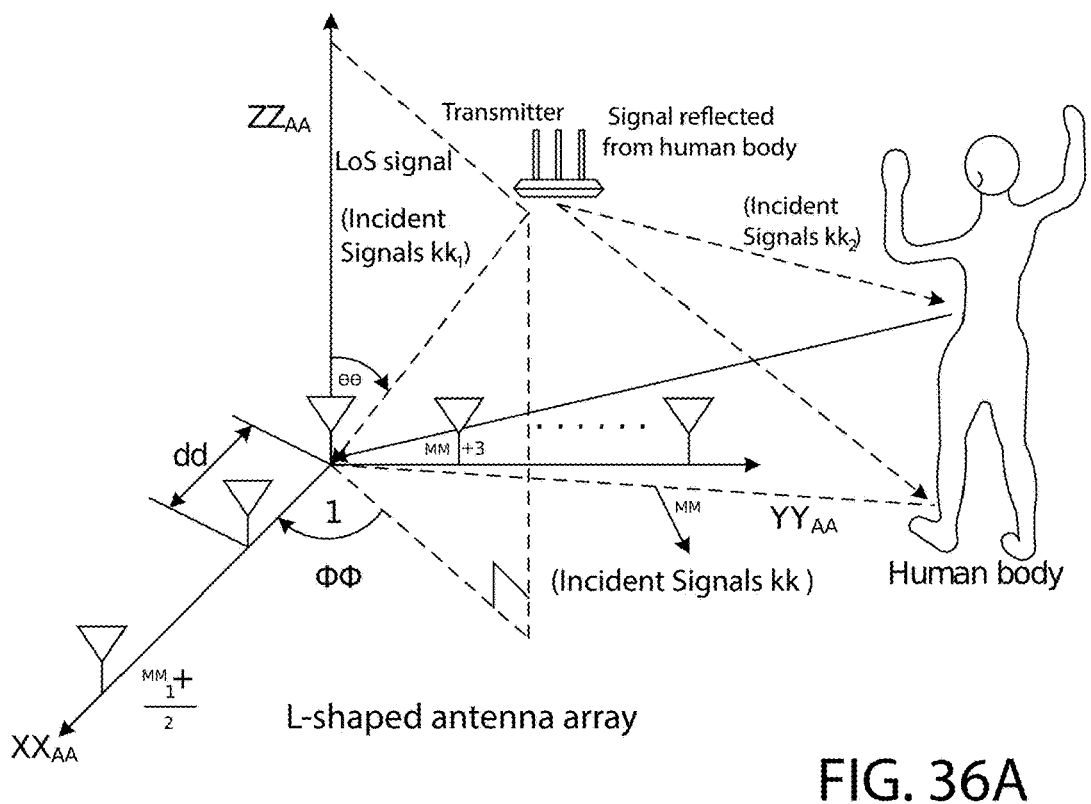
FIG. 36A illustrates a schematic diagram of a L-shaped antenna array, in accordance with some configurations.

FIG. 36A illustrates a schematic diagram of a L-shaped antenna array 3600A, in accordance with some configurations. Assuming that there are K incident signals including the LoS signal (e.g., $k_1$), and signals reflected from the human body (e.g., $k_2$ and $k_3$), these signals may be arriving at the L-shaped antenna array 3600A in the $X_A$-$Y_A$-$Z_A$ coordinates. Phase shift for the $k^{th}$ incident signal on the $m^{th}$ antenna can be represented as:

$$\Phi_m(\Phi_m, \theta_m) = e^{-j2\pi f \sin(\theta_k)[X_{Am}\cos(\Phi_k) + Y_{Am}\sin(\Phi_k)]/c} \quad \text{Equation (9)}$$

where ($X_{Am}$, $Y_{Am}$) denote the $m^t$ antenna's coordinates. For example, the first antenna is located at (0,0) and the second antenna is located at (d, 0). Correspondingly, the steering vector for 2D AoA can be denoted as:

$$a(\Phi_k, \theta_k) = [\Phi_1(\Phi_k, \theta_k)\Phi_2(\Phi_k, \theta_k) \ldots \Phi_3(\Phi_k, \theta_k)]^T \quad \text{Equation (10)}$$

A steering matrix for 2D AoA is $[a(\Phi_1, \theta_1), \ldots, a(\Phi_k, \theta_k)]$. Likewise, the MUSIC algorithm may be leveraged to calculate the 2D AoA spatial spectrum.

Figure 36B:
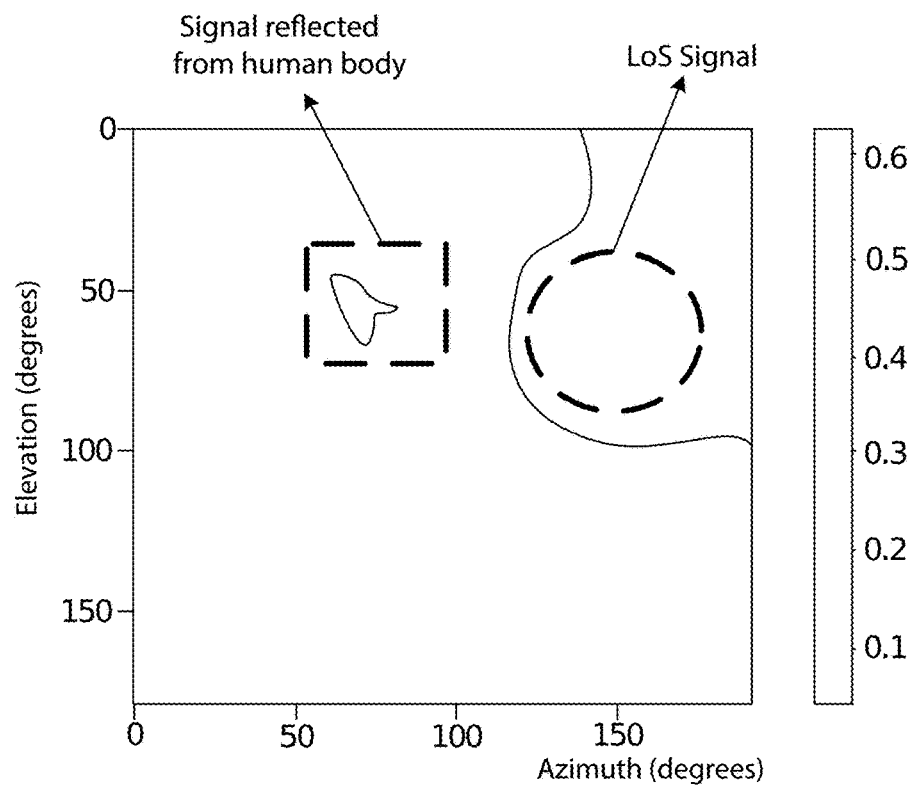
FIG. 36B shows a graphical representation of the result of the 2D AoA estimation with the Wi-Fi devices (corresponding to FIG. 36A), in accordance with some configurations.

FIG. 36B shows a graphical representation of the result of the 2D AoA estimation with the Wi-Fi devices. As it can be seen in FIG. 36B, the resolution is low as the Wi-Fi device only supports up to 3 antennas. Specifically, there are two antennas on each of the $X_A$-axis and $Y_A$-axis with one antenna shared by two axes. Further a fuzzy peak with strong spectrum energy represents the 2D location of the transmitter, whereas the area with lower energy indicates the 2D location of the signals reflected from the human body. Although the 2D AoA derived from Wi-Fi devices can provide the approximate location of the human body in 2D space, it may not able to differentiate signals reflected from different parts of the human body, such as these from the torso (i.e., signal k) or from the leg (i.e., signal k3). This is because the hardware constraints of the Wi-Fi result in a very low resolution of the 2D AoA spectrum. To overcome such limitation, it is preferred to improve the resolution of the 2D AoA spectrum by combining both the spatial diversity at the transmitter and the frequency diversity of Wi-Fi OFDM subcarriers, as is described in the following sections of the present disclosure.

Figure 37:
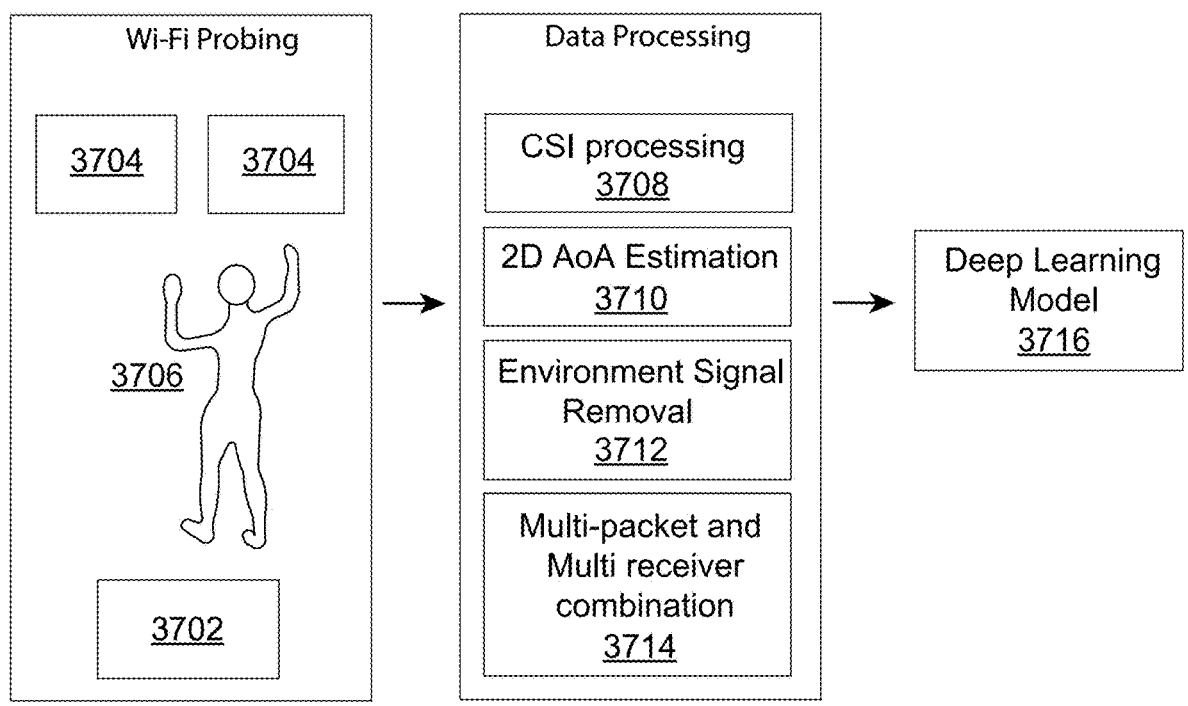
FIG. 37 illustrates a system overview diagram of a system for modelling 3D surface of human body for 3D pose estimation, in accordance with some configurations.

In accordance with some implementations of the present embodiment, a system and a method to improve the resolution of the 2D AoA spectrum and removing the environment effects are disclosed. In order to model the complex 3D skeletons of the human body for 3D pose estimation, the spatial information of the 2D AoA spectrum and deep learning may be used. Referring to FIG. 37, a system overview diagram 3700 of a system for modelling 3D surface of human body for 3D pose estimation is illustrated, in accordance with some configurations.

A Wi-Fi transmitter 3702 (equivalent to the transmitters 2406) may send out signals to multiple Wi-Fi receivers 3704 (equivalent to the receivers 2408). The signals emitted by the Wi-Fi transmitter 3702 may be used probe human activities, corresponding to the human subjects 3706 in the space where the Wi-Fi transmitter 3702 and the Wi-Fi receivers 3704 are installed. Data processing may be performed upon receiving time-series CSI measurements as input, which can be exported from the NICs of the commodity Wi-Fi devices. The CSI measurements may be exported for 30 subcarriers on each Wi-Fi link. The CSI data from existing traffic across these links may be used. Alternatively, periodic traffic may be generated for sensing purposes. At 3708, CSI data may be pre-processed to remove noises by using a linear fit method.

Thereafter, at 3710, 2D AoA extraction may be performed. To this end, both the spatial diversity and the frequency diversity may be combined to increase the resolution of 2D AoA for differentiating signals reflected from different parts of the human body. At 3712, signals reflected from the indoor environments may be filtered out, via static environment removal. At 3714, the 2D AoA spectrum of multiple packets at multiple receivers may be combined to resolve the issue of specularity of the human body (i.e., one packet can only capture a subset of motions of the human body).

The present embodiment leverages deep learning network 3716 (comprising of CNN and LSTM) to construct the 3D pose of the human body based on the 2D AoA spectrum (i.e. input data). The CNN part of the deep learning network 3716 may be used to capture the spatial feature of the human body parts. The LSTM part of the deep learning networks 3716 may be used to estimate the temporal features of the motions, to achieve on-the-go pose tracking for unseen activities.

Improving 2D AoA Estimation

The limited number of antennas on commodity Wi-Fi receivers (e.g., Intel 5300 card has up to only three antennas) provide insufficient 2D AoA resolution for 3D human pose estimation. As such, both the spatial diversity at the transmitter and the frequency diversity of the Wi-Fi OFDM subcarriers may be used. The 2D AoA estimation may be improved by leveraging both the spatial diversity in three transmitting antennas as well as the frequency diversity of thirty OFDM subcarriers. The spatial diversity in three transmitting antennas can introduce phase shifts due to the angle of departure (AoD), while the frequency diversity of OFDM subcarriers can result in phase shifts with respect to time of flight (ToF). Therefore, 2D AoA, AoD, and ToF may be jointly estimated by leveraging both the spatial and frequency diversities, to improve the resolution of the 2D AoA spectrum.

In particular, CSI measurements of the Wi-Fi signals may be used across all OFDM subcarriers transmitted from multiple transmitting antennas and received at multiple receiving antennas to generate a large number of virtual sensing elements. In some implementations of the present embodiment, for each subarray (i.e., on X_A-axis or Y_A-axis in the X_A-Y_A-Z_A coordinates), two receiving antennas, three transmitting antennas, and thirty subcarriers may be used. As such, a total 180 sensing elements may be used for each axis, that may provide improved resolution. The spatial and frequency diversities thus result in sufficient information that allows for jointly estimating high-resolution 2D AoA (azimuth and elevation), AoD, and ToF, simultaneously. The information may be combined together to improve the resolution of 2D AoA estimation.

Figure 38:
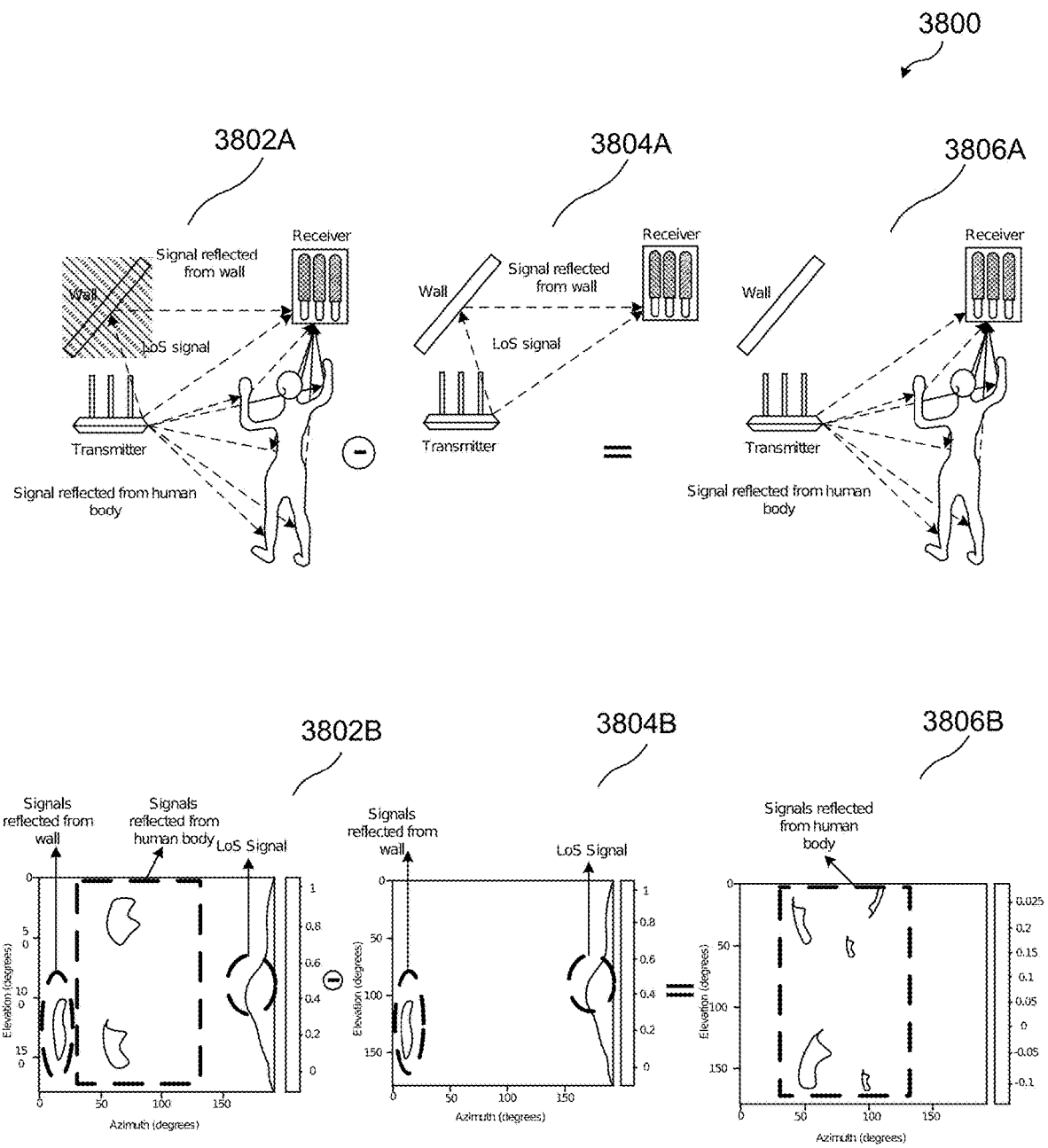
FIG. 38 is a flow diagram of a process of static environment removal, in accordance with some configurations.

FIG. 38 illustrates a flow diagram of a process 3800 of static environment removal, in accordance with some configurations. By way of the process 3800 may enable separating multipath signals in 2D space and capturing different parts of the human body of the moving subject with the improved 2D AoA spectrum. At 3802A, multipath signals including the LoS signal, the signal reflected by the wall, and the signals reflected from different parts of the human body are illustrated. The 2D AoA spectrum resulting from the multipath signals of 3802A is illustrated at 3802B. As such, the improved 2D AoA spectrum can be used to differentiate the multipath signals, such as the signals coming from the LoS, the environment, and the human body reflections. Further, the signals reflected from different parts of the human body (e.g., arms, legs, and torso) may be located at different spatial locations (as shown at 3806B).

In order to formulate the improved 2D AoA estimation, it is assumed that the signal emitted from a linear transmitting antenna array is received with a phase shift $\tau(\omega)$, which is the function of AoD. For the $k^{th}$ path with AoD, $\omega_k$, the phase difference across transmitting antennas is given by:

$$\tau(\omega_k)=e^{-j2\pi f d' \sin(\omega_k)/c} \quad \text{Equation (11)}$$

where d' is the distance between transmitting antennas.

Current IEEE 802.11 standard adopts OFDM technology, wherein the data is transmitted over multiple subcarriers. Thus, for equally spaced OFDM subcarriers, the $k^{th}$ path with ToF of $\tau_k$ introduces a phase shift across two consecutive OFDM subcarriers with $f_\delta$ frequency difference that can be represented as follows:

$$\Omega(\tau_k)=e^{-j2\pi f_\delta \tau_k/c} \quad \text{Equation (12)}$$

The 2D AoA (azimuth and elevation), AoD, and ToF may be jointly estimated by defining the sensing element array from all the subcarriers of all the receiving and transmitting antenna pairs. The overall attenuation and phase shift introduced by the channel measured at each subcarrier by each antenna may be reported as the CSI in a R×S×V format (R represents the number of receiving antennas, S represents the number of transmitting antennas, and V represents the number of subcarriers). Therefore, the sensor array can be constructed through stacking CSI from all the subcarriers, resulting in a total number of R×S×V sensors. The new steering vector a(Φ, θ, τ, ω) is formed by phase difference introduced at each of the sensors and is given by:

$$a'(\varphi,\theta,\tau) = [1, \ldots, \Omega_\tau^{V-1}, \ldots, \Omega_\tau^{V-1}\Phi_{(\varphi,\theta)}, \ldots, \Omega_\tau^{V-1}\Phi_{(\varphi,\theta)}, \ldots, \Phi_{(\varphi,\theta)}^{R-1}, \ldots, \Omega_\tau^{V-1}\Phi_{(\varphi,\theta)}^{R-1}]^T.$$

Equation (13)

$$a(\varphi,\theta,\omega,\tau) = [a'_{(\varphi,\theta,\tau)}, \Gamma_\omega a'_{(\varphi,\theta,\tau)}, \ldots, \Gamma_\omega^{S-1} a'_{(\varphi,\theta,\tau)}]T,$$ Equation (14)

where, $\tau_\omega$, $\Omega_\tau$, $\Phi_{(\Phi,\theta)}$, and $a'_{(\Phi,\theta,\tau)}$ are the abbreviations of τ(ω), Ω(τ), Φ(Φ,θ), and a'(Φ,θ,τ), respectively. Therefore, the received signal can be constructed using the above steering vector. Parameters of azimuth, elevation, AoD, and ToF that maximize the spatial spectrum function can be estimated by:

$$P(\varphi, \theta, \omega, \tau)_{improve} = \frac{1}{a^H(\varphi, \theta, \omega, \tau) E_N E_N^H a(\varphi, \theta, \omega, \tau)}.$$ Equation (15)

The azimuth-elevation 2D AoA power spectrum may be derived by accumulating the AoA values in dimensions of ToF and AoD.

Static Environment Removal

The 2D AoA spectrum can be used to remove the LoS signal and the signals reflected from the static environment for environment-independent 3D pose estimation. In particular, the 2D AoA spectrum of the static environment may be subtracted from the 2D AoA spectrum that is extracted with human activities. Then, the 2D AoA spectrum mainly reflects the signals bounced off the human body and therefore is independent of the signals reflected from the static environment. In particular, first, the 2D AoA spectrum of the static environment may be calculated from multiple CSI packets. For example, as shown at 3804A in FIG. 38, the signals of the static environment may include the LoS signal and the signal reflection from static objects (e.g., wall). The spectrum corresponding to 3804A is shown at 3804B from which the 2D locations of the LoS signal and signals reflected from the wall can be distinguished. It should be noted that the spectrum of the static environment should be periodically updated after detecting significant changes in the environment.

At 3802A, a scenario is illustrated in which a person is walking towards the receiver while waving his hands. The corresponding 2D AoA spectrum is shown at 3802B. Although, the signal reflected from the human body is weaker compared to the LoS signal, still the signals reflected from different parts of the human body can be seen. Next, the static spectrum may be subtracted from the spectrum under human activities to obtain the 2D AoA spectrum that only reflects the signals bounced off the human body. At 3806C, the signals reflected from human's different limbs and torso can be seen. It should be noted that the signals reflected from the human body may bounce off the walls again, resulting in secondary reflection to the receivers. For example, when a person shows up, there might be a signal propagates from the transmitter to the person, then reflected from the person to the wall and eventually received by the receiver after wall reflection. Although such a signal cannot be removed from spectrum subtraction, it has little effect on human pose estimation as such it is too weak after the second reflection.

Combining Multiple Packets and Multiple Receivers

The human body is specular with respect to Wi-Fi signals, and therefore the human body acts as a reflector (i.e., a mirror) instead of a scatterer. This is because the wavelength of the Wi-Fi signal is much larger than the roughness of the surface of the human body. On contrary, the human body acts as a scatterer with respect to visible light as its wavelength is much smaller than the roughness of the surface of the human body. Depending on the orientation of the human body, some Wi-Fi signals may be reflected towards the receiver, while some may be reflected away from the receiver. As a result, the 2D AoA spectrum derived from a single Wi-Fi packet can only capture a small subset of body motions and may miss the majority part of the motions.

Figure 39:
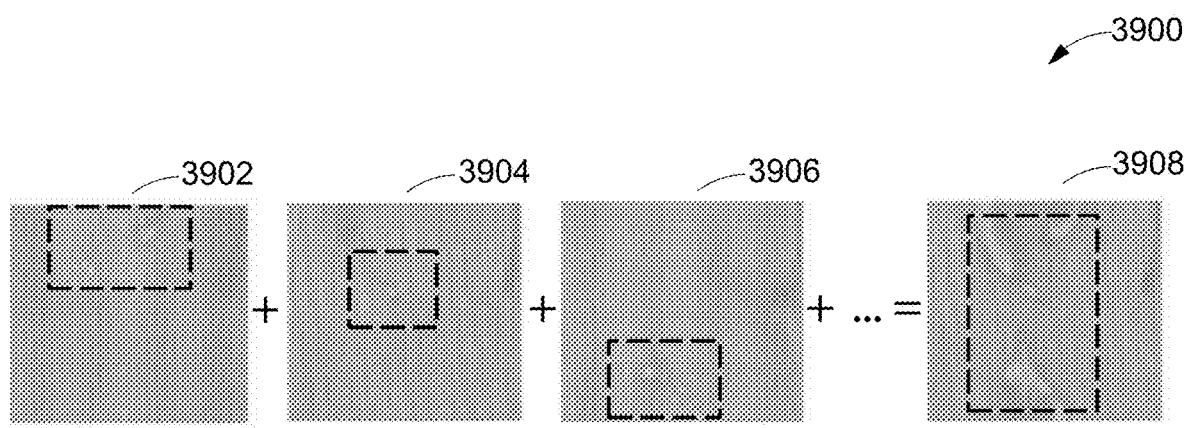
FIG. 39 illustrates a process flow diagram of an example process of combining multiple packets to capture the whole human body, in accordance with some configurations.

To this end, multiple 2D AoA spectrums derived from multiple CSI packets may be combined (i.e., concatenated) to capture the motions of different parts of the human body. FIG. 39 illustrates a process flow diagram of an example process 3900 of combining (i.e., concatenating) multiple packets to capture the whole human body, in accordance with some configurations.

First spectrum 3902 may only capture the upper part of the body (e.g., two arms) and other parts are missing, second spectrum 3904 may only capture the middle part of the body (e.g., the torso), whereas the third spectrum 3906 may only include information about the legs. The fourth spectrum 3908 a result of superimposition of the first spectrum 3902, the second spectrum 3904, and the third spectrum 3906. These 2D AoA spectrums (i.e., the first spectrum 3902, the second spectrum 3904, the third spectrum 3906, and the fourth spectrum 3908) from the CSI data associated with the one or more receivers may be concatenated to obtain a concatenated 2D AoA spectrum.

In accordance with the present embodiment, deep learning networks may learn such information from multiple spectrums derived from multiple packets. In particular, a sequence of packets (i.e., 100 packets) may be taken as input to estimate one human pose. To obtain the 3D information from the 2D AoA spectrum, multiple receivers locations at different positions may be leveraged, as shown in FIG. 40.

Figure 40:
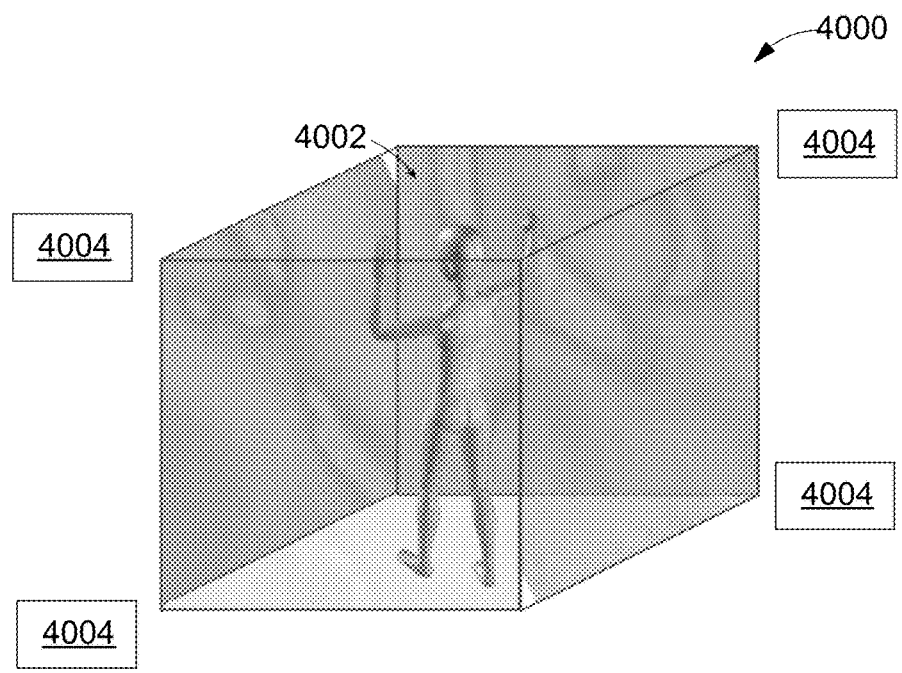
FIG. 40 illustrates a schematic diagram 4000 of an outdoor site with multiple receivers positioned at respective locations at the outdoor site, in accordance with some configurations.

FIG. 40 illustrates a schematic diagram 4000 of an outdoor site 4002 with multiple receivers 4004 positioned at respective locations at the outdoor site 4002, in accordance with some configurations. Each receiver 4004 may be equipped with an L-shaped antenna array and may be used to extract one 2D AoA spectrum. By combing the 2D spectrums from multiple receivers, 3D information of the human pose may be recovered. As the complexity of the 3D human pose is high, deep learning networks may be used to infer the 3D human pose based on the 2D AoA spectrums.

Figure 41:
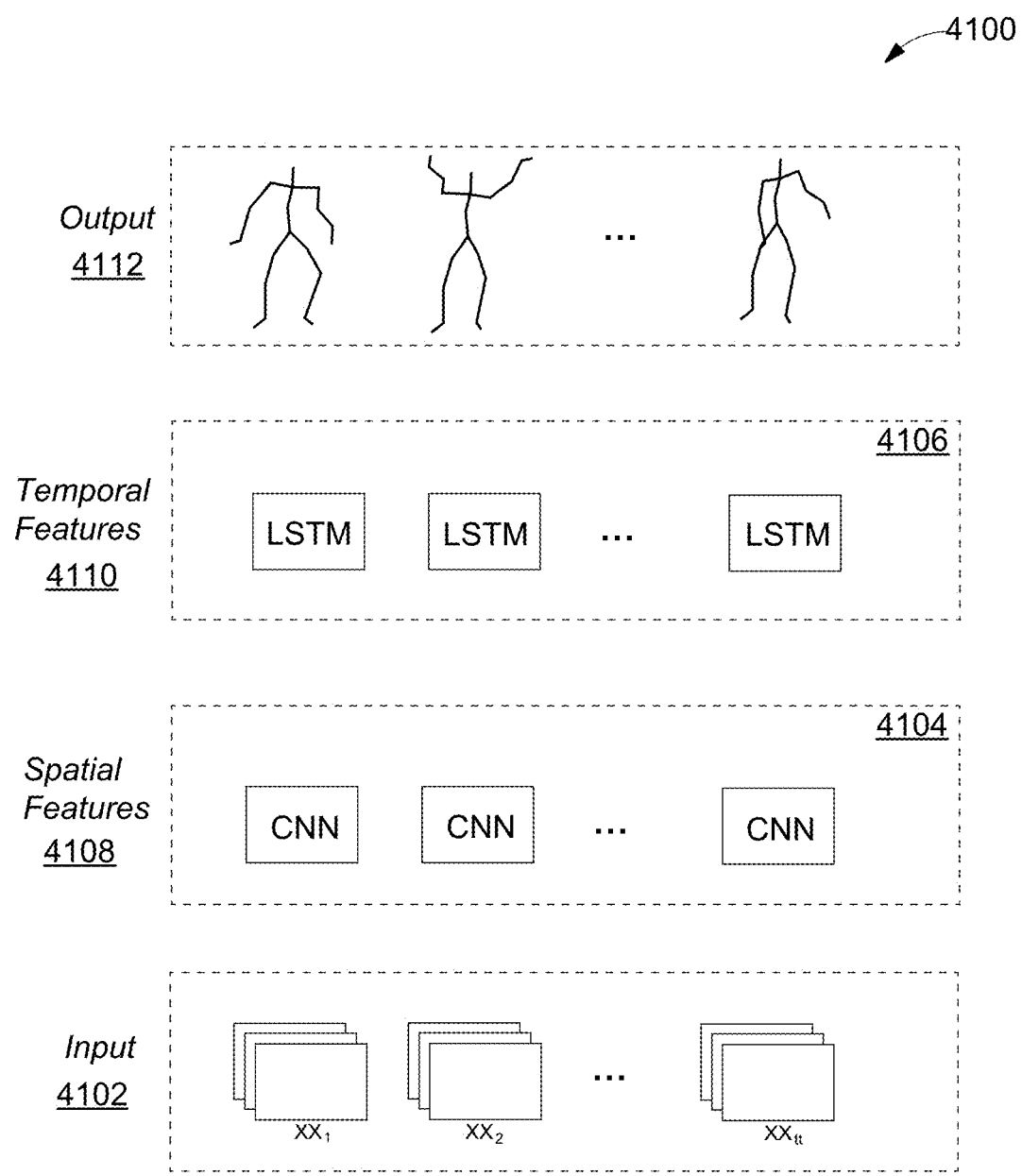
FIG. 41 is a block diagram of a deep learning network for determining 3D human pose based on the 2D AoA spectrums, in accordance with some configurations.

Referring now to FIG. 41, a block diagram of a deep learning network 4100 for determining 3D human pose based on the 2D AoA spectrums is illustrated, in accordance with some configurations.

After 2D AoA estimation, a spectrum with dimensions of 180×180 may be obtained. The range of azimuth and elevation may be set as [0, 180] degrees with a resolution of one degree. Multiple receivers (e.g., 4 receivers) may be used to capture the motions of the user from different angles. The 2D AoA spectrum from four receivers may be concatenated (as explained in conjunction with FIG. 39) to obtain a concatenated 2D AoA spectrum, i.e. a tensor with the dimensions of 180×180×4. Further, multiple spectrums may be combined to capture the full-body movements. For example, 100 packets of each receiver may be concatenated to form a target matrix having dimensions 180×180×400 (this target matrix may be denoted as x_t—this refers to input data 4102 at time t). The whole sequence of the input data input data may be denoted as [x1, x2, ..., x_t]. Each input data 4102 may illustrate the spectrum distribution of one snapshot of the moving user in the physical space, and the continuous input data stream may describe how the spectrum may vary corresponding to human activities. To fully understand the input data stream, both spatial features may be extracted from each input data x_t and the temporal dependencies between x_i and x_j.

In some configurations, the deep learning network 4100 may include a CNN 4104 (also, referred to as CNN layer 4104). The CNN 4104 may extract spatial features 4108 from the target matrix (x_t). The spatial features 4108 may be the positions of different parts of the body in the 2D AoA spectrum. Further, in some configurations, the CNN 4104 may include stacked six-layer CNNs. Further, 3D filters may be used for each CNN layer. After the CNN layer 4104 (also referred to as CNN 4104), a batch normalization layer (not shown in FIG. 41) may be used to standardize the inputs to a network and speed up the training. Further, a rectified linear unit (ReLU) (not shown in FIG. 41) may be added to add non-linearity. Max pooling may be applied to downsample the features. Additionally, a dropout layer (not shown in FIG. 41) may be added to prevent overfitting.

Besides the spatial features 4108, the input data 4102 may also contain temporal features 4110 as the 3D skeleton is dynamic and the movement is consecutive. Recurrent neural networks (RNN) may be used, as the RNN can model complex temporal dynamics of sequences.

In some configurations, the deep learning network 4100 may further include Long Short-Term Memory (LSTM) layer 4106 (or simply, LSTM 4106). The LSTM 4106 may be more capable of learning long-term dependencies. As such, after the CNN layer 4104, a sequence of feature vectors may be obtained, which are then fed into the LSTM layer 4106. In particular, a two-layer LSTM 4106 may be used for temporal modelling.

The deep learning network 4100 may be configured to estimate the locations of 14 key-points/joints of the human body. These key-points/joints, for example, may include head, spine, left/right shoulder, left/right elbow, left/right wrist, left/right hip, left/right knee, and left/right ankle. A 3D skeleton composed of these key-points/joints may be generated as an output 4112 and used to generate a 3D representation of the human body or the human pose.

Loss Functions

The deep learning network 4100 may directly regress the locations of joints of the human body. By way of an example, the training of the deep learning network 4100 may be considered as minimizing the average Euclidean distance error between predicted joints locations and the ground truth. The loss function used for the training may be composed of two parts including the position loss $L_P$ and the Huber loss $L_H$.

To this end, first, the position loss $L_P$ that can be defined as the $L_2$ norm between the predicted joint position $p^{-i}_t$ and the ground truth pit may be minimized, as follows:

$$L_P = \frac{1}{T}\sum_{t=1}^{T}\frac{1}{N}\sum_{i=1}^{N}\|\bar{P}^i_t - P^i_t\|_2, \quad \text{Equation (16)}$$

where, T means the input data sequence contains T data samples, and where, N represents the number of joints. The Huber loss $L_H$ (that is a parameterized loss function for regression problems and less sensitive to outliers in data) may be used, and may be defined as follows:

$$L_P = \frac{1}{T}\sum_{t=1}^{T}\frac{1}{N}\sum_{i=1}^{N}\|\bar{P}^i_t - P^i_t\|_H, \quad \text{Equation (17)}$$

where $\|\cdot\|_H$ is the Huber norm

With the two loss functions, the overall objective function is as follows:

$$L = Q_P \cdot L_P + Q_H \cdot L_H \quad \text{Equation (18)}$$

where $Q_P$ and $Q_H$ are the hyperparameters to balance the losses.

CSI Preprocessing

Before the CSI measurements are fed to the 2D AoA extraction component, CSI preprocessing may be performed to clean the CSI noises. This is because the hardware imperfection of the commodity Wi-Fi device may result in CSI phase distortions. In particular, the receiver has a random phase shift due to sampling time offset (STO) and packet detection delay (PDD) across packets. A linear fit method may be applied to remove the additional phase shift. Suppose $\Psi(v, s \cdot r)$ is the unwrapped phase of the CSI at the $v^{th}$ subcarrier of a packet transmitted from the $s^{th}$ transmitting antenna and received at the $r^{th}$ receiving antenna, we can obtain the optimal linear fit as follow:

$$\hat{\tau} = \arg\min \sum_{v,s=1}^{V,S}\sum_{r=1}^{R}(\psi(v, s, r) + 2\pi f_\delta(r-1)\alpha + \beta)^2, \quad \text{Equation (19)}$$

where $\alpha$ is the common slope of the received phase responses for all antennas and $\beta$ is the offset. The $\hat{\tau}$ includes the time delay of each packet and we can remove it to obtain the calibrated CSI phase with $\hat{\psi}(v,s,r) = \psi(v,s,r) - 2\pi f_\delta(r-1)\hat{\tau}$.

$$\hat{\psi}(v,s,r) = \psi(v,s,r) - 2\pi f_\delta(r-1)\hat{\tau} \quad \text{Equation (20)}$$

In one example, the present disclosure may include a sensor system configured to monitor compounds in air and collocate weather measurements with self-powering, sample conditioning, edge processing, and/or communication capability.

In another example, the present disclosure may include a method for the estimation of the detection area of a sensor system using transport simulation.

In another example, the present disclosure may include an actionability engine for the tracking and suggestion of practices, equipment, and manpower for proper leak maintenance.

In another example, the present disclosure may include an actionability engine for the identification of repeat-offending components and component types.

In another example, the present disclosure may include a system including a computing device including one or more processors and memory storing instructions that, when executed by the one or more processors, cause the system to perform one of the methods described.

In another example, the present disclosure may include a method for preventative maintenance scheduling based on emission estimation and measurements.

In another example, the present disclosure may include an asset appraisal method for tagging equipment handling a target substance at a site, based on a plurality of two-dimensional images of the site.

In another example, the present disclosure may include an alert calibration method for training a prediction model, validating a plurality of first predicted substance concentrations of the target substance.

In another example, the present disclosure may include an alert calibration method for training a prediction model, validating a plurality of first predicted substance concentrations of the target substance.

In another example, the present disclosure may include Wi-Fi signals and antennas (i.e., one dimensional (1D) sensors) for human body segmentation and key-point body detection, in outdoor monitored sites, such as petroleum extraction sites.

In another example, the present disclosure provides for combining Wi-Fi signals with deep learning architectures (also, referred to as Machine Learning network), commonly used in computer vision, to estimate human pose correspondence.

In another example, the present disclosure provides for using already installed Wi-Fi equipment for human sensing, without requiring any specialised hardware.

In another example, the present disclosure enables monitoring remote sites to identify suspicious behaviours, verify that required intervention has been performed by the personnel, and also to verify the specific actions that have been performed by the personnel.

Specific details are given in the above description to provide a thorough understanding of the configurations. However, it is understood that the configurations may be practiced without these specific details. For example, circuits may be shown in block diagrams in order not to obscure the configurations in unnecessary detail. In other instances, well-known circuits, processes, algorithms, structures, and techniques may be shown without unnecessary detail in order to avoid obscuring the configurations.

Also, it is noted that the configurations may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, non-volatile, or other storage medium and is not to be limited to any particular type of memory or number of memories, or type of media upon which memory is stored.

The controllers, computing devices, server devices, and other components of systems can include machine-readable media and one or more processors, Programmable Logic Controllers, Distributed Control Systems, secure processors, memory, and the like. Secure storage may also be implemented as a secure flash memory, secure serial EEPROM, secure field programmable gate array, or secure application-specific integrated circuit. Processors can be standard central processing units or secure processors. Secure processors can be special-purpose processors that can withstand sophisticated attacks that attempt to extract data or programming logic. A secure processor may not have debugging pins that enable an external debugger to monitor the secure processor's execution or registers. In other configurations, the system may employ a secure field programmable gate array, a smartcard, or other secure devices. Other types of computing devices can also be used.

Memory can include standard memory, secure memory, or a combination of both memory types. By employing a secure processor and/or secure memory, the system can ensure that both data and instructions are highly secure. Memory can be incorporated into the other components of the controller system and can store computer-executable or processor-executable instructions, including routines executed by a programmable computing device. In some configurations, the memory can store programs for preset configurations. Stored programs (e.g., simulation programs, calibration programs, graphic mapping programs, etc.) can be modified by a subject, operator, or remote manager to provide flexibility.

The present disclosure contemplates methods, systems, and program products on any machine-readable media for accomplishing various operations. The configurations of the present disclosure may be implemented using existing computer processors, or by a special-purpose computer processor for an appropriate system, incorporated for this or another purpose, or by a hardwired system. Configurations within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions. The machine-readable media can be part of sensors, computing devices, or other components disclosed herein.

Unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. The term "comprising" is used throughout to mean including at least the recited feature(s) such that any greater number of the same feature and/or additional types of other features are not precluded. It will also be appreciated that specific configurations have been described herein for purposes of illustration, but that various modifications may be made without deviating from the technology. Further, while advantages associated with certain configurations of the technology have been described in the context of those configurations, other configurations may also exhibit such advantages, and not all configurations necessarily need to exhibit such advantages to fall within the scope of the technology. Accordingly, the disclosure and associated technology can encompass other configurations not expressly shown or described herein. In general, in the following claims, the terms used should not be construed to limit the claims to the specific configurations disclosed in the specification and the claims, but should be construed to include all possible configurations along with the full scope of equivalents to which such claims are entitled. Accordingly, the claims are not limited by the disclosure.

Implementation of the techniques, blocks, steps, and means described above may be done in various ways. For example, these techniques, blocks, steps, and means may be implemented in hardware, software, or a combination thereof. For a digital hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. For analog circuits, they can be implemented with discreet components or using monolithic microwave integrated circuit (MMIC), radio frequency integrated circuit (RFIC), and/or micro electro-mechanical systems (MEMS) technologies.

Furthermore, configurations may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The methods, systems, devices, graphs, and/or tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred configurations of the disclosed systems, methods, and/or machine-readable media have been described in detail herein, it is to be understood that the inventive concepts may be otherwise variously embodied and employed, and that the appended claims are intended to be construed to include such variations, except as limited by the prior art. While the principles of the disclosure have been described above in connection with specific apparatuses and methods, it is to be clearly understood that this description is made only by way of example and not as limitation on the scope of the disclosure.

What is claimed is:

1. A method of detecting human presence in an outdoor monitored site, the method comprising:
    providing a first air quality monitor comprising:
        a first transmitter for transmitting radio signals; and
        a first receiver for receiving radio signals;
    providing a second air quality monitor comprising:
        a second transmitter for transmitting radio signals; and
        a second receiver for receiving radio signals;
    providing a third air quality monitor comprising:
        a third transmitter for transmitting radio signals; and
        a third receiver for receiving radio signals;
            wherein each of the first receiver, the second receiver, and the third receiver is configured to receive radio signals transmitted by the first transmitter, the second transmitter, and the third transmitter;
    receiving, from the first receiver, the second receiver, and the third receiver, radio signals as received by each of the first receiver, the second receiver, and the third receiver, corresponding to a space through which the radio signals propagate;
    extracting, by a first machine learning network, channel state information data from the radio signals;

wherein the channel state information data comprises:
   phase values; and
   amplitude values;
converting, by the first machine learning network, the channel state information data into an image representation map of a predefined configuration, by performing domain translation of the channel state information data using a two-branch encoder-decoder network; and
generating, by a second machine learning network, a surface map based on the image representation map, wherein the surface map is a representation of correspondence between the image representation map and a 3-dimensional (3D) surface associated with a human body.

2. The method of claim 1 and further comprising:
wherein the first machine learning network is a modality translation network, and wherein the second machine learning network is a radio signal-based Region Based Convolutional Neural Networks network.

3. The method of claim 1 and further comprising:
training the first machine learning network and the second machine learning network together, as a student network, using an image-based Region Based Convolutional Neural Networks network as a teacher network, wherein the training comprises:
   fixing teacher network weights and training the student network by feeding the teacher network and the student network with the image representation map and CSI tensors, respectively; and
   updating the student network, wherein a configuration of the student network corresponds to a configuration of the teacher network.

4. The method of claim 1 and further comprising:
upon extracting the channel state information data, stabilizing the phase values associated with the channel state information data.

5. The method of claim 4, wherein the stabilizing comprises:
   unwrapping the phase values associated with the channel state information data; and
   upon unwrapping, applying linear fitting to the phase values associated with the channel state information data, to obtain stabilized phase values.

6. The method of claim 1, wherein converting the channel state information data into the image representation map, by the first machine learning network, comprises:
   flattening an amplitude tensor corresponding to the amplitude values and a phase tensor corresponding to the phase values, to obtain a flattened amplitude tensor and a flattened phase tensor, respectively;
   feeding the flattened amplitude tensor and the flattened phase tensor to a first encoder and a second encoder, respectively;
   obtaining a first latent space feature corresponding to the amplitude tensor and a second latent space feature corresponding to the phase tensor, from the first encoder and the second encoder, respectively;
   concatenating the first latent space feature and the second latent space feature to obtain a fused feature; and
   reshaping the fused feature into a 2D feature map of a predefined configuration.

7. The method of claim 6, wherein converting the channel state information data into the image representation map further comprises:
   applying two convolution blocks to the 2D feature map, to obtain a condensed feature map having predefined spatial dimensions; and
   upsampling the condensed feature map, by applying deconvolution layers, to obtain the image representation map having predefined dimensions.

8. The method of claim 6, wherein generating the surface map comprises:
   extracting spatial features from the 2D feature map using a Feature Pyramid Network (FPN) backbone;
   applying Region Proposal Network on the spatial features to obtain an output;
   applying a Fully Convolutional Network (FCN) on the output to:
      predict human part labels and UV coordinates within each part of the output; and
      estimate a key-point heatmap; and
   combining the human part labels and UV coordinates along with the key-point heatmap, and feeding into two convolutional blocks, to obtain a key-point mask and the surface map.

9. The method of claim 6, wherein each of the first encoder and the second encoder is a multi-layer perceptrons.

10. The method of claim 6, wherein the predefined configuration of the 2D feature map is 24×24.

11. The method of claim 1, wherein the radio signals are selected from within a frequency range of 2.4 Giga Hertz (GHz) to 5 GHz.

12. The method of claim 1, wherein the predefined configuration of the image representation map is 3×720×1280.

13. A system for detecting human presence in an outdoor monitored site, the system comprising:
   at least three transmitters for transmitting radio signals;
   at least three receivers for receiving radio signals;
      wherein each of the at least three transmitters is configured to receive radio signals transmitted by each of the at least three receivers; and
   a human presence detecting device comprising:
      a processor; and
      a memory storing a plurality of processor-executable instructions which, upon execution by the processor, cause the processor to:
         extract, by a first machine learning network, channel state information data from the radio signals, wherein the channel state information data comprises:
            phase values; and
            amplitude values;
         convert, by the first machine learning network, the channel state information data into an image representation map, by performing domain translation of the channel state information data using a two-branch encoder-decoder network; and
         generate, by a second machine learning network, a surface map based on the image representation map, wherein the surface map is a representation of correspondence between the image representation map and a 3-dimensional (3D) surface associated with a human body.

14. The system of claim 13, wherein the first machine learning network is a modality translation network, and wherein the second machine learning network is a radio signal-based Region Based Convolutional Neural Networks network.

15. The system of claim 13, and further comprising:
wherein the first machine learning network and the second machine learning network are trained together as a student network, using an image-based Region Based Convolutional Neural Networks network as a teacher network,
wherein training the first machine learning network and the second machine learning network as the student network comprises:
fixing teacher network weights and training the student network by feeding the teacher network and the student network with the image representation map and CSI tensors, respectively; and
updating the student network, wherein a configuration of the student network corresponds to a configuration of the teacher network.

16. The system of claim 13, wherein converting the channel state information data into the image representation map, by the first machine learning network, comprises:
flattening an amplitude tensor corresponding to the amplitude values and a phase tensor corresponding to the phase values, to obtain a flattened amplitude tensor and a flattened phase tensor, respectively;
feeding the flattened amplitude tensor and the flattened phase tensor to a first encoder and a second encoder, respectively;
obtaining a first latent space feature corresponding to the amplitude tensor and a second latent space feature corresponding to the phase tensor, from the first encoder and the second encoder, respectively;
concatenating the first latent space feature and the second latent space feature to obtain a fused feature;
reshaping the fused feature into a 2D feature map of a predefined configuration;
applying two convolution blocks to the 2D feature map, to obtain a condensed feature map having predefined spatial dimensions; and
upsampling the condensed feature map, by applying deconvolution layers, to obtain the image representation map having predefined dimensions.

17. The system of claim 16, wherein generating the surface map comprises:
extracting spatial features from the 2D feature map using a Feature Pyramid Network (FPN) backbone;
applying Region Proposal Network on the spatial features to obtain an output;
applying a Fully Convolutional Network (FCN) on the output to:
predict human part labels and UV coordinates within each part of the output; and
estimate a key-point heatmap; and
combining the human part labels and UV coordinates along with the key-point heatmap, and feeding into two convolutional blocks, to obtain a key-point mask and the surface map.

18. The system of claim 16, wherein each of the first encoder and the second encoder is a multi-layer perceptrons.

19. The system of claim 13, wherein the radio signals are selected from within a frequency range of 2.4 Giga Hertz (GHz) to 5 GHz.

20. A method of detecting human presence in an outdoor monitored site, the method comprising:
receiving from a horizontal antenna array, a plurality of two-dimensional (2D) horizontal heatmaps, wherein each of the plurality of two-dimensional (2D) horizontal heatmaps is a projection of RF signal reflections on a plane parallel to a ground associated with the outdoor monitored site;
receiving from a vertical antenna array, a plurality of two-dimensional (2D) vertical heatmaps, wherein each of the plurality of two-dimensional (2D) vertical heatmaps is a projection of RF signal reflections on a plane perpendicular to the ground associated with the outdoor monitored site; inputting the plurality of two-dimensional (2D) horizontal heatmaps and the plurality of two-dimensional (2D) vertical heatmaps to a student network of a machine learning network;
inputting image data synchronized with the plurality of two-dimensional (2D) horizontal heatmaps and the plurality of two-dimensional (2D) horizontal heatmaps to a teacher network of a machine learning network, wherein the teacher network is to provide cross-modal supervision for the student network; and
receiving, from the student network, predicted key-point confidence maps, corresponding to one or more anatomical parts of a human body.

21. The method of claim 20, wherein the student network comprises:
a first RF encoding network for horizontal heatmap streams;
a second RF encoding network for vertical heatmap streams;
wherein each of the first RF encoding network and the second RF encoding network is to:
remove spatial dimensions to summarize information from original views, based on strided convolutional networks, to generate horizontal RF encodings and vertical RF encodings, respectively; and
a pose decoding network,
wherein the pose decoding network is to:
receive channel-wise concatenation of the horizontal RF encodings and the vertical RF encodings; and
predict key-point confidence maps, based on the channel-wise concatenation of the horizontal RF encodings and the vertical RF encodings.

22. The method of claim 21,
wherein each of the first RF encoding network and the first RF encoding network uses strided convolutional networks to remove the spatial dimensions to summarize the information from the original views;
wherein the pose decoding network uses fractionally strided convolutional networks to decode key-points in a camera's view.

* * * * *